(12) United States Patent  (10) Patent No.: US 7,917,406 B2
Kido et al.  (45) Date of Patent: Mar. 29, 2011

(54) INTRODUCTION SUPPORT METHOD AND SYSTEM, AND INTRODUCTION METHOD AND SYSTEM

(75) Inventors: Kunihiko Kido, Sagamihara (JP); Koichi Haruna, Yokohama (JP); Yasuhiro Hashimoto, Kokubunji (JP); Yoshito Ohkawa, Yachiyo (JP); Masako Egashira, Kita-kyushu (JP); Hiromitsu Kurisu, Sagamihara (JP); Koichi Sano, Yokohama (JP); Toshiharu Kato, Musashino (JP); Masahiro Hanada, Yubari (JP)

(73) Assignees: Hitachi, Ltd., Tokyo (JP); Toshiharu Kato, Tokyo (JP); Masahiro Hanada, Hokkaido (JP)

( * ) Notice: Subject to any disclaimer, the term of this patent is extended or adjusted under 35 U.S.C. 154(b) by 972 days.

(21) Appl. No.: 11/802,945

(22) Filed: May 29, 2007

(65) Prior Publication Data
US 2007/0233514 A1  Oct. 4, 2007

Related U.S. Application Data

(62) Division of application No. 09/942,801, filed on Aug. 31, 2001, now abandoned.

(30) Foreign Application Priority Data

Dec. 28, 2000 (JP) .................................. 2000-401079

(51) Int. Cl.
*G06Q 30/00* (2006.01)
(52) U.S. Cl. ............ 705/26.35; 705/26; 705/27; 705/80
(58) Field of Classification Search .................... 705/26, 705/27, 80
See application file for complete search history.

(56) References Cited

U.S. PATENT DOCUMENTS

| 5,230,048 | A | 7/1993 | Moy |
| 5,359,508 | A | 10/1994 | Rossides |
| 5,926,798 | A | 7/1999 | Carter .............................. 705/26 |
| 6,035,288 | A | 3/2000 | Solomon ......................... 705/37 |
| 6,338,050 | B1 * | 1/2002 | Conklin et al. .................. 705/80 |
| 6,816,882 | B1 * | 11/2004 | Conner et al. ................. 709/203 |
| 2001/0039508 | A1 | 11/2001 | Nagler et al. ................... 705/11 |

FOREIGN PATENT DOCUMENTS
GB  2326001  12/1998
(Continued)

OTHER PUBLICATIONS
Information on HomeGain.com, 1999-2000, pp. 1-59.
(Continued)

*Primary Examiner* — Yogesh C Garg
(74) *Attorney, Agent, or Firm* — Brundidge & Stanger, P.C.

(57) ABSTRACT

Introduction service is supported, in order to activate and facilitate community activities. A community management center 1 searches for offered-service information that matches at least partly with an application designated by a coordinator terminal 2, and selects participants specified by detected offered-service information, as introduction candidates. Then, an introduction candidate list that describes private information, desired terms, and possessed value of ticket for each of the selected introduction candidates is displayed on a coordinator terminal 2. When the coordinator terminal 2 selects a participant to be introduced to the applicant, out of the introduction candidates described in the introduction candidate list, then, the private information and the desired terms of selected participant is displayed on a participant terminal 3 of the applicant.

12 Claims, 36 Drawing Sheets

FOREIGN PATENT DOCUMENTS

| | | |
|---|---|---|
| JP | 06019926 | 1/1994 |
| JP | 1103932 | 2/1999 |
| JP | 11039392 | 2/1999 |
| JP | 11338880 | 12/1999 |
| JP | 11338881 | 12/1999 |
| JP | 2000101635 | 4/2000 |
| JP | 2001265989 | 9/2001 |
| JP | 2001290910 | 10/2001 |
| JP | 2002024459 | 1/2002 |
| JP | 2002024483 | 1/2002 |
| WO | 0041087 | 7/2000 |
| WO | 0060518 | 10/2000 |
| WO | 0075826 | 12/2000 |

OTHER PUBLICATIONS

"Eco-money Playing Role in Regional Regeneration, used for Welfare and Environmental Measure, Citizens Themselves Issuing and Operating" (Home and Lifestyle), Nihon Keizai Nihon Keizai Shimbun, Shimbun Company, Oct. 25, 2000, evening edition. p. 17.

"NTT Experiments with Computerized Eco-money, Participates with Aim to Establish C2C", Nikkan Kogyo Shimbun, Nikkan Kogyo Shimbun Company, Aug. 24, 2000, p. 11.

* cited by examiner

INTRODUCTION SERVICE SUPPORT SYSTEM

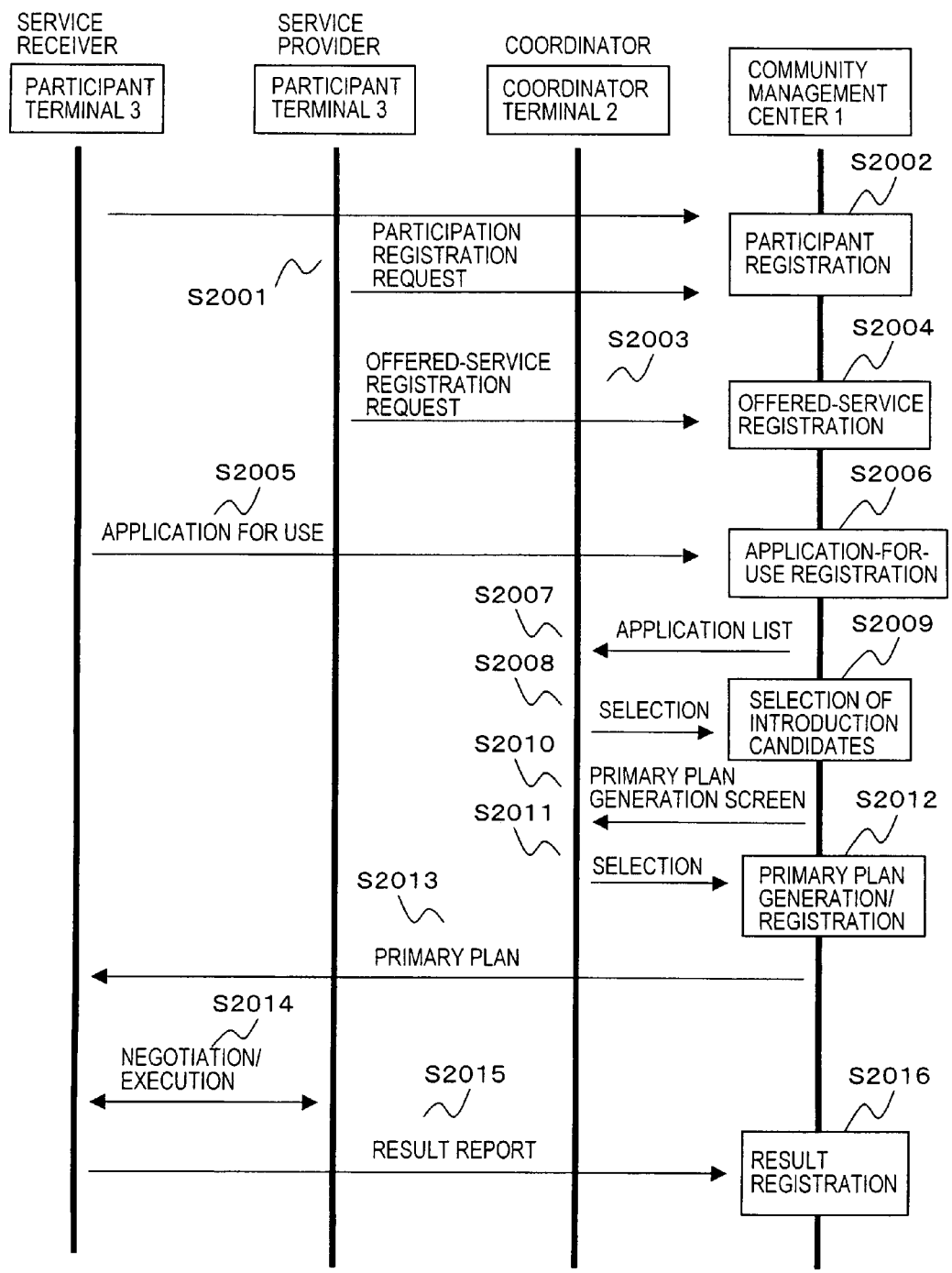

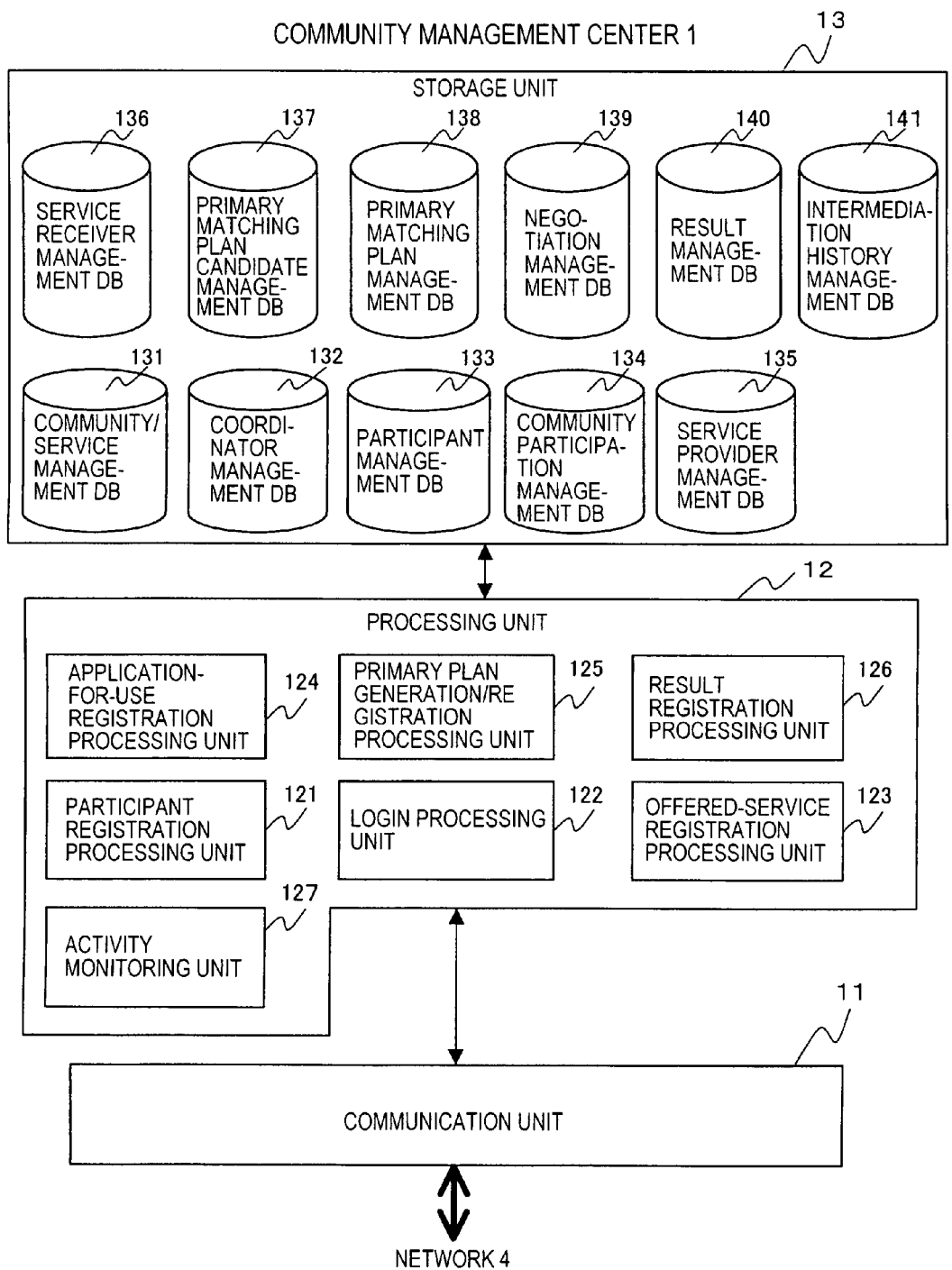

FIG.4

COMMUNITY/SERVICE MANAGEMENT DB 131

COMMUNITY INFORMATION MANAGEMENT TABLE 1311

| COMMUNITY ID (1311a) | COMMUNITY NAME (1311b) | COMMUNITY EXPLANATION (1311c) | NUMBER OF PARTICIPANTS (1311d) |
|---|---|---|---|
| 001 | A DISTRICT CIRCLE | COMMUNITY BASED ON A DISTRICT | |
| 002 | B DISTRICT CIRCLE | COMMUNITY BASED ON B DISTRICT | |
| 003 | C DISTRICT CIRCLE | COMMUNITY BASED ON C DISTRICT | |
| 004 | NURSING CARE ACTIVITY CIRCLE | COMMUNITY FOR NURSING CARE | |
| 005 | PRIVATE LESSON | COMMUNITY FOR PRIVATE LESSON SERVICE | |
| ⋮ | ⋮ | ⋮ | ⋮ |

SERVICE INFORMATION MANAGEMENT TABLE 1312

| COMMUNITY ID (1312a) | SERVICE CLASSIFICATION (1312b) | SERVICE NAME (1312c) | SERVICE EXPLANATION (1312d) |
|---|---|---|---|
| 001 | NURSING CARE | CARE FOR THE AGED | CARE FOR AGED PERSON AT CLIENT'S HOME |
| 002 | NURSING CARE | CARE FOR THE SICK | CARE FOR SICK PERSON AT CLIENT'S HOME |
| 003 | PRIVATE LESSON | ENGLISH LESSON | PRIVATE LESSON OF ENGLISH |
| 004 | PRIVATE LESSON | PIANO LESSON | PRIVATE LESSON OF PIANO |
| 005 | PRIVATE LESSON | PERSONAL COMPUTER LESSON | PRIVATE LESSON OF PERSONAL COMPUTER |
| ⋮ | ⋮ | ⋮ | ⋮ |

FIG.5

COORDINATOR MANAGEMENT DB 132

| COORDINATOR ID (132a) | LOGIN INFORMATION (132b) | | PRIVATE INFORMATION (132c) | COMMUNITY ID (1311a) | LAST LOGIN (132e) | LAST LOGOUT (132f) |
|---|---|---|---|---|---|---|
| | LOGIN NAME | PASSWORD | | | | |
| 001 | ABC | x54781 | ◎× | 003 | // | // |
| 002 | XYZ | z74z12 | △× | 002 | // | // |
| ⋮ | ⋮ | ⋮ | ⋮ | ⋮ | ⋮ | ⋮ |

FIG.6

PARTICIPANT MANAGEMENT DB 133

| PARTICIPANT ID (133a) | LOGIN INFORMATION (133b) | | PRIVATE INFORMATION (133c) | POSSESSED FACE VALUE OF TICKET (133d) | LAST LOGIN (132e) | LAST LOGOUT (132f) |
|---|---|---|---|---|---|---|
| | LOGIN NAME | PASSWORD | | | | |
| 0001 | DGK | 10278 | △◎ | 700 | // | // |
| 0002 | JFP | zab36 | ×◎ | 300 | // | // |
| ⋮ | ⋮ | ⋮ | ⋮ | ⋮ | ⋮ | ⋮ |

FIG.7

COMMUNITY PARTICIPANT DB 134

| | COMMUNITY ID 1311a | | |
|---|---|---|---|
| PARTICIPANT ID 132a | 001 | 002 | ............ |
| | 0043 | 0098 | |
| | 0067 | 0032 | |
| | 0132 | 0006 | |
| | 0210 | 0011 | |

FIG.8

SERVICE PROVIDER MANAGEMENT DB 135

| OFFERED-SERVICE ID (135a) | PARTICIPANT ID (133a) | SERVICE ID (1312a) | COMMUNITY ID (1311a) | DESIRED TERMS (135b) | | REGISTRATION DATE (135c) |
|---|---|---|---|---|---|---|
| | | | | PLACE | DAY OF THE WEEK/ TIME ZONE | |
| 000001 | 0003 | 001 | 001 | A DISTRICT | MONDAY, WEDNESDAY/ 10 - 12 | \*\*/\*\*/\*\* |
| 000002 | 0123 | 005 | 005 | A DISTRICT HALL | SUNDAY/ 13 - 15:30 | \*\*/\*\*/\*\* |
| ⋮ | ⋮ | ⋮ | ⋮ | ⋮ | ⋮ | ⋮ |

FIG.9
SERVICE RECEIVER MANAGEMENT DB 136

| APPLICATION-FOR-USE ID 136a | PARTICIPANT ID 133a | SERVICE ID 1312a | COMMUNITY ID 1311a | DESIRED TERMS 136b | | PROCESSING STATE 136c | REGISTRATION DATE 136d | PREVIOUS PRIMARY PLAN ID 136e |
|---|---|---|---|---|---|---|---|---|
| | | | | PLACE | DAY OF THE WEEK/ TIME ZONE | | | |
| 000001 | 0053 | 012 | 001 | A DISTRICT | MONDAY/10 - 16:30 | ○ | \*\*/\*\*/\*\* | |
| 000002 | 0346 | 025 | 005 | C DISTRICT HALL | SUNDAY/13 - 14 | △ | \*\*/\*\*/\*\* | |
| ...... | ...... | ...... | ...... | ...... | ...... | ...... | ...... | ...... |

PROCESSING STATE 136C
× → UNSTARTED
△ → PRIMARY PLAN CANDIDATE HAS BEEN ALREADY GENERATED
○ → PRIMARY PLAN HAS BEEN ALREADY GENERATED
□ → REPROCESSING

FIG.10

PRIMARY MATCHING PLAN CANDIDATE MANAGEMENT DB 137

| PRIMARY PLAN CANDIDATE ID | COORDINATOR ID | APPLICATION-FOR-USE ID | OFFERED-SERVICE ID CANDIDATE LIST HIGHER PRIORITY → LOWER PRIORITY | | | | | REGISTRATION DATE |
|---|---|---|---|---|---|---|---|---|
| 000001 | 026 | 000023 | 000003 | 000521 | 000269 | 000157 | ...... | \*\*/\*\*/\*\* |
| 000002 | 423 | 000078 | 000025 | 000087 | 000196 | 002159 | ...... | \*\*/\*\*/\*\* |
| ...... | ...... | ...... | ...... | ...... | ...... | ...... | ...... | ...... |

PRIMARY MATCHING PLAN MANAGEMENT DB 138

| PRIMARY PLAN ID 138a | COORDINATOR ID 132a | PRIMARY PLAN CANDIDATE ID 137a | APPLICATION-FOR-USE ID 136a | OFFERED-SERVICE ID 135a | REGISTRATION DATE 138b | CONTENT OF MATCHING 138c | MATCHING DATE 138d |
|---|---|---|---|---|---|---|---|
| 000001 | 068 | 000005 | 000033 | 000152 | \*\*/\*\*/\*\* | OK | \*\*/\*\*/\*\* |
| 000002 | 342 | 000007 | 000077 | 000487 | \*\*/\*\*/\*\* | NG | \*\*/\*\*/\*\* |
| 000003 | 242 | 000125 | 000877 | 003587 | \*\*/\*\*/\*\* | UNDETERMINED | |
| ...... | ...... | ...... | ...... | ...... | ...... | ...... | ...... |

FIG.12

NEGOTIATION MANAGEMENT DB 139

| PRIMARY PLAN CANDIDATE ID 137a | PRIMARY PLAN ID 138a | COORDINATOR ID 132a | COMMENT 139a | | COMMENT 139a | |
| --- | --- | --- | --- | --- | --- | --- |
| | | | PARTICIPANT ID | EXPLANATION | PARTICIPANT ID | EXPLANATION |
| 000001 | 000008 | 009 | 0012 | **** | | |
| 000002 | 000009 | 016 | 0029 | **** | 0082 | **** |
| 000003 | 000042 | 022 | | | | |

FIG.13

RESULT MANAGEMENT DB 140

| EXECUTION ID (140a) | PRIMARY PLAN ID (138a) | EXECUTION DATE (140b) | PAID FACE VALUE OF TICKET (140c) | PARTICIPANT ID (133a) | EVALUATION INFORMATION (140d) |
|---|---|---|---|---|---|
| 000001 | 000008 | // |  | 0012 | *** |
| 000002 | 000009 | // |  | 0029 | *** |
| 000003 | 000042 | // |  | 0029 | *** |
| ⋮ | ⋮ | ⋮ | ⋮ | ⋮ | ⋮ |

REGISTRATION PROCESSING FOR PARTICIPATING IN A COMMUNITY ACTIVITY

FIG.17

PARTICIPATION REGISTRATION

171 — LOGIN NAME / PASSWORD

172 — NAME / PHONETIC TRANSCRIPTION / SEX ○ MAN ○ WOMAN / DATE OF BIRTH / ADDRESS

172 — POSTAL CODE NUMBER / TELEPHONE NUMBER / MAIL ADDRESS / SELF-INTRODUCTION

173 — POSSESSED FACE VALUE OF TICKET

174 — TRANSMISSION

175 — RESET

OFFERED-SERVICE REGISTRATION PROCESSING

APPLICATION-FOR-USE REGISTRATION PROCESSING

PROCESSING OF GENERATION/REGISTRATION OF PRIMARY MATCHING PLAN

FIG.36

DISTRICT MANAGEMENT DB 3501

| DISTRICT ID | DISTRICT NAME | KIND OF TICKET | NUMBER OF RESIDENTS |
|---|---|---|---|
| 000001 | A DISTRICT | ** | **** |
| 000002 | B DISTRICT | ** | **** |
| 000003 | C DISTRICT | ** | **** |
| ⋮ | ⋮ | ⋮ | ⋮ |

3601, 3602, 3603, 3604

INTRODUCTION SUPPORT METHOD AND SYSTEM, AND INTRODUCTION METHOD AND SYSTEM

The present application is a Divisional Application of application Ser. No. 09/942,801, filed Aug. 31, 2001 now abandoned, the contents of which are incorporated herein by reference.

BACKGROUND OF THE INVENTION

The present invention relates to a technique for supporting intermediation such that it is possible to introduce a person conforming with a demand of a requesting person, in particular, a provider that can provide service (including provision of a commodity) conforming with a demand of a requesting person.

Conventionally, there has been an introduction service that introduces information conforming with a user's demand using a network such as Internet. One of such an introduction service is a search engine. A search engine searches for a URL (Uniform Resource Locator) associated with a search condition that coincides with or approximates to a search condition received from a user's terminal through a network, in a search database that stores URLs of Web pages in association with search conditions. Then, the search engine presents pieces of link information linked to the searched URLs onto the user's terminal. By selecting a piece of link information, the user can access the URL specified by that piece of link information, to browse the Web page of that URL.

Further, there exists service that provides an auction function through a network, in order to promote direct transactions of commodities or service between network participants themselves. By auctioning a commodity or service as an object of a transaction based on bidding prices, it is possible to match a seller and a buyer.

SUMMARY OF THE INVENTION

Recently, for activating and facilitating association activities on an individual level such as volunteer activities and regional activities (hereinafter, referred to as community activities), necessity is increasing for a system that can provide occasions for providing and receiving service to participants of community activities, i.e., a system that can introduce a participant (hereinafter, referred to as a service provider) who can provide service conforming with a demand of another participant (hereinafter, referred to as a service receiver) who wishes to receive service.

In order to activate and facilitate community activities, it is required to constantly recommend a role change between a service provider and a service receiver, to match a service provider and a service receiver in a way that exchanges of services circulate. Further, differently from an auction in which value of a traded commodity or service is expressed uniformly in terms of price information of a bidding price, value of volunteer service cannot be reduced uniformly to price information. For example, an occasion of providing service may be given not to a service provider A but to a service provider B because it more contributes to activation of community activity in certain area. Thus, value of volunteer service is affected also by other items than price information. Thus, matching should be performed taking various evaluation indexes into consideration. Further, it is also required to mature trustful relation in a community and to increase self-motivation of service providers and service receivers, by some means.

Accordingly, for activating and facilitating community activities, it is desirable that occasions for providing services are given to many participants. In other words, it is desired to avoid a situation that occasions for providing services are given intensively to particular participants. Further, when there exist a plurality of service providers that can provide service conforming with a demand of a service receiver, it is not in harmony with the ideology of the community activities to introduce all the service providers to the service receiver for his selection, since it makes the service providers compete with one another.

The above-described conventional techniques, i.e., the conventional introduction service, such as a search engine, and the conventional auction utilizing a network, do not consider the above problems at all. Accordingly, it is not desirable to employ the conventional introduction service or network-utilizing auction as it is, as an arrangement for intermediation for providing participants of community activities with occasions of providing and receiving a service.

The present invention has been completed taking the above circumstances into consideration. An object of the present invention is to realize a system in which a person or organization wishing to spontaneously provide its own strength can be effectively employed in society, and in particular, to realize a system in which a person or organization can be effectively employed in society from a standpoint of the weak, not from the logic of the strong in society.

Another object of the present invention is to support intermediation between a service provider wishing to spontaneously provide service and a service receiver wishing to receive the service, in order to activate and facilitate a wide variety of community activities such as, for example, residents' mutual aid activities intended for services other than ones covered by Nursing Care Insurance System, activities of teaching Internet to aged persons, intercourse between a school and a district including residents' cooperation for an IT-oriented school, groundwork in which citizens participate, recycling activities, town cleaning, shop-district's support for volunteer activities such as donation in place of discount, and ecoforest-promotion activities based on promotion of intercourse between city residents and mountain village residents.

The present invention can be widely applied not only to volunteer services but also to network transactions of services or commodities that can not be uniformly reduced to price information, or, in other words, network transactions of services or commodities based on multiple values. Further, also the present invention can be applied to network transactions of services or commodities accompanied by mutual rewards (i.e., a relation in which a service receiver becomes, in turn, a service provider, providing service to another service receiver, so that exchange of services is realized among participants).

To attain the above objects, a first mode of the present invention uses a computer connected to various terminals through an information transmitting medium, to support a coordinator in introducing a provider who can provide a service (hereinafter, "service" includes provision of a commodity) conforming with a request of an applicant.

Namely, a desired term on a providable service (for example, designation of the kind of providable service, a desired date (or, a day of the week and time zone) for providing the service, a desired place for providing the service) is received from a terminal of a provider, and said desired term is registered in association with information on said provider (hereinafter, referred to as provider information). Further, providing state information on occasions of said provider for providing a service is obtained, and said providing state information is registered in association with the provider information of said provider. Further, an application for using a service that an applicant wishes to enjoy (for example, designation of the kind of service that the applicant wishes to enjoy, a desired date (or a day of the week and time zone) for receiving the service, and a desired place for receiving the service) is received from a terminal of said applicant, and said application is registered in association with information on said applicant (hereinafter, referred to as applicant information).

When said coordinator uses the coordinator's terminal to selects one of the registered applications, then desired terms that satisfy at least a part of contents of said application are selected out of the desired terms registered, and providers each specified by provider information associated with each of the selected desired terms are selected as introduction candidates. Then, an introduction candidate list, which describes the provider information, the desired term, and the providing state information for each of the providers selected in relation to said application, is outputted to a terminal of said coordinator.

Thus, referring to the desired term and the providing state information of each introduction candidate described in the introduction candidate list, the coordinator can select an introduction candidate who has few occasions for providing his service (occasions to be introduced to applicants), as the provider to be introduced to the applicant, while satisfying the contents of the application of the applicant to some degree.

Further, when the coordinator uses the coordinator terminal to select a provider to be introduced to said applicant, out of the introduction candidates described in said introduction candidate list, the provider information and the desired term of this provider are outputted to the terminal of said applicant.

Thus, only the information on the service provider selected by the coordinator is displayed to the applicant, and accordingly, it is possible to avoid a situation that participants compete with one another in acquiring an occasion for providing a service.

Further, in the above-described first mode, it is favorable that a provider belongs to at least one of communities (each community is a group of an arbitrary unit), and a coordinator is in charge of at least one community. Here, such a community may be provided for each district such as A district, B district, or for each field such as nursing care, lifelong learning, private lesson, garbage recycle, and town cleaning. Further, both types, i.e., communities for districts and communities for activity fields, may exist.

In that case, the above-mentioned provider information includes identification information of the community to which the provider in question belongs. Further, an application list that includes applications having the designation of the same community, out of the registered applications, is outputted to the terminal of the coordinator who is in charge of that community, to make the coordinator select one of the applications. Then, introduction candidates for the application are selected out of the providers each having the provider information that includes the identification information of the community designated by the selected application. Further, the introduction candidate list is outputted to the terminal of the coordinator in charge of the community designated by the application, to make the coordinator select the provider to be introduced to the applicant, out of the selected introduction candidates.

By this, the coordinator can select the provider to be introduced to the applicant out of the providers who are participants of the community that is well known to the coordinator himself, and a burden on the coordinator can be reduced.

In the above-described first mode, the coordinator selects the provider to be introduced to the applicant, considering the contents of the application of the applicant, the desired terms of each introduction candidate described in the introduction candidate list, etc. Accordingly, in order to realize smooth providing and reception of services between providers and applicants, and to activate and facilitate community activities, the coordinator is required of higher quality and ability. Further, the coordinator should perform his work faithfully according to the ideology of community activities.

Thus, it is important to prevent occurrence of a problem in the work of the coordinator, and to correctly grasp the fact later, even when a problem has occurred. Thus, it is favorable to register a negotiation history in association with the information on the coordinator (hereinafter, referred to as coordinator information). The negotiation history includes a history of negotiations of the coordinators terminal with the terminal of the applicant, or with the terminal of each provider described in the introduction candidate list. And, it is also favorable that this negotiation history can be used later for a close investigation (for example, if the contents of the coordinators work is conformity with the ideology of community activities, or not) and education (learning by or teaching of a coordinator). By this, an applicant, who is weak in relation to a coordinator, can participate in a community activity without anxiety.

Next, according to a second mode of the present invention, a computer connected to various terminals through an information transmitting medium is used to introduce a provider who can provide a service (hereinafter, "service" includes provision of a commodity) conforming with a request of an applicant.

Namely, a desired term on a providable service (for example, designation of the kind of providable service, the desired date (or, a day of the week and time zone) for providing the service, the desired place for providing the service) is received from a terminal of a provider, and said desired term is registered in association with information on said provider (hereinafter, referred to as provider information). Further, providing state information on occasions of said provider for providing a service is obtained, and the obtained providing state information is registered in association with the provider information of said provider. Further, an application for using a service that an applicant wishes to enjoy (for example, designation of the kind of service that the applicant wishes to enjoy, a desired date (or a day of the week and time zone) for receiving the service, and a desired place for receiving the service) is received from a terminal of said applicant, and said application is registered in association with information on said applicant (hereinafter, referred to as applicant information).

The, with respect to said application for use, desired terms that satisfy at least a part of contents of said application is selected out of desired terms registered, and the provider to be introduced to said applicant is specified, depending on each priority decided according to matched parts between each of said selected desired terms and the contents of said application. For example, marks are given depending on matched parts, as follows. Namely, when the kind of service coincides, marks A are given; when the desired place for providing and receiving the service coincide, marks B are given; and when the desired date for providing the service coincides, marks C are given. The sum of these marks is used as priority, and the provider specified by the provider information that is associated with the desired term of the top priority is specified as the provider to be introduced to the applicant. When there exist a plurality of providers each having the desired term of the top priority, then, among those providers, the provider having the lowest occasions for providing his service is specified as the provider to be introduced to the applicant.

The provider information and the desired term of thus-specified provider are outputted to the terminal of the applicant.

Similarly to the above-described first mode, in the second mode also, it is possible to specify the provider who has few occasions for providing his service (occasions to be introduced to applicants) as the provider to be introduced to the applicant, while satisfying the contents of the application to some degree. Further, the terminal of the applicant is notified of only the information on the service provider specified finally, and accordingly, it is possible to avoid a situation in which participants compete with one another in acquiring an occasion for providing a service. Further, in this mode, it is not necessary to prepare a coordinator.

Further, similarly to the above first mode, in the second mode also, it is favorable that a provider belongs to at least one of communities (each community is a group of an arbitrary unit). Then, the above-mentioned provider information may include identification information of the community to which the provider in question belongs. Thus, it is favorable that the application for use includes designation of a community, and the provider to be introduced to the application is specified out of the providers having provider information that includes the identification information of the community designated by the application. By this, the range of searching for the provider to be introduced to the application can be made smaller, and a burden on the computer can be reduced.

Further, in the above-described second mode, it is favorable to register a history of contents of processing executed on the computer to specify the provider to be introduced to the applicant. And, it is favorable that this history can be used for investigation if the processing on the computer has been executed in conformity with the ideology of community activities, and for reconsidering the rules employed by the computer for specifying the provider to be introduced to the applicant, for example.

In each of the above-described modes, as the providing state information, may be used, for example, a possessed face value of ticket that the provider receives from the applicant as value for providing his service. As such a ticket, may be mentioned, for example, "ecomoney", "LETS", or "time-dollar" aimed to be used as the value for a community activity.

When such a possessed face value of ticket is used as the providing state information, the face value of ticket paid by the applicant to the provider as value of the service may be received from the applicant terminal that has notified the provider information of the provider and the desired terms. Then, this face value is added to the possessed face value of ticket registered in association with the provider information of that provider. At that time, when the applicant is also registered as a provider, the paid face value of ticket received from the terminal of that applicant may be subtracted from the possessed face value of ticket registered in association with the provider information of the provider, i.e., the applicant in question. By this, occasions of receiving and providing services can be grasped from the possessed face value of ticket of each provider.

In payment of the above-mentioned ticket, it is effective to introduce ideas of negotiated transaction and pricing having fluctuation, as means for smoothly promoting providing and receiving of voluntary services, in particular, based on good faith. Namely, in the above first mode, the coordinator selects the provider to be introduced to the applicant, referring to the contents of application by the applicant and the desired terms of each introduction candidate described in the introduction candidate list. Further, in the above second mode, the above-mentioned computer selects the provider to be introduced to the applicant, referring to the contents of application by the applicant and the desired terms registered. In that case, the face value of ticket paid by the applicant to the provider introduced to that applicant as value of the service may be finally decided by the applicant according to a degree of satisfaction or thanks for the enjoyed service. In other words, thanks may be expressed by the value of the ticket.

BRIEF DESCRIPTION OF THE DRAWINGS

FIG. 2 is a diagram showing an outline of an introduction service that is performed using the introduction service support system shown in FIG. 1;

FIG. 3 is a diagram showing a schematic configuration of the community management center 1 shown in FIG. 1;

FIG. 4 is a diagram showing an example of contents of registration in the community/service management database 131 shown in FIG. 3;

FIG. 5 is a diagram showing an example of contents of registration in the coordinator management database 132 shown in FIG. 3;

FIG. 6 is a diagram showing an example of contents of registration in the participant management database 133 shown in FIG. 3;

FIG. 7 is a diagram showing an example of contents of registration in the community participation management database 134 shown in FIG. 3;

FIG. 8 is a diagram showing an example of contents of registration in the service provider management database 135 shown in FIG. 3;

FIG. 9 is a diagram showing an example of contents of registration in the service receiver management database 136 shown n FIG. 3;

FIG. 10 is a diagram showing an example of contents of registration in the primary matching plan candidate management database 137 shown in FIG. 3;

FIG. 11 is a diagram showing an example of contents of registration in the primary matching plan management database 138 shown in FIG. 3;

FIG. 12 is a diagram showing an example of contents of registration of the negotiation management database 139 shown in FIG. 3;

FIG. 13 is a diagram showing an example of contents of registration of the result management database 140 shown in FIG. 3;

FIG. 17 is a view showing an example of a participation registration screen displayed on a terminal that has accessed the community management center 1;

FIG. 36 is a diagram showing an example of contents of registration in the district management database 3501 shown in FIG. 35.

DETAILED DESCRIPTION OF THE PREFERRED EMBODIMENTS

In the following, embodiments of the present invention will be described taking an example of supporting an introduction service between participants who participate in community activities aiming at exchange of voluntary services (volunteer services).

To begin with, a first embodiment of the present invention will be described.

Figure 1:
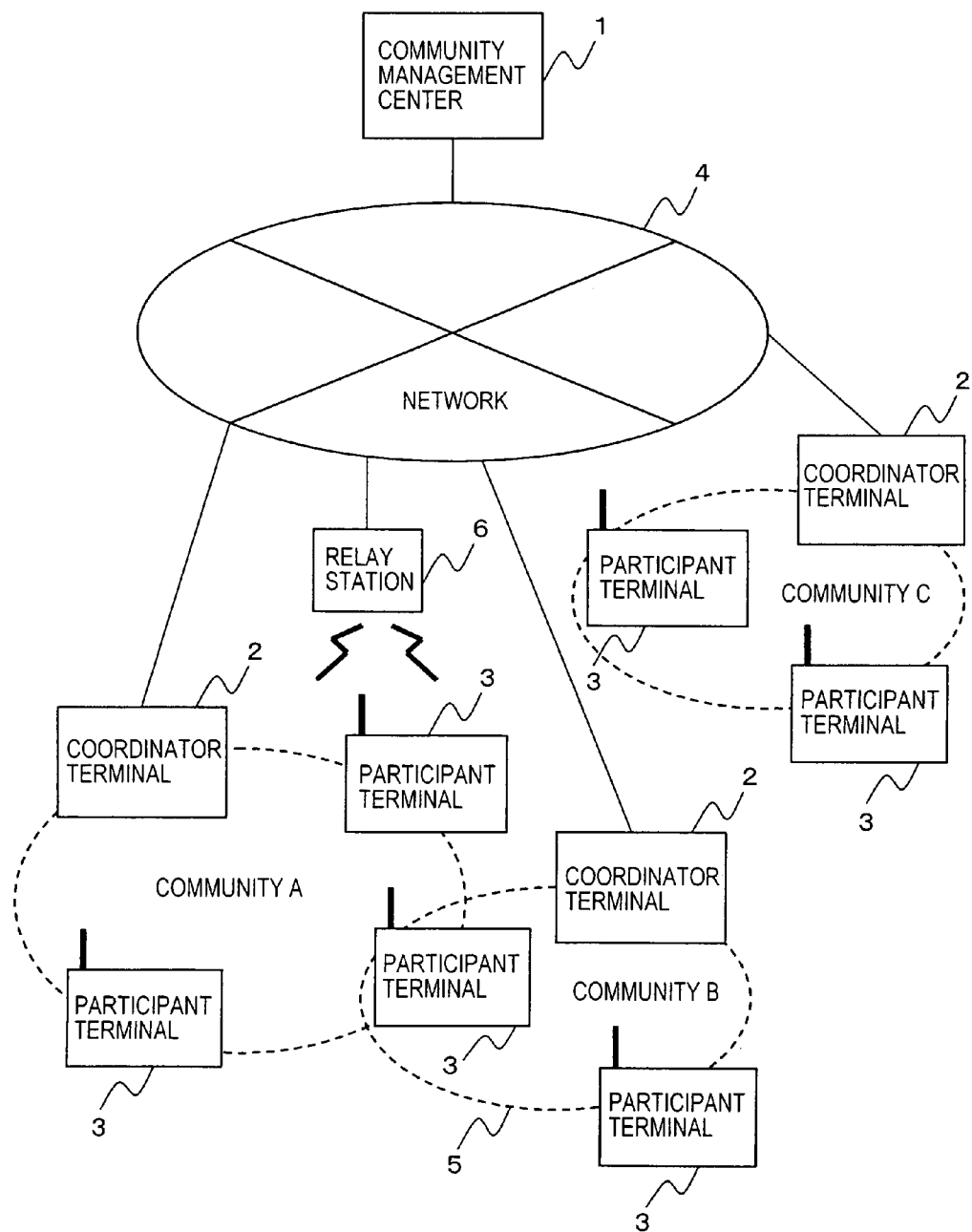
FIG. 1 is a diagram showing an outline of an introduction service support system to which a first embodiment of the present invention is applied.

FIG. 1 is a diagram showing an outline of an introduction service support system to which the first embodiment of the present invention is applied.

As shown in the figure, the introduction service support system of the present embodiment comprises: participant terminals 3 each used by a participant who participates in a community activity aiming at exchange of volunteer services; coordinator terminals 2 each used by a coordinator; and a community management center 1; wherein those participant terminals 3, coordinator terminals 2 and community management center 1 are connected with one another through a network 4 such as Internet. In the example shown in FIG. 1, it is assumed that each participant terminal 3 is a portable terminal having a radio communication function, and each participant terminal 3 is connected to the network 4 through a radio relay station. However, a participant terminal 3 is not limited to a portable terminal having a radio communication function.

It is conditioned that a participant in a community activity belongs to at least one of communities 5. Here, a community 5 is a group that becomes a base for a community activity of a participant. A unit of the communities may be defined arbitrarily. For example, each district may be defined as a community, such as a district A or district B. Or, a community may be defined for each field of activities, such as nursing care, lifelong learning, and private lessons. Or, communities 5 for districts and communities 5 for activity fields may be mixed.

Each community 5 is assigned with at least one coordinator. A coordinator performs work (introduction service) of selecting a participant (service provider) who can provide a service conforming with a demand of a participant (service receiver) who has made an application for use, out of participants belonging to the community 5 of which the coordinator is in charge, to perform intermediation (introduction) between the service receiver and the service provider.

Here, a coordinator is expected to sufficiently understand the ideology of the community activities and to perform intermediation work between a service receiver and a service provider so as to promote activation and facilitation of the community activities. Accordingly, it is considered that fundamental fiduciary duties such as the duty of loyalty and the duty of good administrator's care are imposed on a coordinator. Here, the duty of loyalty means a duty of acting to activate and facilitate the community activities. Conversely speaking, it means prohibition against an action benefiting only the coordinator himself, a third party other than the participants, or specific participants (for example, relatives of the coordinator) participating the community activities. On the other hand, the duty of good administrator's care forces a coordinator to act not to cause a situation that the task can not be performed for lack of care.

Further, the number of the participants in each community 5 may be restricted. For example, only 1,000 participants may be accepted for one community 5. By this, the frequency of introduction work is limited and work load of a coordinator is reduced. Similarly, the number of communities to which a participant of the community activities can be admitted may be restricted. For example, it may be stipulated that each participant in a community activity can participate in ten communities 5 at maximum. By this, it is possible to prevent unnecessary increase of the number of participants in each community 5.

Next, will be described an outline of an introduction service that is performed using the introduction service support system having the above configuration.

FIG. 2 is a diagram showing an outline of an introduction service that is performed using the introduction service support system shown in FIG. 1.

As shown in the figure, a person wishing to participate in a community activity uses a participant terminal 3 to make a request to the community management center 1 for participation registration (S2001), transmitting private information, which includes his name, address, contact address (telephone number and mail address), a name of a community 5 in which he wishes to participate, and the like, together with a possessed face value of ticket. Receiving this, the community management center 1 registers these items in association with login information (a user ID and a password) assigned uniquely to the requesting person (S2002), and notifies the requesting person's participant terminal 3 of the login information. By this, it becomes possible for the requesting person to utilize the introduction service support system of the present embodiment.

Here, as the ticket, may be used a ticket such as, for example, "ecomoney", "LETS", or "time-dollar", which is intended to be used as the value for a volunteer service.

Now, when the participant, who has finished the participation registration with the community management center 1, himself wishes to provide a volunteer service, then the participant uses the participant terminal 3 to request the community management center 1 to register a service to be provided (S2003), transmitting information on a service that can be provided, a place and a date (or a day of the week and a time zone). Receiving this, the community management center 1 registers these items as offered-service information such that it is possible to know its association with the previously-registered private information of the requesting person (S2004).

Further, when the participant, who has finished the participation registration with the community management center 1, wishes to receive a volunteer service, then the participant uses the participant terminal 3 to make an application to the community management center 1 for use (S2005), transmitting information on a service that he wishes to receive, a place, a date (or a day of the week and a time zone), and a name of a community 5 to use. Receiving this, the community management center 1 registers these items as application-for-use information such that it is possible to know its association with the previously-registered private information of the requesting person (S2006).

According to a coordinator's instruction received through a coordinator terminal 2, the community management center 1 searches application-for-use information that includes the name of the community 5 under the charge of the coordinator in question, among the previously-registered application-for-use information, and presents an application-for-use list that describes the detected application-for-use information and the private information corresponding to application-for-use information, to the coordinator terminal 2 in question (S2007). When the coordinator selects certain application-for-use information from the application-for-use list (S2008), the communication management center 1 selects candidates for service provider to be introduced to the service receiver who is specified by the private information corresponding to the selected application-for-use information (S2009). In detail, the communication management center 1 searches, out of previously-registered offered-service information, for offered-service information corresponding to private information of participants who participate in the community 5 whose name is included in the selected application-for-use information. Then, among the detected offered-service information, the community management center 1 further searches for offered-service information that satisfies at least a part of contents of the above-mentioned application-for-use information selected, and selects the participants specified by the private information corresponding to the detected offered-service information, as candidates for service provider (introduction candidates).

When the introduction candidates are selected as described above, the community management center 1 generates and registers a primary matching plan candidate, and presents a primary plan generation screen, which is generated based on the mentioned primary matching plan candidate, onto the coordinator terminal 2 (S2010). Here, the primary matching plan candidate includes an introduction candidate list, which describes private information, a possessed face value of ticket and offered-service information of each introduction candidate, and applicant-for-use information, which describes the private information, the possessed face value of ticket and the application-for-use information of the service receiver.

By this, the coordinator can select an introduction candidate who can provide the most appropriate service for the request of the service receiver among the introduction candidates, by comparing the applicant-for-use information in the primary plan generation screen displayed on the coordinator terminal 2 and pieces of information on each introduction candidate included in the service provider candidate list.

Further, at that time, when there exist a plurality of introduction candidates that can provide the most appropriate service for the request of the service receiver, it is possible to select an introduction candidate who has the least possessed face value of ticket, i.e., an introduction candidate whose utilization of the introduction service is least (i.e., an introduction candidate having the lowest frequency of being introduced to requesting persons), by comparing possessed face values of tickets of these introduction candidates with one another. Accordingly, the introduction service can be supported such that a coordinator can give many community activity participants opportunities of providing services.

Now, when the coordinator uses the coordinator terminal 2, to select an introduction candidate to be introduced to the service receiver, out of the introduction candidates described in the introduction candidate list (S2011), then, the community management center 1 generates and registers a primary matching plan that includes the private information and the offered-service information of the selected introduction candidate, and the applicant-for-use information in the primary plan generation screen (S2012).

When the primary matching plan is registered, then, according to an instruction received through a participant terminal 3 from the service receiver specified by the applicant-for-use information included in the primary matching plan, the community management center 1 presents a primary plan screen indicating the primary matching plan in question onto the participant terminal 3 (S2013).

Accordingly, the participant terminal 3 of the service receiver displays only the information on the service provider selected by the coordinator. Thus, it is possible to avoid a situation that participants compete with one another in acquiring an occasion for providing a service.

As described above, by considering pieces of information on a service receiver and each introduction candidate shown on a primary plan generation screen, contents of negotiations performed with those persons individually, and the like, a coordinator can match a service provider and a service receiver to circulate exchanges of volunteer services.

Further, a coordinator introduces a service provider so that a service receiver does not need to directly contact the unknown service provider. Accordingly, a barrier to participation to a community activity owing to difficulty in contacting an unknown person is lowered, and voluntariness of service providers and service receivers is encouraged.

Further, based on the offered-service information, application-for-use information, private information, and possessed face values of tickets, of service providers and service receivers, a coordinator can perform matching work, considering elements that can not be fully evaluated by a price, and being supported by the introduction support system. Accordingly, it is possible to perform intermediation of volunteer services accompanied by exchange of various values and mutual rewards.

Now, the service receiver makes contact with the contact address specified by the private information of the service provider shown in the primary plan screen, to negotiate with the service provider. When the negotiation is concluded, the service receiver receives the service from the service provider, and pays a ticket in payment for the service, to the service provider (S2014). Here, the service receiver himself may decide the face value of the ticket to be paid, depending on a degree of satisfaction or thanks for the service that he has enjoyed, since the service provided by the service provider is a volunteer service. As it were, a sense of thanks is expressed by the value of the ticket. However, in order to realize more smooth volunteer activities, a standard face value of a ticket to be paid for a volunteer service per a unit of time may be decided in advance, and notified to each participant.

Now, the service receiver uses the participant terminal 3 to report the result including a success or failure of the negotiation with the service provider, the face value of the ticket paid to the enjoyed service, an evaluation of contents of the enjoyed service, and the like, with respect to the primary matching plan presented by the community management center 1 (S2015).

Receiving this, the community management center 1 registers the result received from the service receiver (S2016). Further, the face value of the paid ticket included in the result is subtracted from the possessed face value of ticket registered in association with the private information of the service receiver, and added to the possessed face value of ticket registered in association with the private information of the service provider.

Lastly, in order to perform a duty of providing information as a coordinator, the primary matching plan, the primary matching plan candidate, the result, and a negotiation history are kept as an intermediation history.

Here, the duty of providing information means that, when a beneficiary (a service receiver or a service provider) demands, access to the record is allowed so that accurate information on the intermediation can be provided. Further, the duty of providing information also requires that a mandatary (a coordinator) positively presents information required for self-determination by a beneficiary, even if the beneficiary does not request it.

As described above, it is considered that fundamental fiduciary duties such as the duty of loyalty and the duty of good administrators care are imposed on a coordinator. By imposing the above-mentioned duty of providing information upon a coordinator, to increase the transparency of the contents of the activity, it is possible to decrease occasions of infringing the fiduciary duties, prompting the coordinator to loyally perform the fiduciary duties. Further, the duty of providing information ensures occasions of self-determination for a beneficiary, and disclosure of information maintains and strengthens trustful relation between a mandatary and a beneficiary.

Next, the community management center 1 used in the above-described introduction service support system will be described.

Here, the coordinator terminal 2 and participant terminal 3 are similar to the existing network terminal that has a function (such as a Web browser function) of browsing information made open by the community management center 1 and a function (such as a mailer function) of communicating with another apparatus connected to the network 4, and, accordingly, their detailed description will be omitted.

FIG. 3 is a diagram showing a schematic configuration of the community management center 1.

As shown in the figure, the community management center 1 comprises a communication unit 11 for communicating with another apparatus through the network 4, a processing unit 12 for performing registration of various data of a participant and for supporting coordinators work, and a storage unit 13 for storing data handled in the processing unit 12.

The communication unit 11 has a function of opening information of, for example, a Web server, and displays a screen according to an instruction from the processing unit 12 onto another apparatus that has accessed the community management center 1 through the network 4. Further, the communication unit 11 utilizes CGI (Common Gateway Interface) or Java (trademark) to receive information from another apparatus that has accessed the community management center 1 through the network 4.

The processing unit 12 comprises: a participant registration processing unit 121 for registering a participant of a community activity; a login processing unit 122 for judging usability of the community management center 1; an offered-service registration processing unit 123 for registering offered-service information that includes the terms desired by a service provider in providing his service; an application-for-use registration processing unit 124 for registering application-for-use information that includes terms desired by a service receiver in receiving a service; a primary plan generation/registration processing unit 125 for registering a primary matching plan candidate for supporting a coordinator in generation of a primary matching plan, and for registering a primary matching plan generated by a coordinator; a result registration processing unit 126 for registering a result reported by a service receiver who has performed a primary matching plan generated by a coordinator; and an activity monitoring unit 127 for monitoring introduction service activities of coordinators.

The storage unit 13 comprises: a community/service management database 131; a coordinator management database 132; a participant management database 133; a community participation management database 134; a service provider management database 135; a service receiver management database 136; a primary matching plan candidate management database 137; a primary matching plan management database 138; a negotiation management database 139; a result management database 140; and an intermediation history management database 141.

The community/service management database 131 registers pieces of information on each community 5 such as a name and explanation of the community and pieces of information on each volunteer service such as a name, kind and explanation of the volunteer service.

FIG. 4 shows an example of contents of registration in the community/service management database 131. This example provides a community information management table 1311 and a service information management table 1312. And, the community information management table 1311 registers a community name 1311b, its explanation 1311c and the number 1311d of its participants for each community 5, in association with a community ID 1311a assigned uniquely to that community 5. Further, the service information management table 1312 registers a service classification 1312b, a service name 1312c and explanation 1312d for each volunteer service, in association with a service ID 1312a assigned uniquely to that volunteer service. These pieces of information are registered in advance by, for example, an administrator of the community management center 1.

The coordinator management database 132 registers private information of each coordinator and pieces of information such as a community 5 of which the coordinator in question is in charge.

FIG. 5 shows an example of contents of registration in the coordinator management database 132. As shown in the figure, the coordinator management database 132 registers: login information (a login name and password) 132b of each coordinator; private information 132c including a name, address, contact address (telephone number and mail address), and the like of the coordinator in question; a community ID 1311a of a community 5 of which the coordinator in question is in charge; and a last login date 132e and a last logout date 132f; in association with a coordinator ID 132a assigned uniquely to the coordinator in question. Here, the login information 132b, the private information 132c, and the community ID 1311a are registered in advance by, for example, the administrator of the community management center 1. Further, the last login date 132e and the last logout date 132f are updated by the login processing unit 122 at each time of login and logout of the coordinator.

The participant management database 133 registers pieces of information on each participant, such as private information, a possessed face value of ticket, and the like.

FIG. 6 shows an example of contents of registration in the participant management database 133. As shown in the figure, the participant management database 133 registers: login information (a login name and password) 133b of each participant; private information 133c including a name, address, contact address (telephone number and mail address), self-introduction, and the number of communities in which the participant in question participates; a possessed face value of ticket 133d; and a last login date 133e and a last logout date 133f; in association with a participant ID 133a assigned uniquely to the participant in question. Here, the login information 133b, the private information 133c, and the possessed face value of ticket 133d are registered by the participant registration processing unit 121. Further, the last login date 132e and the last logout date 132f are updated by the login processing unit 122 at each time of login and logout of the participant in question. Further, the possessed face value of ticket 133d is updated by the result registration processing unit 126 depending on the result of performing a primary matching plan presented by a coordinator.

The community participation management database 134 registers participants for each community 5.

FIG. 7 shows an example of contents of registration in the community participation management database 134. As shown in the figure, the community participation management database 134 registers participant IDs 133a of participants who participate in a community given with a community ID 1311a, for each community ID 1311a registered in the community information management table 1311 of the community/service management database 131. Registration of a participant ID 133a is performed by the participant registration processing unit 121 when the participant management database 133 registers the pieces of information on the participant given with that participant ID 133a. As a variant, data in the community participation management database 134 may be closed to the public, except for a person specified by the data.

The service provider management database 135 registers offered-service information that includes the terms desired by a service provider in providing his service, as a participant who provides a volunteer service.

FIG. 8 shows an example of contents of registration in the service provider management database 135. As shown in the figure, the service provider management database 135 registers: a participant ID 133a of a service provider; a service ID 1312a of a volunteer service provided by the service provider in question; a community ID 1311a of a community that becomes a base for activities of the mentioned volunteer service; desired terms 135b, which includes a desired place and desired day of the week/time zone (or date), for providing his service; and a registration date 135c of offered-service information that consists of the mentioned items (133a, 1312a, 1311a and 135b); in association with an offered-service ID 135a assigned uniquely to each record of offered-service information. These items of information are registered by the offered-service registration processing unit 123.

The service receiver management DB 136 registers application-for-use information that includes the terms desired by a service receiver in receiving a service, as a participant who desires to receive a volunteer service. Here, each record in the service receiver management DB 136 may be opened to persons other than the one specified by the data.

FIG. 9 shows an example of contents of registration in the service receiver management database 136. As shown in the figure, the service receiver management database 136 registers: a participant ID 133a of a service receiver; a service ID 1312a of a volunteer service that the service receiver in question desires to receive; a community ID 1311a of a community in which the service receiver desires to enjoy the mentioned volunteer service; desired terms 136b, which includes a desired place and desired day of the week/time zone (or date), for receiving the service; a processing state (i.e., a state of generation of a primary matching plan) 136c by a coordinator concerning application-for-use information that consists of the mentioned items (133a, 13121, 1311a, and 136b); a registration date 136d of the application-for-use information; and a previous primary plan ID 136e; in association with an application-for-use ID 136a assigned uniquely to each record of application-for-use information. Here, when the processing state 136c is "reprocessing", it means that an application-for-use having the same contents as this application-for-use was made in the past. In other words, it means that negotiations with a service provider who was introduced in reply to the last application-for-use resulted in failure, and accordingly, introduction of another service provider is requested. In that case, a primary matching plan ID 138a, which will be described below, relating to the last application-for-use is registered as a previous primary plan ID 136e. These items of information are registered by the application-for-use registration processing unit 124.

The primary matching plan candidate management database 137 registers a primary matching plan candidate for supporting a coordinator in generation of a primary matching plan. As described above, a primary matching plan candidate is used for generating a primary plan generation screen.

FIG. 10 shows an example of contents of registration in the primary matching plan candidate management database 137. As shown in the figure, the primary matching plan candidate management database 137 registers: an application-for-use ID 136a; an offered-service ID candidate list 137b that describes respective offered-service IDs 135a of candidates (introduction candidates) for service provider to be introduced to the service receiver specified by the application-for-use ID 136a, in the order of priority (degree of conformity with the application-for-use information); a coordinator ID 132a of a coordinator in charge of generation of a primary matching plan based on the primary matching plan candidate that consists of the mentioned items (136a, 137b); and a registration date 137c of this primary matching plan candidate; in association with a primary plan candidate ID 137a assigned uniquely to each primary matching plan candidate. These items are registered by the primary plan generation/registration processing unit 125.

The primary matching plan management database 138 registers a primary matching plan generated by a coordinator.

FIG. 11 shows an example of contents of registration in the primary matching plan management database 138. As shown in the figure, the primary matching plan management database 138 registers: an application-for-use ID 136a; an offered-service ID 135a of the service provider to be introduced to the service receiver specified by the application-for-use ID 136a; a coordinator ID 132a of a coordinator who has generated a primary matching plan consisting of the mentioned items (136a and 135a); a primary plan candidate ID 137a of the primary matching plan candidate on which the coordinator has based generation of the mentioned primary matching plan; a registration date 138b of this primary matching plan; a content of matching 138c indicating if the service receiver has agreed to the primary matching plan; and a date of matching 138d; in association with a primary plan ID 138a assigned uniquely to each primary matching plan. These items are registered by the primary plan generation/registration processing unit 125.

The negotiation management database 139 registers coordinators notes etc. made in negotiations with each introduction candidate displayed in the introduction candidate list in the primary plan generation screen. Such negotiations are performed if necessary, when the coordinator generates a primary matching plan from the primary plan generation screen displayed on the coordinator terminal 1.

FIG. 12 shows an example of contents registration in the negotiation management database 139. As shown in the figure, the negotiation management database 139 registers: a primary plan candidate ID 137a of a primary matching plan candidate; a primary plan ID 138a of a primary matching plan generated from this primary matching plan candidate; a coordinator ID 132a of a coordinator who has generated the primary matching plan; and comments 139a. Each comment 139a includes a participant ID 133a of an introduction candidate as a partner of a negotiation made in generating the primary matching plan using the primary plan generation screen based on the primary matching plan candidate, and description of noted points etc. in that negotiation. A comment 139a is made if necessary, when the coordinator makes negotiation with an introduction candidate in the primary plan generation screen. The above-mentioned items are registered by the primary plan generation/registration processing unit 125.

The result management database 140 registers a result of a service that a service receiver received from a service provider presented in a primary matching plan.

FIG. 13 shows an example of contents of registration in the result management database 140. As shown in the figure, the result management database 140 registers: a primary plan ID 138a of a primary matching plan; an execution date 140b, i.e., a date when a service receiver received a service from a service provider presented by the primary matching plan; a paid face value of ticket 140c, i.e., a face value of ticket paid to the service provider; a participant ID 133a of the service provider; and evaluation information 140d of the service received from the service provider; in association with an execution ID 140a assigned uniquely to a result that consisting of the mentioned items (138a, 140b, 140c, 133a and 140d). These items are registered by the result registration processing unit 126.

The intermediation history management database 141 registers a primary matching plan, a primary matching plan candidate, a result, and a negotiation history, as an intermediation history. The intermediation history management database 141 uses a table having a format similar to the primary matching plan candidate management database 137, the primary matching plan management database 138, the negotiation management database 139, and the result management database 140.

A part of data of each of the above-mentioned databases may be closed to the public. For example, the private information 132c of the coordinator management DB 132 may be closed to the public, while the other data is made open to the public.

Figure 14:
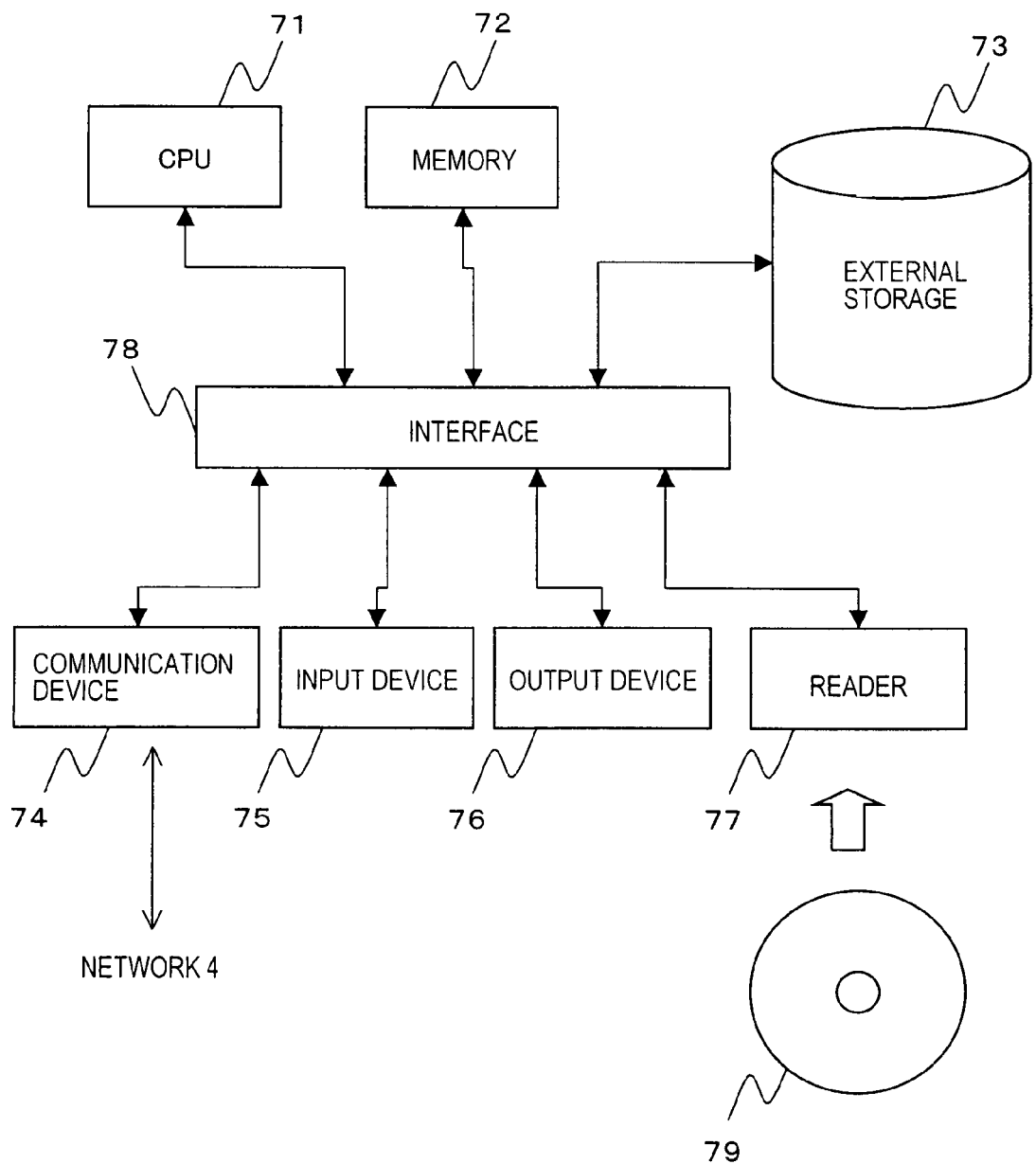
FIG. 14 is a diagram showing an example of a hardware configuration of devices constituting the community support system shown in FIG. 1.

A network terminal that functions as the above-mentioned community management center 1, coordinator terminal 2, or participant terminal 3 may be realized on a common computer by a specific program that is loaded onto a memory 72 of the computer, and executed by a CPU 71 of the computer. For example, as shown in FIG. 14, such a computer comprises the CPU 71, the memory 72, an external storage 73 such as a hard disk unit, a communication device 74 for communicating with another apparatus through the network 4, an input device such as a keyboard, mouse etc., an output device 76 such as a monitor, printer, etc., a reader 77 for reading data from a storage medium 79 such as a CD-ROM, FD, or the like, and an interface 78 for transmitting and receiving data between those components. This specific program may be obtained from a storage medium 79 that stores the program through the reader 77, or from the network 4 through the communication device 74, and directly loaded onto the memory 72. Or, the program may be temporarily stored in the external storage 73, before loading onto the memory 72. Here, the external storage 73 or the like may be used as the storage unit 13 shown in FIG. 3.

Next, operation of the community management center 1 having the above-described construction will be described.

First, the participation registration processing (S2001-S2002 in FIG. 2) for participating in a community activity will be described.

Figure 15:
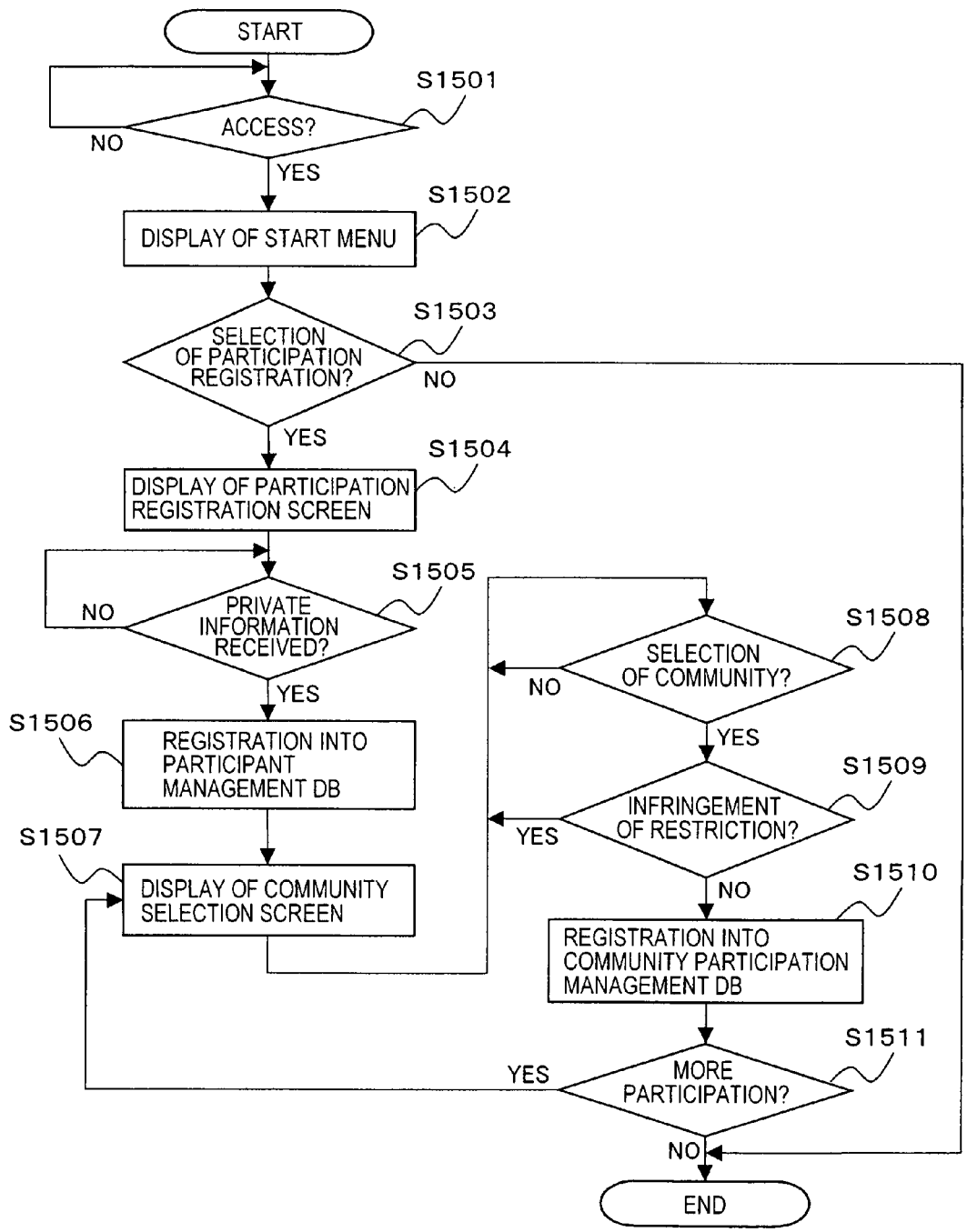
FIG. 15 is a chart for explaining participation registration processing for participation in a community activity in the first embodiment of the present invention.

FIG. 15 is a chart for explaining the participation registration processing for participating in a community activity.

Figure 16:
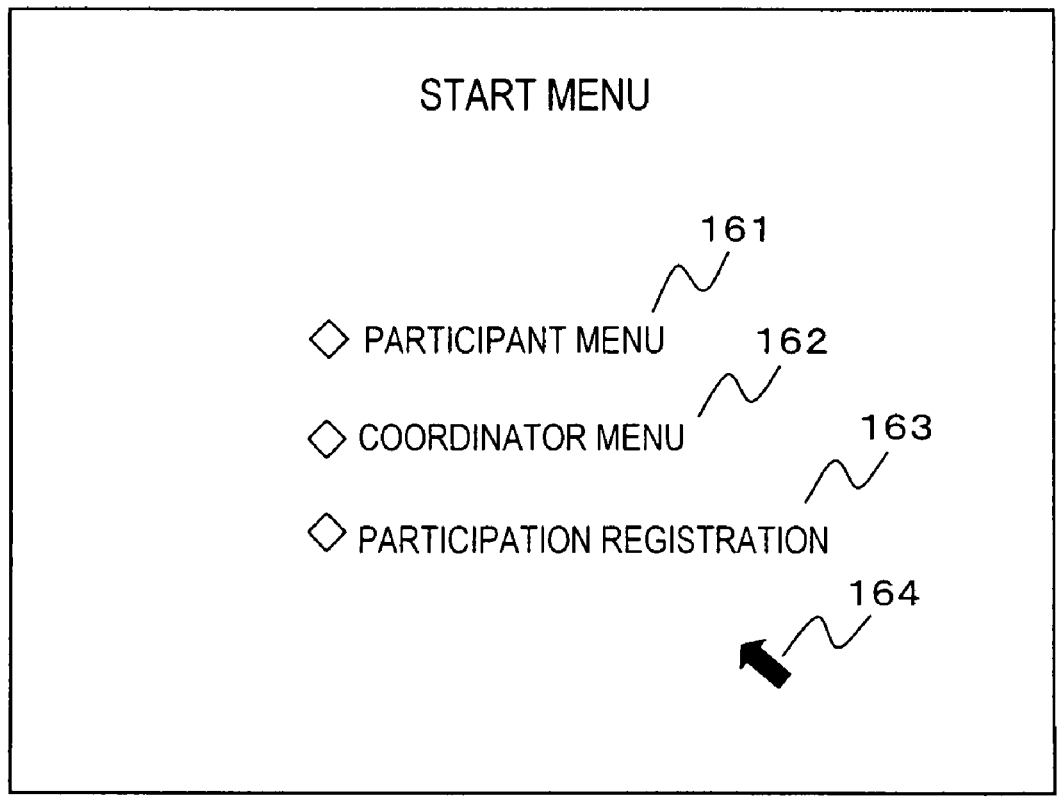
FIG. 16 is a view showing an example of a start menu screen displayed on a terminal that has accessed the community management center 1.

First, when the communication unit 11 is accessed by a terminal 2 or 3 through the network 4 (S1501), then, the communication unit 11 displays a start menu screen as shown in FIG. 16 on a display unit of the terminal 2 or 3 (hereinafter, referred to as an access terminal) that has accessed the communication unit 11 (S1502).

Here, the start menu screen shown in FIG. 16 is provided with an item 161 for displaying a participant menu, an item 162 for displaying a coordinator menu, and an item 163 for displaying a participation registration screen. A user of the access terminal can select some item by moving a cursor 164 with the input device such as a pointing device. The result of selection is notified to the communication unit 11 through the network 4.

Now, in the case that the communication unit 11 detects a selection of the item 163 for displaying the participation registration screen (S1503), the communication unit 11 notifies the participation registration processing unit 121 to that effect.

Receiving this notification, the participation registration processing unit 121 displays the participation registration screen as shown in FIG. 17 for receiving input of pieces of information to be registered into the participant management database 133, on the display unit of the access terminal (S1504).

Here, the participation registration screen shown in FIG. 17 is provided with input columns 171, 172 and 173 for inputting login information 133b, private information 133c, and a possessed face value of ticket 133d, to be registered into the participant management database 133 by a user of the access terminal. When the user of the access terminal inputs suitable information into these input columns 171-173 using the input device such as a keyboard, and selects a transmission button 174, then, the inputted information is notified to the participation registration processing unit 121 through the network 4 and the communication unit 11. When a reset button 175 is selected, the information inputted into the input columns 171-173 is cleared.

Receiving these pieces of input information (S1505), the participation registration processing unit 121 confirms that the received login information 133b is unique information that has not been registered in the participant management database 133, and then, adds a unique participant ID 133a to these pieces of input information, to register them in the participant management database 133 (S1506). At that time, it is appropriate that, when the received login information 133b has been already registered in the participant management database 133, it is notified to the access terminal, in order that the user sets login information 133b again. Here, it is possible that the participation registration processing unit 121 generates unique login information 133b, and displays the participation registration screen on the display unit in a state that the generated login information 133b is inputted in the corresponding input column 171 of the participation registration screen. Thus, input of login information 133b by the user of the access terminal can be omitted.

Figure 18:
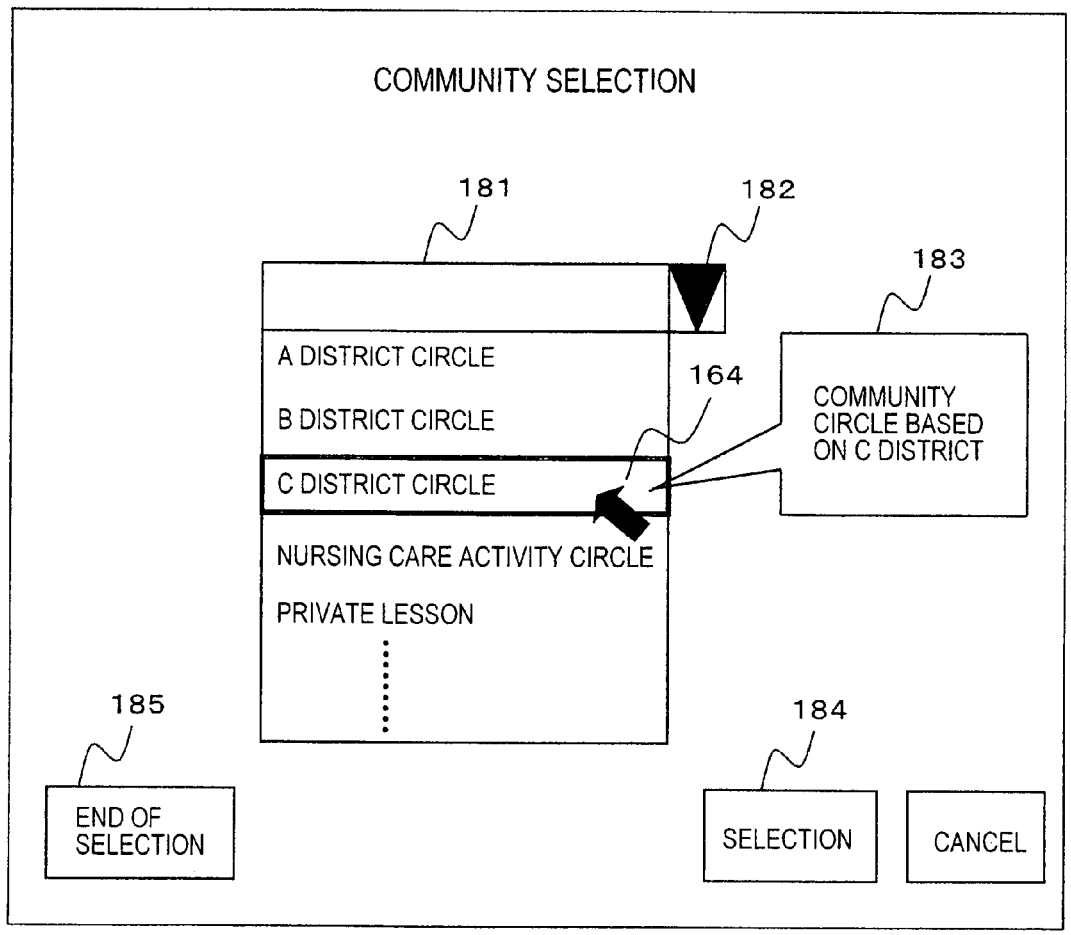
FIG. 18 is a view showing an example of a community selection screen displayed on a terminal that has accessed the community management center 1.

Now, when the registration of the information received from the user of the access terminal in the participant management database 133 is ended, the participation registration processing unit 121 displays it on the display unit of the access terminal, and thereafter, displays a community selection screen as shown in FIG. 18 (S1507).

Here, the community selection screen shown in FIG. 18 is provided with an input column 181 for inputting a community. This input column 181 takes the form of so-called pull-down menu. When a pull-down button 182 is selected by moving a cursor 164, a list of community names 1311b registered in the community information management table 1311 of the community/service management database 131. Each community name 1311b in the pull-down menu is linked to the corresponding community explanation 1311c, such that, when the cursor 16 is moved on a desired community name 1311b, a display frame 183 describing the community explanation 1311c corresponding to the community name is displayed.

When the user of the access terminal selects a desired community name 1311b in the pull-down menu and selects a selection button 184 (S1508), the participation registration processing unit 121 detects it through the network 4 and the communication unit 11. At that time, the participation registration processing unit 121 specifies the community ID 1311a corresponding to the selected community name 1311b, and the number 1311d of its participants. Then, the participation registration processing unit 121 checks if the number obtained by adding 1 to the number of the participants is less than or equal to the maximum number (for example, 1,000) of the participants allowed for one community, and if the number obtained by adding 1 to the number of the communities in which the participant in question participates is less than or equal to the maximum number (for example, 10) of the participable communities (S1509). When the mentioned conditions are satisfied, the participant ID 132a given to the user of the access terminal is added to the column of the community ID 1311a concerned in the community participation management database 134 (S1510). At that time, 1 is added to the number 1311d of the participants of the community concerned, and also in the private information 133c, 1 is added to the number of communities in which the participant in question participates. Lastly, a message for confirmation of the registration of the participation is displayed on the display unit of the access terminal. When it is wished to end the participation processing here, a selection end button 185 is selected (S1511) to end the processing.

Next, the offered service registration processing (S2003-S2004 in FIG. 2) will be described.

Figure 19:
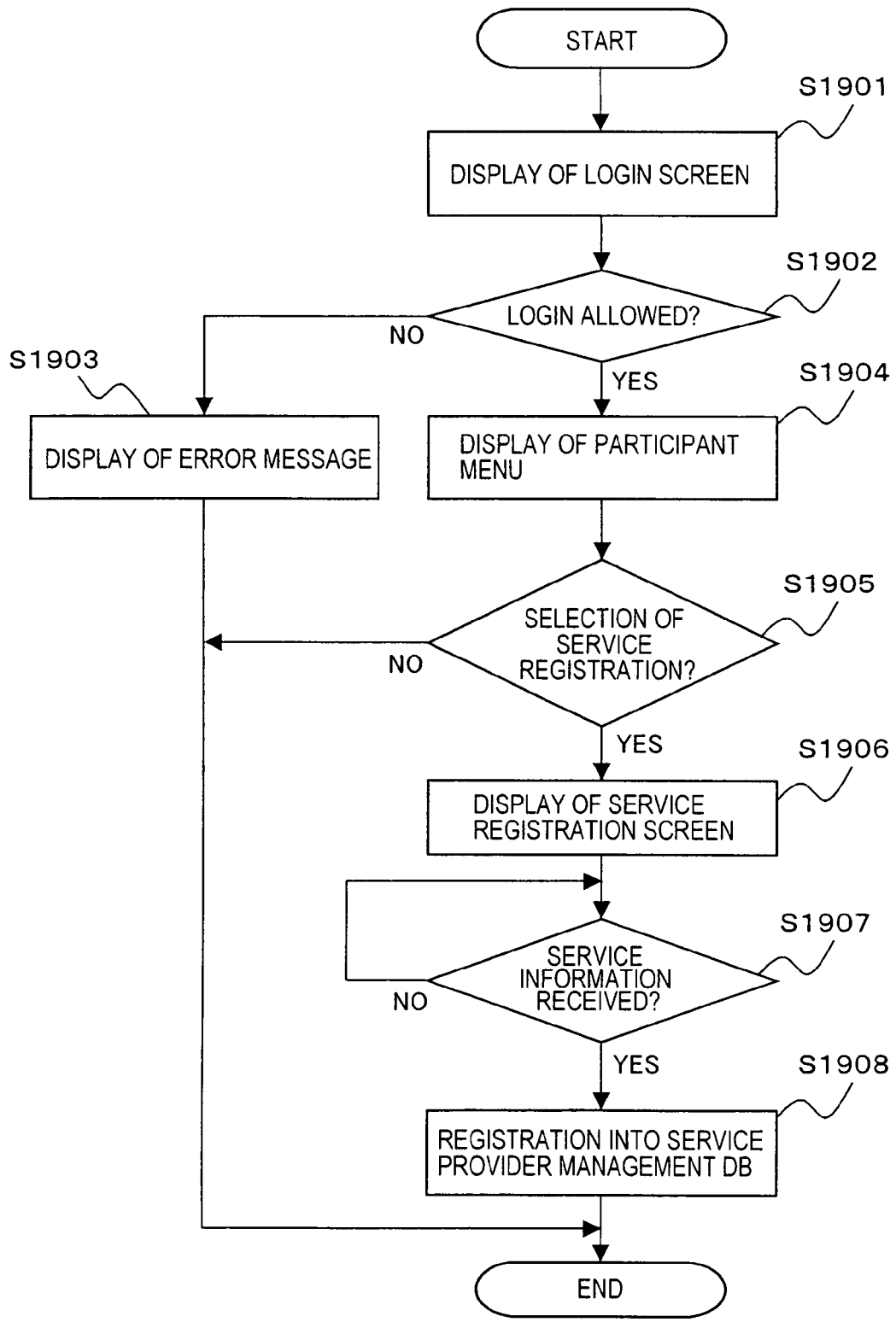
FIG. 19 is a chart for explaining processing of registration of an offered service in the first embodiment of the present invention.

FIG. 19 is a chart for explaining processing of registration of an offered service.

This flow is started when a user of an access terminal selects the item 161 for the participant menu, in the start menu screen as shown in FIG. 16.

First, the communication unit 11 notifies the login processing unit 122 that the item 161 for the participant menu is selected.

Figure 20:
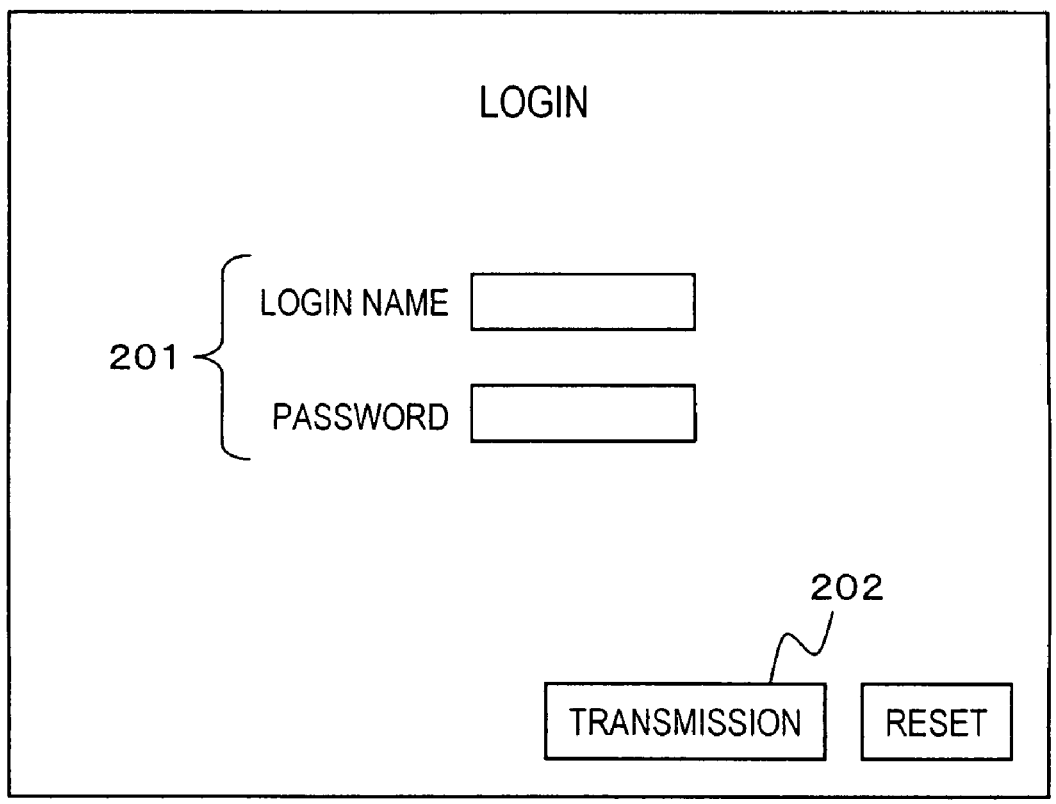
FIG. 20 is a view showing an example of a login screen displayed on a terminal that has accessed the community management center 1.

Receiving this notification, the login processing unit 122 displays a login screen as shown in FIG. 20 on the display unit of the access terminal (S1901) to receive input of the participant's login information 133b from the user of the access terminal. As shown in FIG. 20, the login screen is provided with an input column 201 for inputting login information and a transmission button 202 for transmitting the login information inputted into the input column 201.

Next, the login processing unit 122 examines if the received login information 133b has been registered in the participant management database 133 (S1902). When the received login information 133b is not registered, the login is rejected, and the login processing unit 122 performs error processing such as displaying of an error message on the display unit of the access terminal (S1093). On the other hand, when the received login information is registered, the login processing unit 122 allows the login and displays a participant menu screen as shown in FIG. 21 (S1904).

Figure 21:
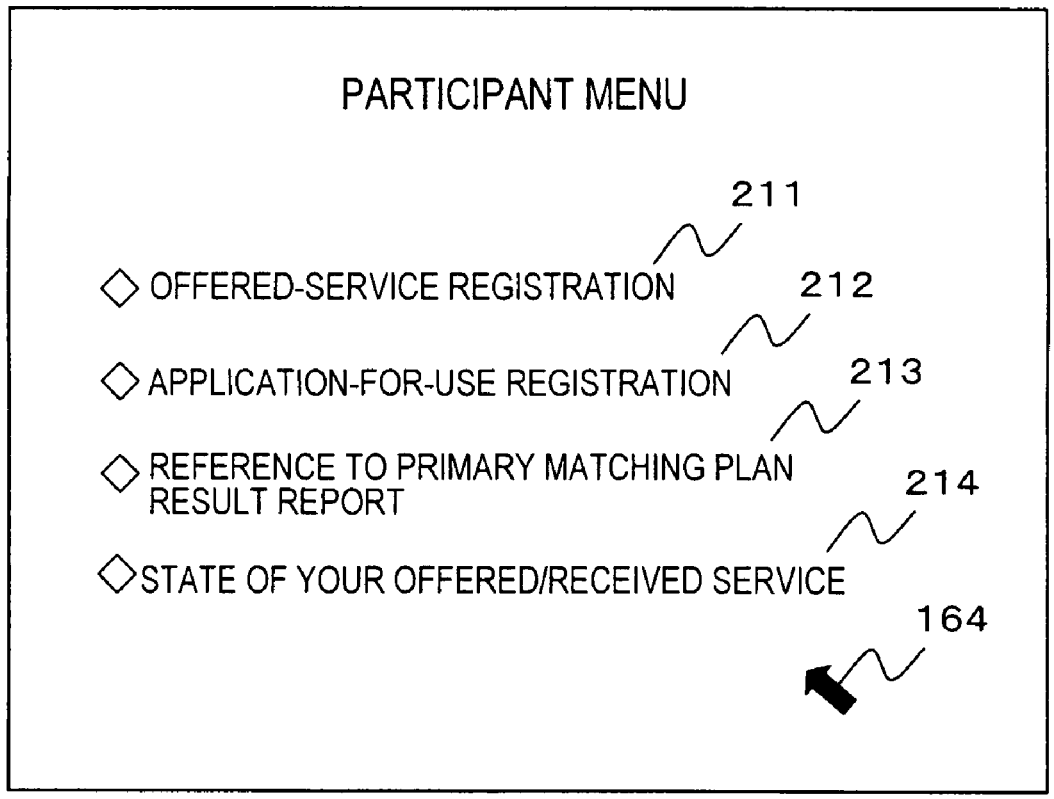
FIG. 21 is a view showing an example of a participant menu screen displayed on a terminal that has accessed the community management center 1.

The participant menu screen shown in FIG. 21 is provided with an item 211 for registration of an offered service, an item 212 for registration of an application for use, an item 213 for referring to a primary matching plan and for reporting a result of volunteer service performed based on the primary matching plan, and an item 214 for browsing the offered-service information and application-for-use information registered by the participant himself. The user of the access terminal can select any item by using the input device such as a pointing device to move a cursor 164. The result of this selection is notified to the login processing unit 122 through the network 4 and the communication unit 11.

When the communication unit 11 detects that the item 211 for registration of an offered service is selected, then, the communication unit 11 obtains the participant ID 133a of the user of the access terminal from the login processing unit 122, and transmits it to the offered-service registration processing unit 123.

Figure 22:
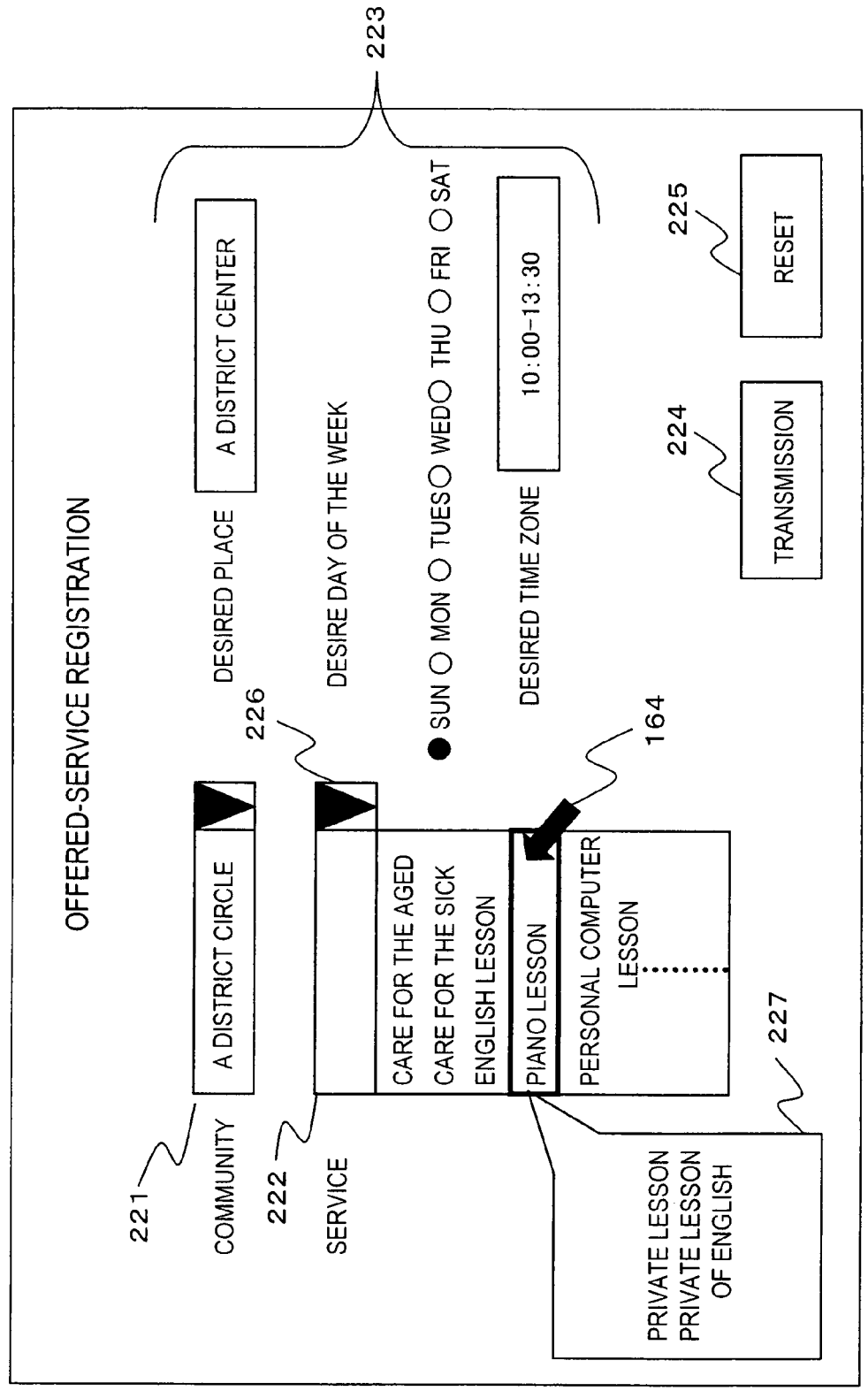
FIG. 22 is a view showing an example of an offered-service registration screen, which is displayed on a terminal that has accessed the community management center 1.

Receiving it, the offered-service registration processing unit 123 displays an offered-service registration screen as shown in FIG. 22 on the display unit of the access terminal through the communication unit 11 (S1906). The offered-service registration screen is for receiving input of pieces of information to be registered in the service provider management database 135.

The offered-service registration screen shown in FIG. 22 is provided with input columns 221, 222 and 223 for inputting a community name 1311*b*, a service name 1312*c*, and desired terms 135*b*, and the community ID 1311*a* of the inputted community name 1311*b*, the service ID 1312*a* of the inputted service name 1312*c*, and the desired terms 135*b* are to be registered in the service provider management database 135. The input column 221 takes the form of pull-down menu similarly to the input column 181 shown in FIG. 18. Also, the input column 222 takes the form of pull-down menu. When a pull-down button 226 is selected by moving a cursor 164, then a list of service names 1312*c* registered in the service information management table 1312 of the community/service management database 131 is displayed. Each service name 1312*c* in this pull-down menu is linked to the corresponding service classification 1312*b* and service explanation 1312*d*, such that, when the cursor 164 is moved on a desired service name 1312*c*, a display frame 227 for presenting the corresponding service classification 1312*b* and service explanation 1312*c* is displayed. When the user of the access terminal inputs appropriate information into these input columns 221-223 using the input device such as the keyboard, pointing device, etc., and selects a transmission button 224, then, the inputted information is notified to the offered-service registration processing unit 123 through the network 4 and the communication unit 11. Here, when a reset button 225 is selected, the information inputted into the input columns 221-223 is cleared.

Receiving these pieces of information (S1907), the offered-service registration processing unit 123 specifies the community ID 1311*a* and service ID 1312*a* corresponding to the community name 1311*b* and service name 1312*c* notified. Then, the specified community ID 1311*a* and service ID 1312*a*, the notified desired terms 135*b*, and the participant ID 133*a* of the user of the access terminal, which is received from the login processing unit 122, are registered in the service provider management database 135, being added with a unique offered-service ID 135*a* (S1908). At that time, also the registration date 135*c* is registered in addition. Then, a message confirming this is displayed on the display unit of the access terminal.

In the case that the communication unit 11 detects selection of the item 214 for browsing the offered-service information and application-for-use information, in the participant menu screen shown in FIG. 21, the communication unit 11 obtains the participant ID 133*a* of the user of the access terminal from the login processing unit 122. Then, the communication unit 11 obtains the offered-service information and application-for-use information registered in association with the obtained participant ID 133*a* in the service provider management database 135 and the service receiver management database 136, respectively, and notifies the obtained contents to the access terminal.

Next, the application-for-use registration processing (S2005-S2006 in FIG. 2) will be described.

Figure 23:
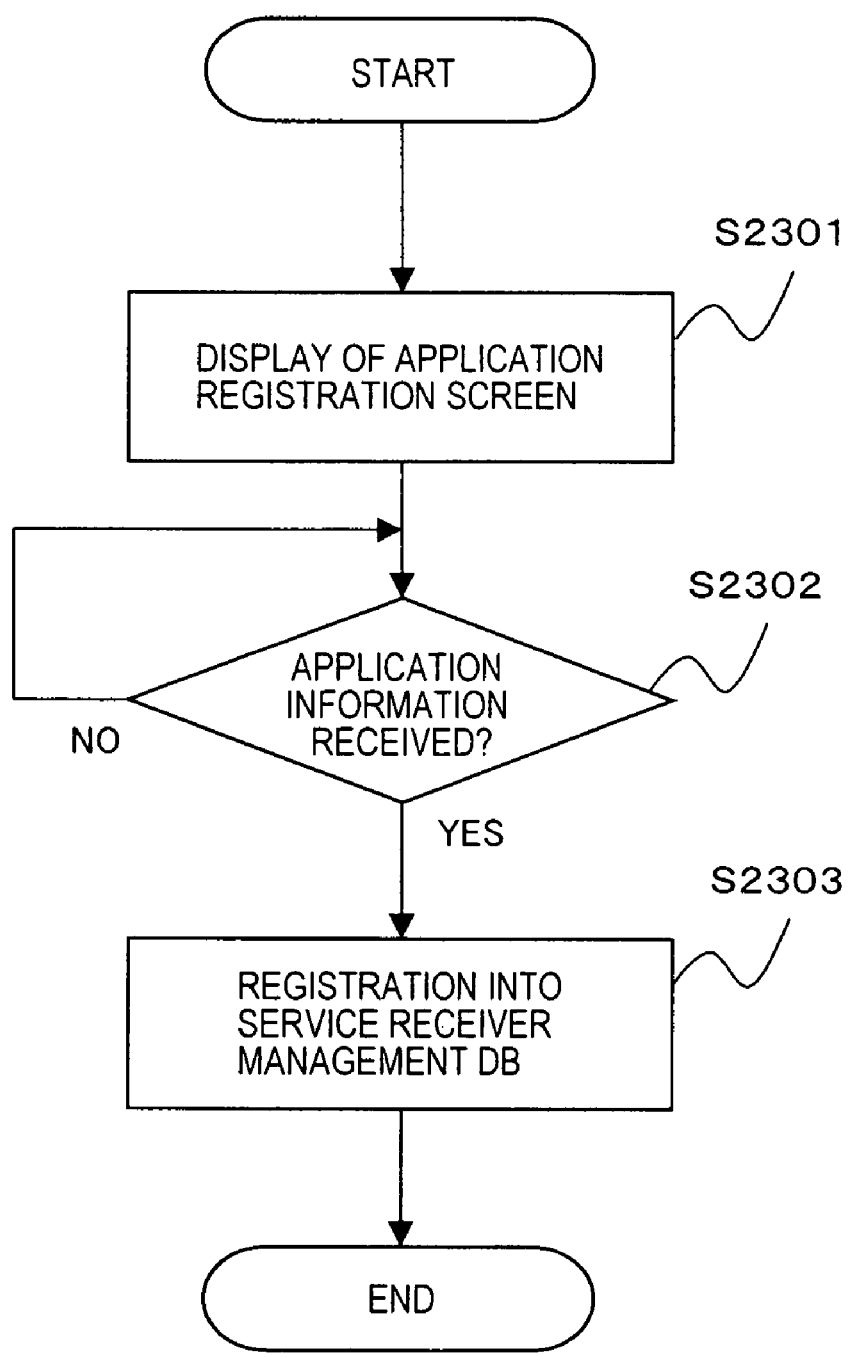
FIG. 23 is a chart for explaining processing of registration of an application for use in the first embodiment of the present invention.

FIG. 23 is a chart for explaining the application-for-use registration processing.

This flow is started when a user of an access terminal selects the item 212 for registration of an application for use, in the participant menu screen as shown in FIG. 21.

First, when the communication unit 11 detects the selection of the item 212 for registration of an application for use, then, the communication unit 11 obtains the participant ID 133*a* of the user of the access terminal from the login processing unit 122, and transmits the obtained participant ID 133*a* to the application-for-use registration processing unit 124.

Figure 24:
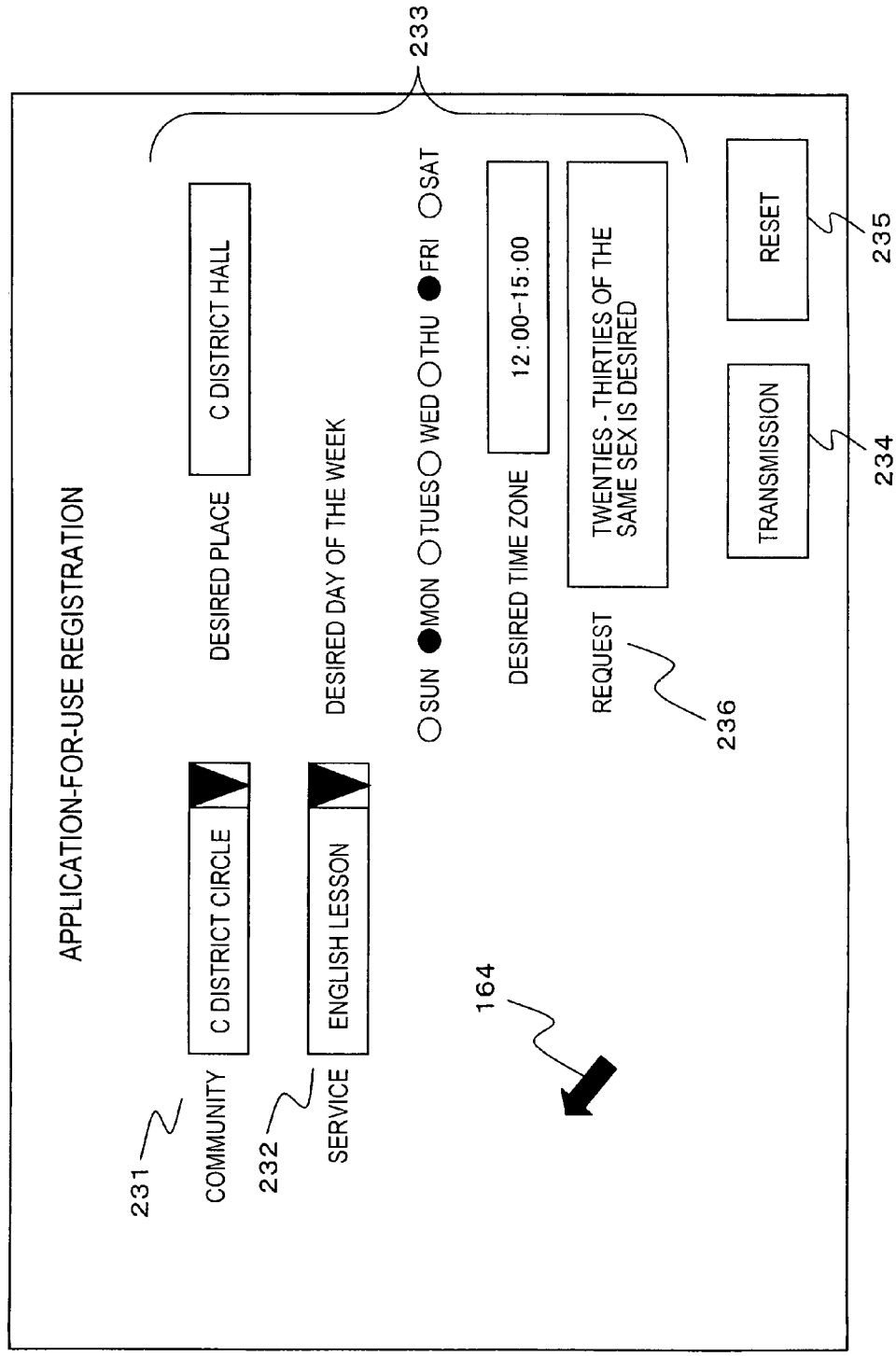
FIG. 24 is a view showing an example of an application-for-use registration screen, which is displayed on a terminal that has accessed the community management center 1.

Receiving it, the application-for-use registration processing unit 124 displays an application-for-use registration screen as shown in FIG. 24 on the display unit of the access terminal through the communication unit 11 (S2301). The application-for-use registration screen is for receiving input of pieces of information to be registered in the service receiver management database 136.

The application-for-use registration screen shown in FIG. 24 is provided with input columns 231, 232 and 233 for inputting a community name 1311*b*, a service name 1312*c* and desired terms 136*b*, and the community ID 1311*a* of the inputted community name 1311*b*, the service ID 1312*a* of the inputted service name 1312*c*, and the desired terms 136*b* are to be registered in the service receiver management database 136. The input columns 231 and 232 take the form of pull-down menu similarly to the input columns 221 and 222 shown in FIG. 22. Further, an input column 236 is provided for the user of the access terminal to input a request in receiving the service. The information inputted in this column 236 is treated as an item of the desired terms 136*b*, also. When the user of the access terminal inputs appropriate information into these input columns 231-223 using the input device such as the keyboard, pointing device, etc., and selects a transmission button 234, then, the inputted information is notified to the application-for-use registration processing unit 124 through the network 4 and the communication unit 11. Here, when a reset button 235 is selected, the information inputted into the input columns 231-233 is cleared.

Receiving these pieces of information (S2302), the application-for-use registration processing unit 124 specifies the community ID 1311*a* and service ID 1312*a* corresponding to the community name 1311*b* and service name 1312*c* notified. Then, the specified community ID 1311*a* and service ID 1312*a*, the notified desired terms 136*b*, and the participant ID 133*a* of the user of the access terminal, which is received from the login processing unit 122, are registered in the service receiver management database 136, being added with a unique application-for-use ID 136*a* (S2303). At that time, also the processing state 136*c* (unstarted in this case) and the registration date 136*d* are registered in addition. Then, a message confirming this is displayed on the display unit of the access terminal.

Next, the primary matching plan generation support/registration processing (S2007-S2012 in FIG. 2) will be described.

Figure 25:
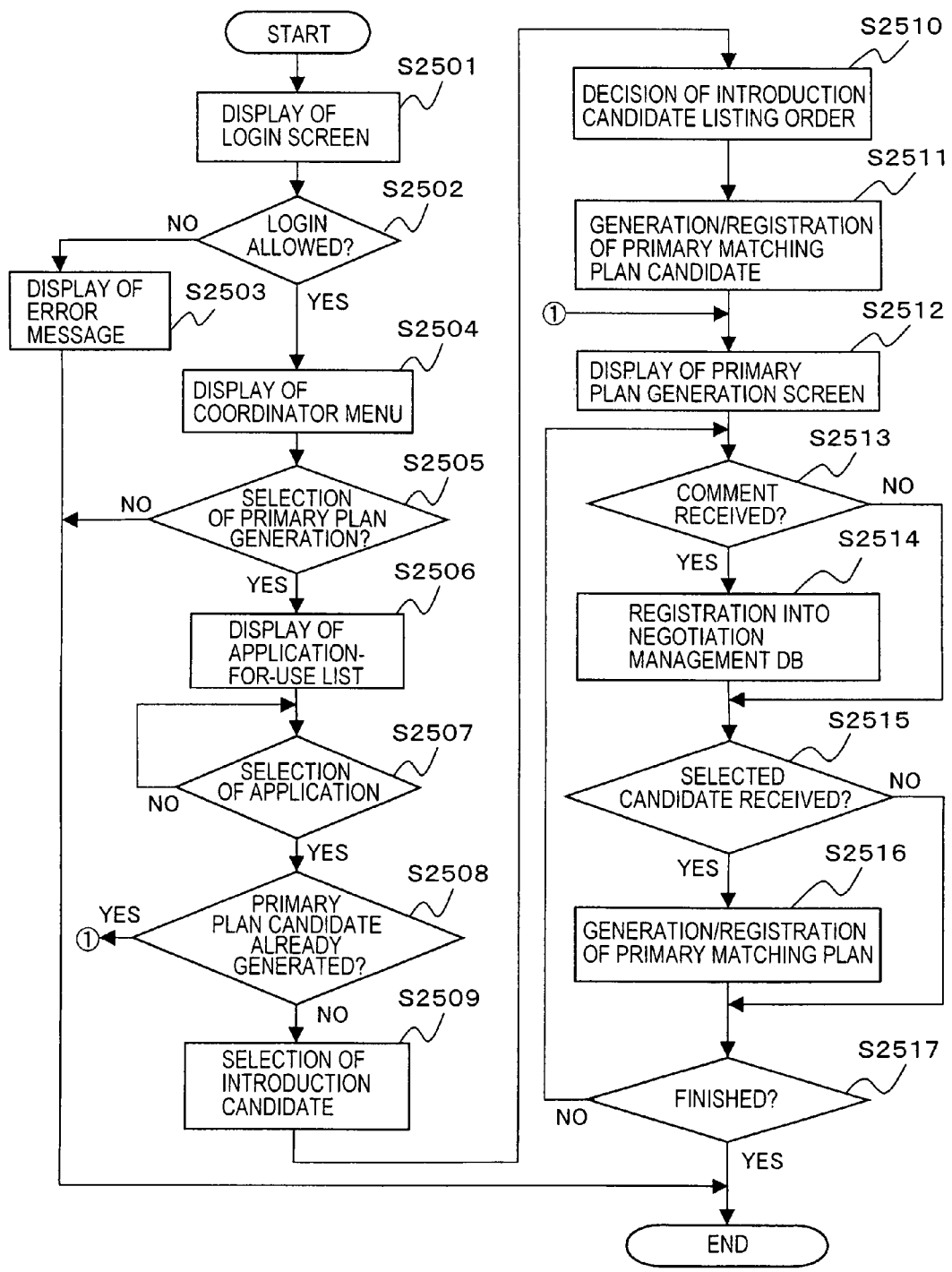
FIG. 25 is a chart for explaining primary matching plan generation support/registration processing in the first embodiment of the present invention.

FIG. 25 is a chart for explaining the primary matching plan generation support/registration processing.

This flow is started when a user of an access terminal selects the item 162 for the coordinator menu, in the start menu screen as shown in FIG. 16.

First, the communication unit 11 notifies the login processing unit 122 that the item 162 for the coordinator menu is selected.

Receiving this notification, the login processing unit 122 displays the login screen, which is for inputting login information, as shown in FIG. 20 on the display unit of the access terminal (S2501), to receive input of the coordinator's login information 132*b* from the user of the access terminal.

Next, the login processing unit 122 examines if the received login information 132*b* has been registered in the coordinator management database 132 (S2502). When the received login information 132*b* is not registered, the login is rejected, and the login processing unit 122 performs error processing such as displaying of an error message on the display unit of the access terminal (S2503). On the other hand, when the received login information is registered, the login processing unit 122 allows the login and displays a coordinator menu screen as shown in FIG. 26 (S2504).

Figure 26:
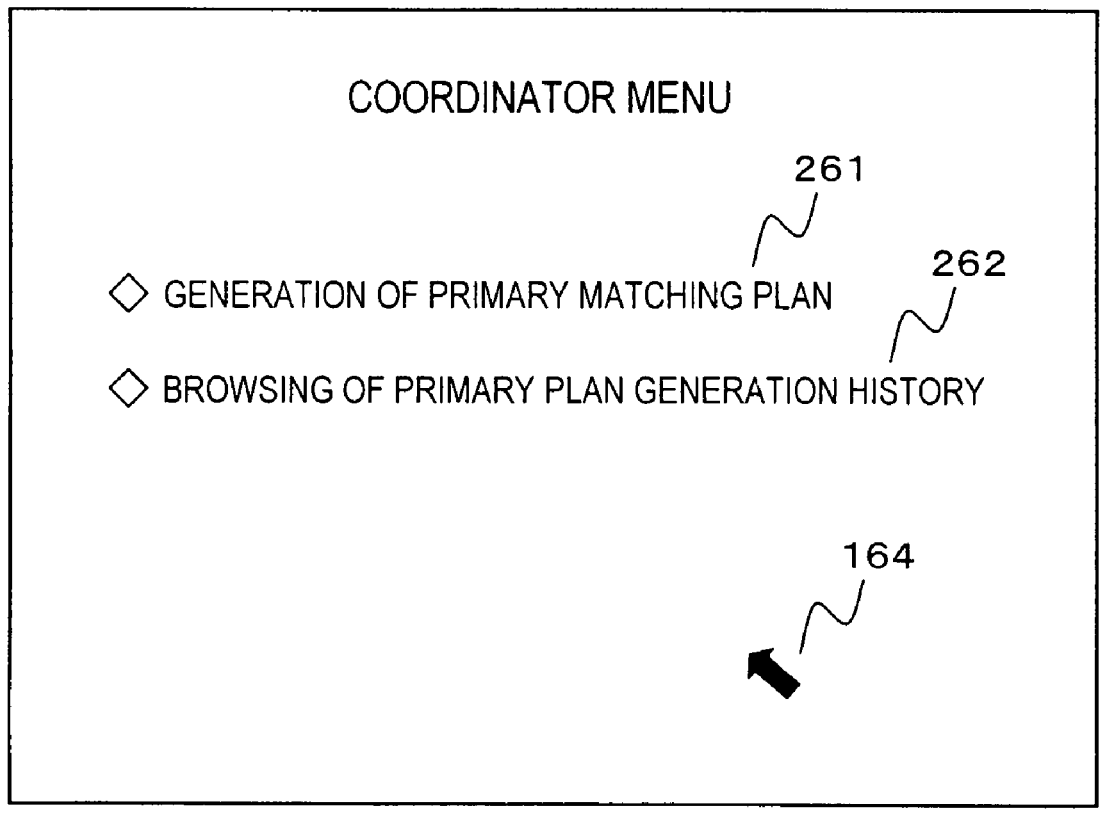
FIG. 26 is a view showing an example of a coordinator menu screen displayed on a terminal that has accessed the community management center 1.

The coordinator menu screen shown in FIG. 26 is provided with an item 261 for generation of a primary matching plan, and an item 262 for browsing the history of the primary matching plan generation performed by the coordinator in the past. The user of the access terminal can select any item by using the input device such as a pointing device to move a cursor. The result of this selection is notified to the login processing unit 122 through the network 4 and the communication unit 11.

When the communication unit 11 detects that the item 261 for generation of a primary matching plan is selected (S2505), then, the communication unit 11 obtains the coordinator ID 132*a* from the login processing unit 122 and transmits it to the primary plan generation/registration processing unit 125.

Receiving it, the primary plan generation/registration processing unit 125 obtains the community ID 1311*a* associated with the coordinator ID 132*a*, which is obtained from the login processing unit 122. The community ID 1311*a* is obtained from the coordinator management database 132. Then, the primary plan generation/registration processing unit 125 searches the service receiver management database 136 for application-for-use. IDs 136*a* for which the corresponding community ID 1311*a* is the obtained one, and the state of processing 163 is "unstarted", "primary plan candidate is already generated", or "reprocessing".

Figure 27:
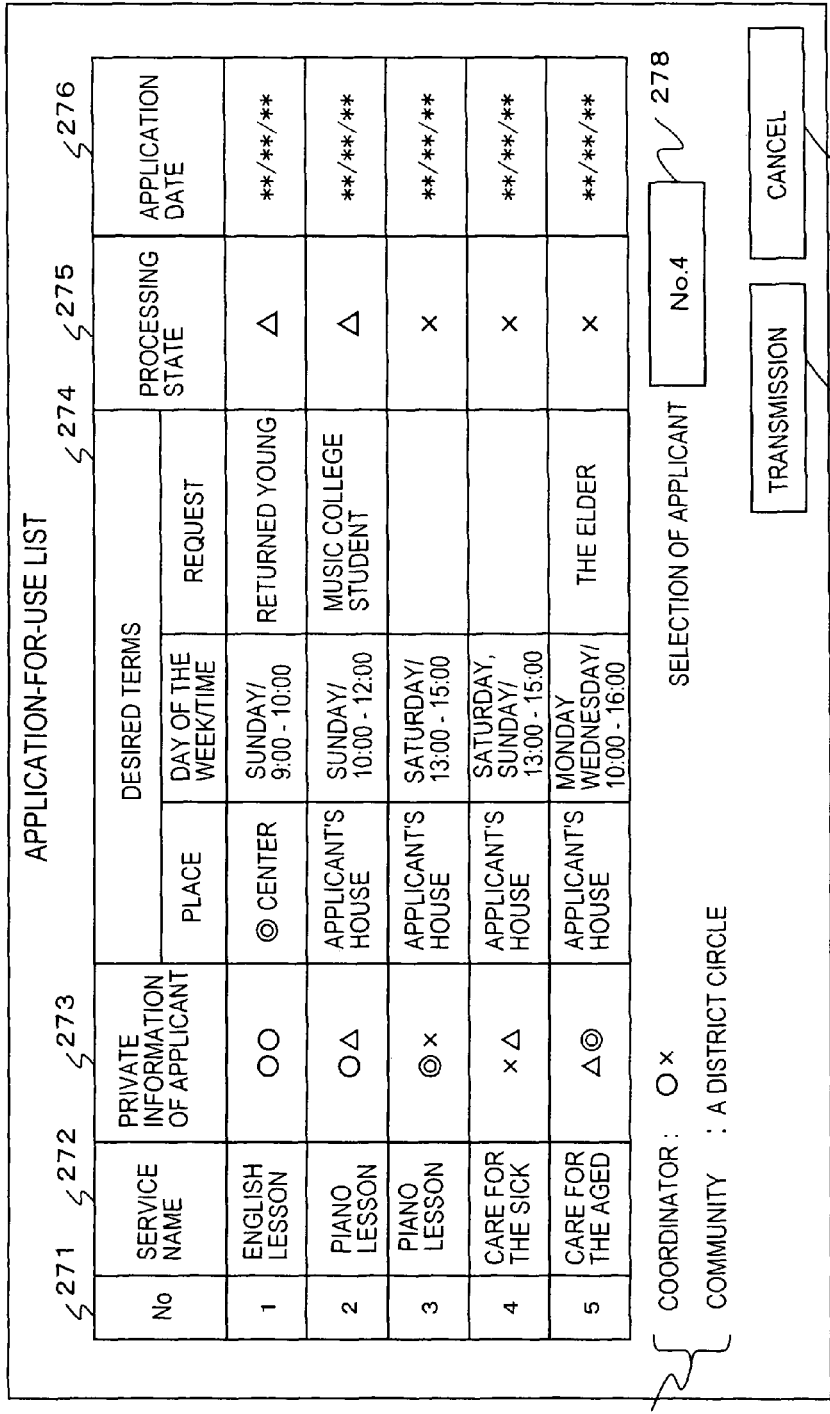
FIG. 27 is a view showing an example of an application-for-use list screen displayed on a terminal that has accessed the community management center 1.

Then, the primary plan generation/registration processing unit 125 displays an application-for-use list screen as shown in FIG. 27 on the display unit of the access terminal (S2506). As shown in FIG. 27, the application-for-use list screen includes a list of pieces of information on respective applicants for use (service receivers) associated with the detected application-for-use IDs 136.

In the application-for-use list screen shown in FIG. 27, the reference numeral 272 refers to a service name of a volunteer service that a service receiver wishes to enjoy. Such service names are specified by extracting the service IDs 1312*a* associated with the detected application-for-use IDs 136*a* from the service receiver management database 136, and further, by extracting the service names 1312*c* associated with the extracted service IDs 1312*a* from the service information management datable 1312 of the community/service management database 131. Further, the reference numeral 273 refers to private information including a name, address, contact address (telephone number and mail address) etc. of a service receiver. Such private information is specified by extracting the participant IDs 133*a* associated with the above-mentioned detected application-for-use IDs 136*a* from the service receiver management database 136, and further, by extracting the private information 133*c* associated with the extracted participant IDs 133*a* from the participant management database 133. Further, the reference numeral 274 refers to desired terms when a service receiver receives a service. Such desired terms are specified by extracting the desired terms 136*b* associated with each of the above-mentioned detected application-for-use IDs 136*a* from the service receiver management database 136. Further, the reference numeral 275 refers to a state of coordinator's processing of an application for use. Such processing states are specified by extracting the processing state 136*c* associated with the above-mentioned detected application-for-use IDs 136*a*.

Each of these states of processing is one of "unstarted", "primary plan candidate is already generated" and "reprocessing".

Further, the reference numeral 276 refers to a date when an application for use was made. Such dates are specified by extracting the registration dates 136*c* associated with the above-mentioned detected application-for-use IDs 136*a* from the service receiver management database 136.

In the present embodiment, the primary plan generation/registration processing unit 125 displays the information on the applicants for use in the application-for-use list screen, arranging the information in order of oldness rank of the application dates 276. By this arrangement, the coordinator can easily and visually grasp the cases to be immediately processed.

Further, in the application-for-use list screen shown in FIG. 27, the reference numeral 277 refers to the name of the coordinator as the user of the access terminal and to the name of the community of which the coordinator is in charge. The name of the coordinator is specified by extracting the private information 132*c* associated with the coordinator ID 132*a*, which is received from the login processing unit 122, from the coordinator management database 132. Further, the name of the community is specified by extracting the community ID 1311*a* associated with the above-mentioned coordinator ID 132*a* from the coordinator management database 132, and further, by extracting the community name 1311*b* associated with the extracted community ID 1311*a*, from the community information management table 1311 of the community/service management database 131.

In the application-for-use list screen, the information on each applicant for use is added with a serial number 271. When the user of the access terminal (i.e., the coordinator) inputs a desired serial number 271 into an input column 278 using the input device such as the keyboard, and selects a transmission button 279, then, the inputted serial number 271 is notified to the primary plan generation/registration processing unit 125 through the network 4 and the communication unit 11. Here, when a reset button 280 is selected, the serial number 271 inputted into the input column 278 is cleared.

When the serial number 271 is received (S2507), the primary plan generation/registration processing unit 125 specifies the application-for-use ID 136*a* corresponding to the information on the applicant to whom the serial number in question is given. Then, the primary plan generation/registration processing unit 125 examines if the processing state 136*c* corresponding to that application-for-use ID 136*a* is "primary plan candidate is already generated", in the service receiver management database 136 (S2508): When the state 136*c* is "primary plan candidate is already generated", the flow proceeds to S2512. Otherwise, a primary matching plan candidate for this application-for-use ID 136*a* is generated (S2509-S2511).

Namely, first, the primary plan generation/registration processing unit 125 selects candidates (introduction candidates) for the service provider to be introduced to the service receiver specified by the participant ID 133*a* associated with this application-for-use ID 136*a* (S2509).

In detail, the primary plan generation/registration processing unit 125 extracts each offered-service ID 135*a* of offered-service information that includes the community ID 1311*a* and service ID 1312*a* associated with the above-mentioned application-for-use ID 136*a* in the service receiver management database 136, from the service provider management database 135. Then, the primary plan generation/registration processing unit 125 selects the respective participants specified by the participant IDs 133a associated with the extracted offered-service IDs 135a, in the service provider management database 135. Those participants are selected as introduction candidates.

However, in the case that the processing state 136c is "reprocessing", the primary plan generation/registration processing unit 125 obtains the offered-service ID 135a by searching the primary matching plan management database 138, based on the previous primary plan ID 136e associated with the above-mentioned application-for-use ID 136a in the service receiver management database 136. And, the participant specified by the participant ID 133a associated with the obtained offered-service ID 135a is excluded from the introduction candidates. The processing state 136c of "reprocessing" means that introduction of the service has failed with respect to the participant of the participant ID 133a associated with the offered-service ID 135a specified by the previous primary plan ID 136e. Therefore, the participant of the participant ID 133a associated with the offered-service ID 135a specified by the previous primary plan ID 136e is excluded from the introduction candidates.

Next, the primary plan generation/registration processing unit 125 decides the listing order of each selected introduction candidate, in the introduction candidate list of the primary plan generation screen (S2510).

In detail, for desired terms 135b associated with each offered-service ID 135a extracted from the service provider management database 135, the primary plan generation/registration processing unit 125 examines matched parts between the desired terms 135b in question and the desired terms 136b associated with the above-mentioned application-for-use ID 136a in the service receiver management database 136. And, for the desired terms 135b associated with each offered-service ID 135a, marks are given according to matched parts. For example, when the day of the week specified by the desired terms 135b in question includes the day of the week specified by the desired terms 136b associated with the above-mentioned application-for-use ID 136a, 5 marks are given; when the time zone specified by the desired terms 135b in question includes the time zone specified by the desired terms 136b associated with the above-mentioned application-for-use ID 136a, 3 marks are given; and when the place specified by the desired terms 135b in question includes the place specified by the desired terms 136b associated with the above-mentioned application-for-use ID 136a, 1 mark is given. And, for the desired terms 135b associated with each offered-service ID 135a, the listing order in the introduction candidate list of the primary plan generation screen is decided such that the higher the score of the desired terms 135b in question is, the higher the priority of the corresponding introduction candidate is.

When the listing order of each selected introduction candidate in the introduction candidate list of the primary plan generation screen is decided as described above, the primary plan generation/registration processing unit 125 registers a primary matching plan candidate that includes: the coordinator ID 132a of the user of the access terminal, which is notified from the login processing unit 122; the application-for-use ID 136a specified from the serial number 271 notified from the access terminal; and the offered-service ID candidate list 137b that describes the offered-service IDs 135a extracted from the service provider management database 135, in the descending order of priority; into the primary matching plan candidate management database 137, adding a unique primary plan candidate ID 137a. At that time, also the registration date 137c is registered in addition (S2511). Further, this primary plan candidate ID 137a and the coordinator ID 132a are registered into the negotiation management database 139. Furthermore, in the service receiver management database 136, the processing state corresponding to the application-for-use ID 136a included in the generated primary matching plan candidate is changed from "unstarted" or "reprocessing" to "primary matching plan candidate is already generated".

Figure 28:
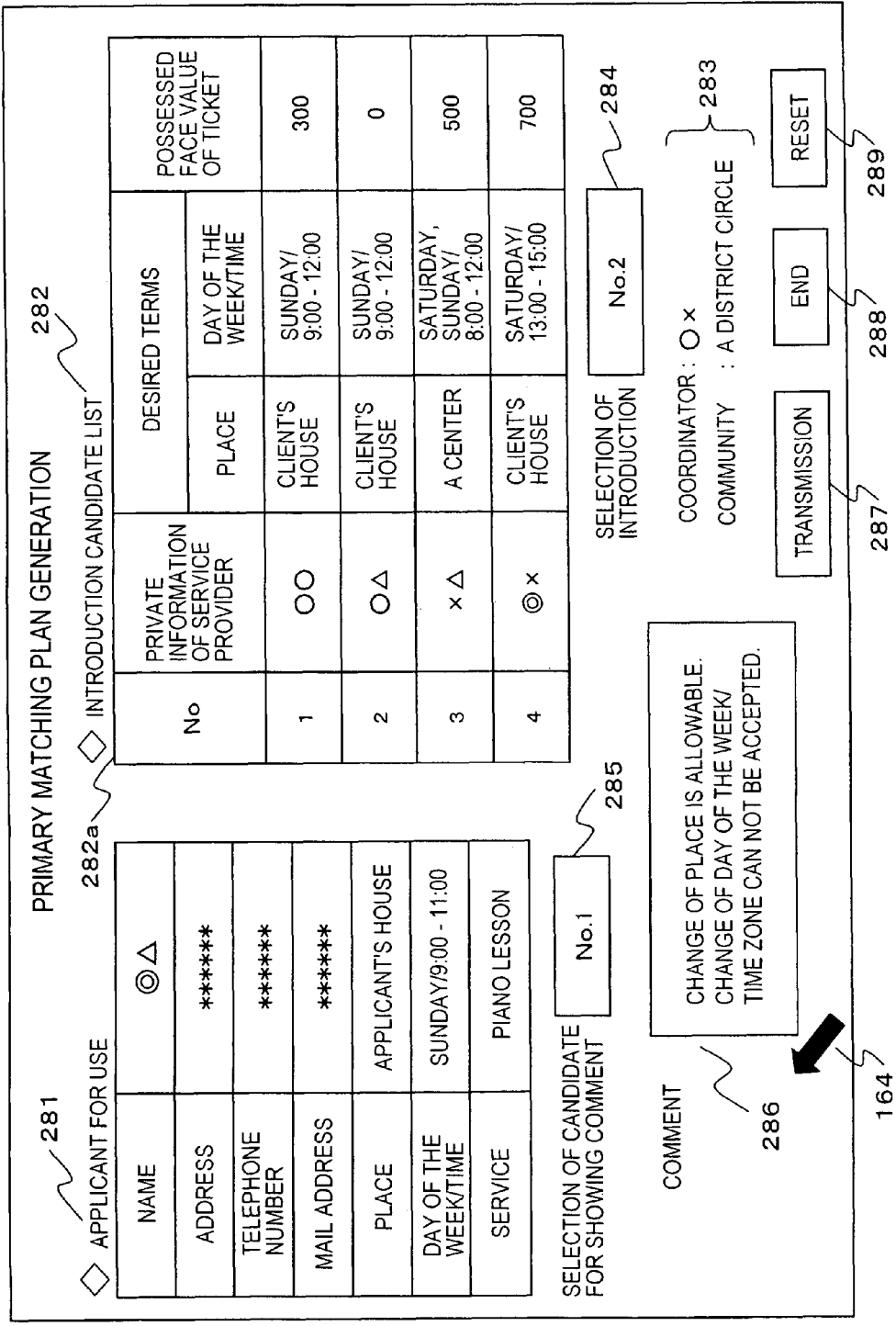
FIG. 28 is a view showing an example of a primary plan generation screen displayed on a terminal that has accessed the community management center 1.

Now, in the step S2512, the primary plan generation/registration processing unit 125 extracts the primary matching plan candidate that includes the application-for-use ID 136a specified by the serial number 271 notified from the access terminal in S2507, from the primary matching plan candidate management database 137, and displays the primary plan generation screen as shown in FIG. 28 on the display unit of the access terminal, based on the extracted primary matching plan candidate.

In the primary plan generation screen shown in FIG. 28, the reference numeral 281 refers to pieces of information (applicant-for-use information) on the applicant, who is specified by the application-for-use ID 136a in the extracted primary matching plan candidate. The private information of the applicant for use, such as his name, address and contact address, is specified by extracting the participant ID 133a associated with this application-for-use ID 136a from the service receiver management database 136, and further, by extracting the private information 133c associated with the extracted participant ID 133a from the participant management database 133. Further, the desired terms, such as the place and the day of the week/time zone, in receiving the service are specified by extracting the desired terms 136b associated with this application-for-use ID 136a from the service receiver management database 136. Further, the name of the volunteer service that the applicant wishes to receive is specified by extracting the service ID 1312a associated with this application-for-use ID 136a from the service receiver management database 136, and further, by extracting the service name 1312c associated with the extracted service ID 1312a from the service information management table 1312 of the community/service management database 131.

Here, in the primary plan generation screen, the information 281 on the applicant for use is linked to the comments and evaluation information concerning the applicant in question, such that, when a cursor 164 is moved on the information 281 of the applicant, the comments and evaluation information concerning the applicant in question are displayed in a balloon, for example similarly to the display frame 227 shown in FIG. 22. These comments and evaluation information are specified by extracting the participant ID 133a associated with the application-for-use ID 136a of the applicant for use, from the service receiver management database 136, and further, by extracting the comments 139a and evaluation information 140d associated with the extracted participant ID 133a from the negotiation management database 139 and the result management database 140, respectively.

Further, the reference numeral 282 refers to the pieces of information on each introduction candidate (introduction candidate list) specified by the offered-service ID 135a described in the offered-service ID candidate list 137b of the extracted primary matching plan candidate. The information 282 on each introduction candidate is displayed in the listing order of the offered-service IDs 135a in the offered-service ID candidate list 137b. Here, the private information, such as the name, address and contact address, on each introduction candidate and his possessed face value of ticket are specified by extracting the participant ID 133a associated with the offered-service ID 135a in question from the service provider management database 135, and further, by extracting the private information 133c and possessed face value of ticket 133d associated with the extracted participant ID 133a, from the participant management database 133. Further, desired terms, such as a place and the day of the week/time zone, in providing the service are specified by extracting the desired terms 135b associated with the offered-service ID 135a concerned, from the service provider management database 135.

Here, in the primary plan generation screen, also the information 282 on each introduction candidate is linked to the comments and evaluation information concerning the introduction candidate in question, similarly to the information 281 on the applicant for use, such that, when the cursor 164 is moved on the information 282 of any introduction candidate, the comments and evaluation information concerning the introduction candidate in question are displayed in a balloon, for example similarly to the display frame 227 shown in FIG. 22. These comments and evaluation information are specified by extracting the participant ID 133a associated with the offered-service ID 135a of the introduction candidate in question, from the service provider management database 135, and further, by extracting the comments 139a and evaluation information 140d associated with the extracted participant ID 133a from the negotiation management database 139 and the result management database 140, respectively.

Further, the reference numeral 283 refers to the name of the coordinator as the user of the access terminal and the name of the community of which the coordinator is in charge. The name of the coordinator is specified by extracting the private information 132c associated with the coordinator ID 132a, which is received from the login processing unit 122, from the coordinator management database 132. Further, the name of the community is specified by extracting the community ID 131a associated with the above-mentioned coordinator ID 132a from the coordinator management database 132, and further, by extracting the community name 1311b corresponding to the extracted community ID 1311a from the community information management table 1311 of the community/service management database 131.

In the primary plan generation screen, the information 282 of each introduction candidate is added with a serial number 282a. When the user of the access terminal (i.e., the coordinator) inputs a desired serial number 282a into an input column 284 for selection of a service provider, using the input device such as the keyboard, and selects a transmission button 287, then, the inputted serial number 282a is notified to the primary plan generation/registration processing unit 125 through the network 4 and the communication unit 11.

Further, when the coordinator inputs a serial number 282a of an introduction candidate for whom it is desired to add a comment, into an input column 285, inputs a comment on the introduction candidate in question into an input column 286, and selects the transmission button 287, then the inputted serial number 282a and the comment are notified to the primary plan generation/registration processing unit 125 through the network 4 and the communication unit 11.

Here, when a reset button 289 is selected, pieces of information inputted into the input columns 284-286 are cleared. Further, when an end button 288 is selected, an ending instruction is notified to the primary plan generation/registration processing unit 125 through the network 4 and the communication unit 11.

In the primary plan generation screen shown in FIG. 28, as the information 282 for each introduction candidate, are used the private information 133c and the possessed face value of ticket 133d registered in the service provider management database 135. However, the present invention is not limited to this. For example, a service receiving history and a service providing history (service history) may be registered instead of, or together with, the possessed face value of ticket 133d, so that the service history and/or a result of analysis of the service history may be added to the information of each introduction candidate. This service history may be registered as follows, for example. Namely, when a result registration processing unit 126 described below registers a result corresponding to a primary matching plan into the result management database 140, the application-for-use ID 136a and the offered-service ID 135a registered in association with the primary plan ID 138a of the primary matching plan in question in the primary matching plan management database 138 are extracted. Then, the application-for-use information (service ID 1312a, community ID 1311a, desired terms 136b, etc.) registered in association with the extracted application-for-use ID 136a in the service receiver management DB 136 is registered as the service receiving history in the service provider management database 135, being associated with the participant ID 133a included in the application-for-use information in question. And, at the same time, the offered-service information (service ID 1312a, community ID 1311a, desired terms 136b, etc) registered in association with the extracted offered-service ID 135a in the service provider management database 135 is registered as the service providing history in the service provider management database 135, being associated with the participant ID 133a included in the offered-service information in question.

Further, by displaying a result of analyzing a service providing history (for example, a rate of satisfying application-for-use is increasing or not in the course of time) on the primary plan generation screen, improvement of the quality of generation of a primary plan is expected.

Using thus-described primary plan generation screen, the coordinator as the user of the access terminal can select the service provider to be introduced to the service receiver, who is specified by the information 281 on the applicant in the primary plan generation screen, out of the introduction candidates each specified by the information 282 of each introduction candidate in the primary plan generation screen. Then, the coordinator can notify the community management center 1 of the selected introduction candidate, using the input column 284 and the transmission button 287.

Further, by communicating with the contact address included in the information 282 on each introduction candidate in the primary plan generation screen by telephone or E-mail, the coordinator can make a negotiation with the introduction candidate in question with respect to his service providing. When there exists a request or noted point from an introduction candidate, then, the coordinator can notify the community management center 1 of an explanation of such a request or noted point from the introduction candidate in question, using the input columns 285, 286 and the transmission button 287.

Receiving the serial number and the explanation of the noted point inputted in the input columns 285 and 286 (Yes in S2513), the primary plan generation/registration processing unit 125 specifies the offered-service ID 135a corresponding to the serial number 282a, and extracts the participant ID 133a associated with the specified offered-service ID 135a, from the service provider management database 135. Then, the extracted participant ID 133a and the comment 139a including the received explanation are registered in the negotiation management database 139, being associated with the primary plan candidate ID 137a of the primary matching plan candidate on which the primary plan generation screen has been based (S2514).

Further, when the primary plan generation/registration processing unit 125 receives the serial number 282a inputted in the input column 284 (Yes in S2515), then the primary plan generation/registration processing unit 125 specifies the offered-service ID 135a corresponding to this serial number 282a. Then, the primary plan generation/registration processing unit 125 registers a primary matching plan that includes the specified offered-service ID 135a, the primary plan candidate ID 137a of the primary matching plan candidate on which the primary plan generation screen has been based, the application-for-use ID 136a, and the coordinator ID 132a, into the primary matching plan management database 138, adding a unique primary plan ID 138a to that primary matching plan. At that time, the registration date 138b is registered in addition, and the content of matching 138c is set to "undetermined" (S2516). Further, this primary plan ID 137a is registered into the negotiation management database 139, being associated with the primary plan candidate ID 137a of the primary matching plan candidate. Further, in the service receiver management database 136, the processing state 136c corresponding to the application-for-use ID 136a included in the primary matching plan candidate is changed from "primary matching plan candidate is already generated" to "primary matching plan is already generated".

Then, when the access terminal notifies the primary plan generation/registration processing unit 125 that the end button 288 is selected in the primary plan generation screen (Yes in S2517), then, the primary plan generation/registration processing unit 125 ends the display of the primary plan generation screen on the access terminal in question.

Next, the processing of presentation of a primary matching plan and registration of a report of a result (S2013-S2016 in FIG. 2) will be described.

Figure 29:
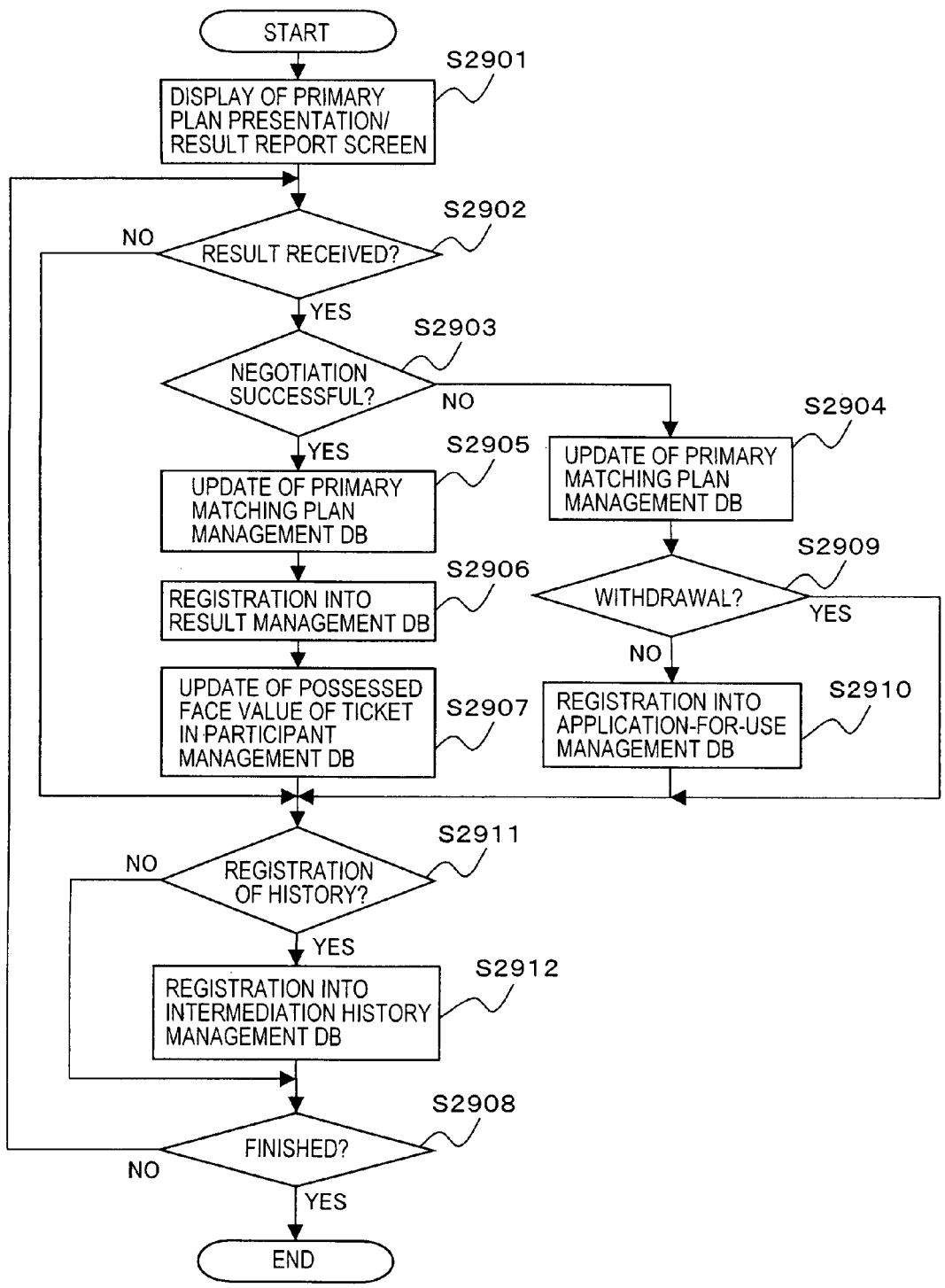
FIG. 29 is a chart for explaining processing of presentation of a primary matching plan and registration of a report of a result in the first embodiment of the present invention.

FIG. 29 is a chart for explaining processing of presentation of a primary matching plan and registration of a report of a result.

This flow is started when a user of an access terminal selects the item 213 for referring to a primary matching plan and for reporting a result, in the participant menu screen as shown in FIG. 21.

First, the communication unit 11 detects the selection of the item 213 for referring to a primary matching plan and for reporting a result, then, the participant ID 133a of the user of the access terminal is transmitted from the login processing unit 122 to the result registration processing unit 126.

Receiving it, the result registration processing unit 126 extracts the application-for-use ID 136a associated with the notified participant ID 133a, from the service receiver management database 136. And, the result registration processing unit 126 extracts the primary matching plan that includes the above-mentioned extracted application-for-use ID 136a and has the content of matching 138c of "undetermined", from the primary matching plan management database 138. Then, the result registration processing unit 126 generates a primary matching plan/result report screen as shown in FIG. 30, based on the extracted primary matching plan, and displays the generated screen on the display unit of the access terminal through the communication unit 11 (S2901).

Figure 30:
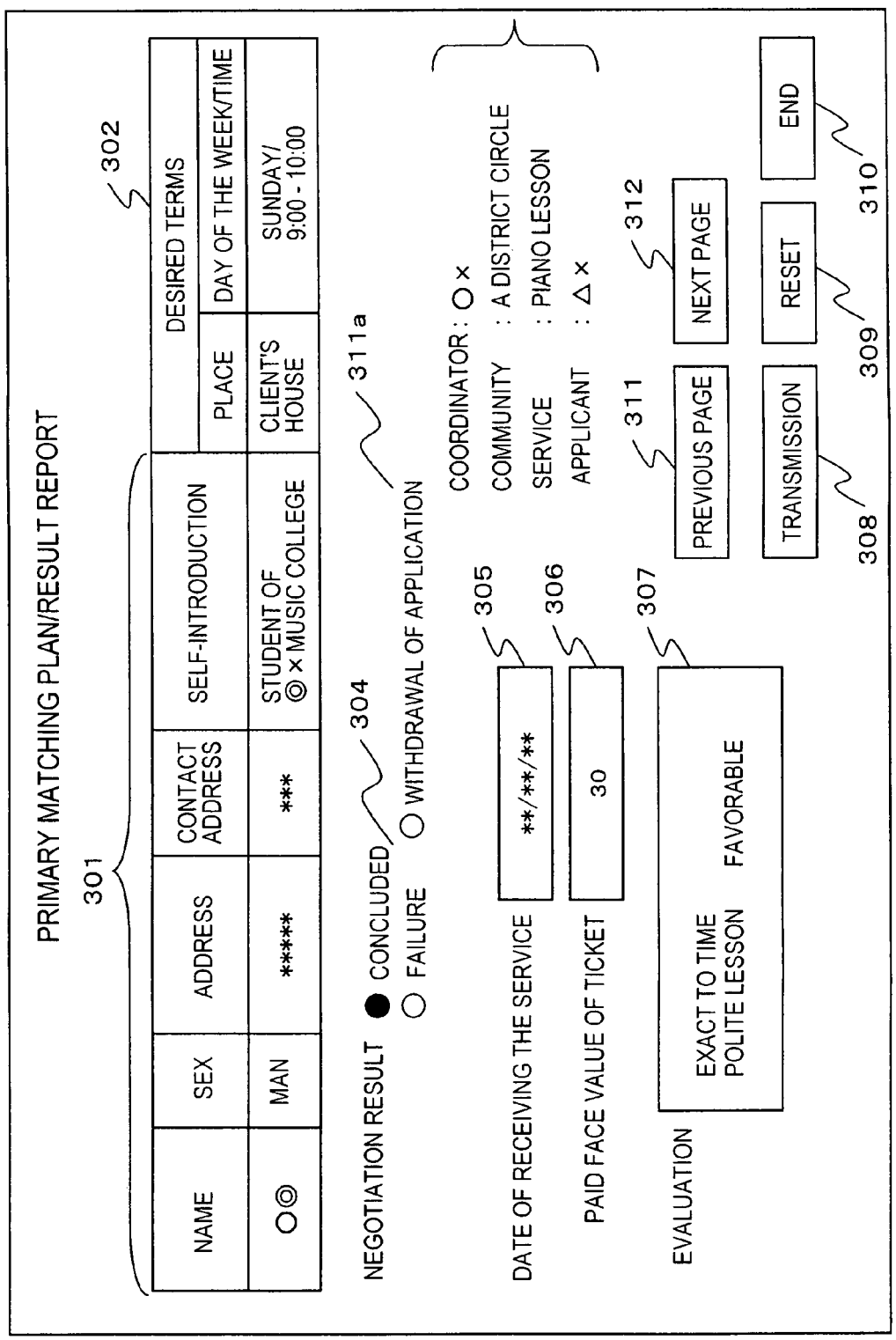
FIG. 30 is a view showing an example of a primary matching plan/result report screen displayed on a terminal that has accessed the community management center 1.

In the primary matching plan/result report screen shown in FIG. 30, the reference numeral 301 refers to the private information of the service provider specified by the offered-service ID 135a in the extracted primary matching plan. The private information is specified by extracting the participant ID 133a associated with the offered-service ID 135a from the service provider management database 135, and further, by extracting the private information 133c associated with the extracted participant ID 133a from the participant management database 133. The reference numeral 302 refers to the terms desired by this service provider in providing the service. The desired terms are specified by extracting the desired terms 135b associated with the offered-service ID 135a from the service provider management database 135.

Further, the reference numeral 303 refers to the name of the coordinator specified by the coordinator ID 132a in the extracted primary matching plan, to the name of the community of which the coordinator in question is in charge, to the name of the applicant for use specified by the application-for-use ID 136a in the extracted primary matching plan, and to the name of the volunteer service that the applicant in question wishes to enjoy. The coordinators name is specified by extracting the private information 132c associated with the coordinator ID 132a from the coordinator management database 132. The community name is specified by extracting the community ID 1311a associated with the coordinator ID 132a from the coordinator management database 132, and further, by extracting the community name 1311b associated with the extracted community ID 1311a from the community information management table 1311 of the community/service management database 131. The name of the applicant is specified by extracting the participant ID 133a associated with the application-for-use ID 1361 from the service receiver management database 136, and further, by extracting the private information 133c associated with the extracted participant ID 133a from the participant management database 133. And, the name of the volunteer service is specified by extracting the service ID 1312a associated with the application-for-use ID 136a from the service receiver management database 136, and further, by extracting the service name 1312c associated with the extracted service ID 1312a from the service information management table 1312 of the community/service management database 131.

Further, the reference numeral 304 refers to a button for selecting a success or failure of the negotiation for receiving the service, with the service provider specified by the private information 304 and desired terms 302. The reference numeral 305 refers to an input column for inputting a date when the service is received from the service provider, in the case that the above-mentioned negotiation is concluded. The reference numeral 306 refers to an input column for inputting a face value of ticket paid for receiving the service. And, the reference numeral 307 refers to an input column for entering an evaluation on the received service.

Using thus-described primary matching plan/result report screen, the service receiver (applicant for use) as the user of the access terminal can make a negotiation for receiving the service with the service provider, by communicating with the contact address included in the private information 301 of the service provider introduced by the coordinator, for example. When the negotiation results in failure, the content of "failure" of the negotiation result button 304 is checked, and a transmission button 308 is selected, to notify the community management center 1 of the failed result, as a result report. On the other hand, when the negotiation is concluded and the service is received, then, the content of "success" of the result button 304 is checked, the date of receiving the service, the paid face value of ticket, and an evaluation on the received service are inputted into the input columns 305-307, respectively, and the transmission button 308 is selected, to notify the community management center 1 of the successful result and the information inputted into the input columns 305-307, as a result report. Here, when a reset button 309 is selected, then, the checked content of the negotiation result button 304 and the information inputted into the input columns 305-307 are cleared. Further, when an end button 310 is selected, an ending instruction is notified to the community management center 1.

In the case that there exist a plurality of primary matching plans extracted, it is appropriate that the result registration processing unit 126 generates a primary matching plan/result report screen as shown in FIG. 30 for each primary matching plan, and makes the service receiver as the user of the access terminal select a primary matching plan/result report screen to be displayed on the display unit of the access terminal concerned, using a previous page button 311 and a next page button 312.

Now, when the result registration processing unit 126 receives the result report from the access terminal that has displayed the primary matching plan/result report screen, through the communication unit 11 (S2902), the result registration processing unit 126 registers the content of the result report into the primary matching plan management database 138 and into the result management database 140.

In detail, when the result report from the access terminal shows the failure of the negotiation (No in S2903), then, in the primary matching plan management database 138, the content of matching 138c of the primary matching plan corresponding to the primary matching plan/result report screen being displayed on the access terminal is changed to "NG", and the present time is registered as the date of matching 138d (S2904).

Here, when an application withdrawal 311a is not checked (S2909), then, the following items corresponding to the application-for-use ID 136a of this primary matching plan are obtained from the service receiver management database 136. Namely, the participant ID 133a of the service receiver, the service ID 1312a of the volunteer service that the service receiver wishes to receive, the community ID 1311a of the community in which the service volunteer wishes to receive the above-mentioned volunteer service, the desired terms 136b in receiving the service, including the desired place and desired day of the week/time zone (or date), and the registration date 136 of the application-for-use information are obtained from the service receiver management database 136. Then, these obtained contents are registered in the service receiver management database 136 again, being added with a new unique application-for-use ID 136a. At that time, in the service receiver management database 136, the processing state 136c is set to "reprocessing", and the primary plan ID 138a is registered as the previous primary plan ID 136e (S2910).

On the other hand, when the result report shows the success of the negotiation (Yes in S2903), then, in the primary matching plan management database 138, the content of matching 138c of the primary matching plan corresponding to the primary matching plan/result report screen being displayed on the access terminal is changed to "OK", and the present time is registered as the date of matching 138d (S2905). Next, the result is registered into the result management database 140, being added with a unique execution ID (S2906). The mentioned result includes: the primary plan ID 138a of the above-mentioned primary matching plan; the paid face value of ticket 140c, the evaluation information 140d and the date of receiving the service (execution date) 140, included in the result report; and the participant ID 133a of the above-mentioned service provider. Then, in the participant management database 133, the paid face value of ticket 140c is added to the possessed face value of ticket 133d corresponding to the participant ID 133a of the above-mentioned service provider, and the paid face value of ticket 140c in question is subtracted from the possessed face value of ticket 133d corresponding to the participant ID 133a of the user of the access terminal (the service receiver) (S2907).

Here, in the case of successful negotiation or application withdrawal (S2911), the records relating to the primary matching plan ID of the primary matching plan in question are obtained from the primary matching plan management database 138, the primary matching plan candidate management database 137, the result management database 140, and the negotiation management database 149, and, the primary matching plan, the primary matching plan candidate, the result, and the negotiation history are copied as an intermediation history, to the intermediation history management database 141 (S2912). At that time, in order to prevent alteration by an operator of the community management center 1, it is appropriate that, for example, a signature key (which can be known only to the administrator or the like of the community management center 1, who has predetermined authority) held in secret by the community management center 1 is used to sign the above-mentioned intermediation history, before copying to the intermediation history management database 141. Further, the copied records may be deleted from the primary matching plan management database 138, the primary matching plan candidate management database 137, the result management database 140, and the negotiation management database 149, to leave a disk space.

Then, when the selection of the end button 310 in the primary matching plan/result report screen is notified from the access terminal (Yes in S2908), then the result registration processing unit 126 ends the display of the primary matching plan/result report screen on the access terminal in question.

Next, processing by an activity monitoring unit 127 of the community management center 1 will be described.

The processing of the activity monitoring unit 127 is classified into processing performed at the request of a coordinator for outputting a history of generating primary matching plans generated by the coordinator in question, and processing of outputting a history of generating primary matching plans generated by a coordinator designated by the administrator of the community management center 1.

First, will be described the processing performed at the request of a coordinator for outputting a history of generating primary matching plans generated by the coordinator in question.

Figure 31:
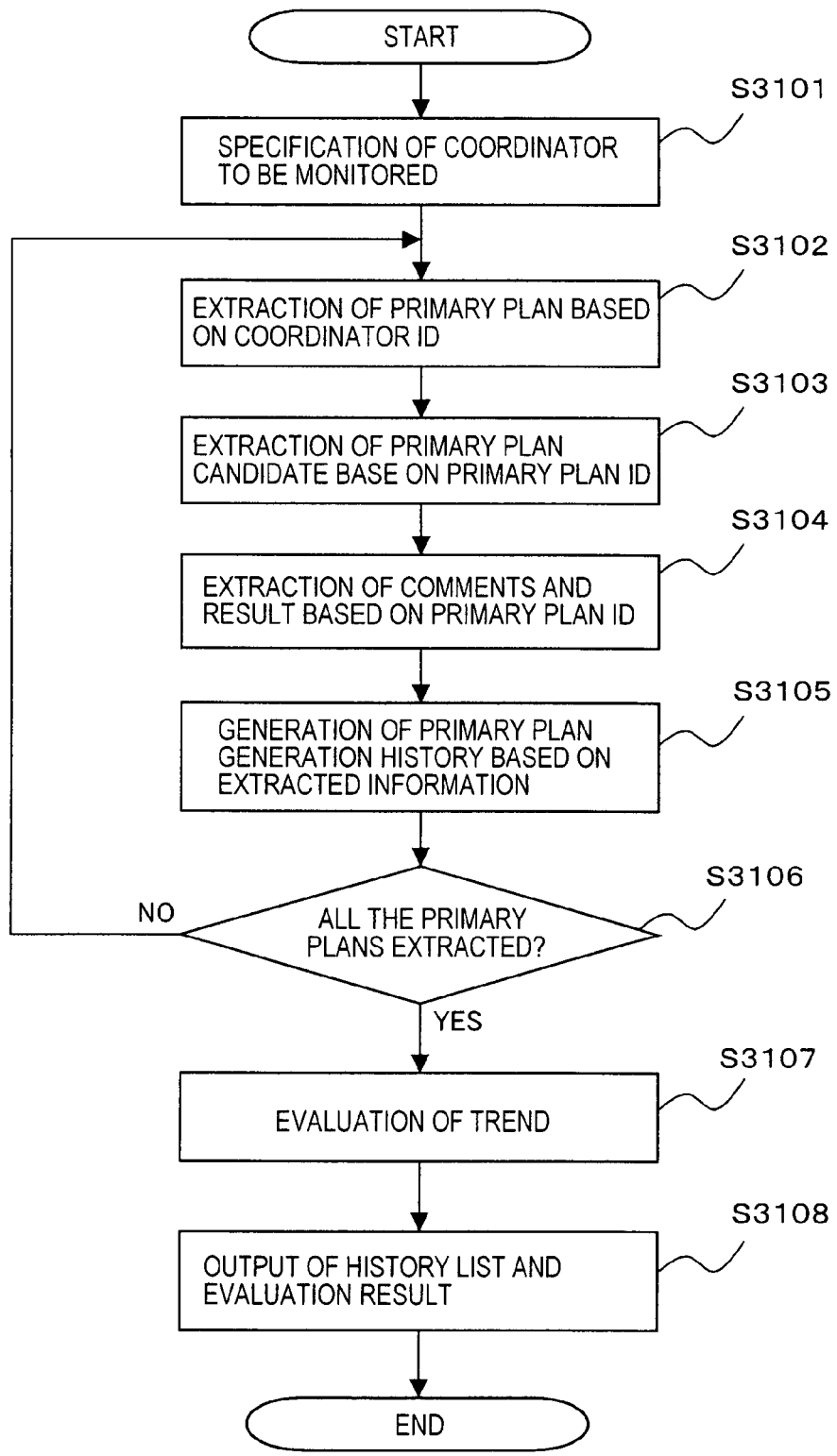
FIG. 31 is a chart for explaining processing performed by an activity monitoring unit 127 in the first embodiment of the present invention.

FIG. 31 is a chart for explaining processing that is performed at the request of a coordinator for outputting the history of generating the primary matching plans generated by the coordinator in question.

This flow is started when a user of an access terminal selects the item 262 for browsing the history of generating the primary matching plans, in the coordinator menu screen as shown in FIG. 26.

First, the login processing unit 122 notifies the activity monitoring unit 127 of the selection of the item 262 for browsing the history of generating the primary matching plans, together with the coordinator ID 132a of the user of the access terminal.

Receiving this notification, the activity monitoring unit 127 extract one of the primary matching plans associated with the notified coordinator ID 132a, from the primary matching plan management database 138 copied to the intermediation history management database 141 (S3102). Next, the activity monitoring unit 127 extracts the primary matching plan candidate associated with the primary plan ID 138a of the extracted primary matching plan, from the primary matching plan candidate management database 137 copied to the intermediation history management database 141 (S3103), and at the same time, extracts the comments and the result associated with the primary plan ID 138*a* in question from the negotiation management database 139 and the result management database 140 copied to the intermediation history management database 141, respectively (S3104).

Then, the activity monitoring unit 127 generates a primary plan generation history, based on the contents of the primary matching plan, the primary matching plan candidate, the comments, and the result extracted in the steps S3102-S3104 (S3105). In detail, with respect to each of the primary matching plan, the primary matching plan candidate, the comments, and the result, when an ID used for management in another management database is included, then, the mentioned "another management database" is examined to specify the information associated with the ID in question. By this, the respective contents of the primary matching plan, the primary matching plan candidate, the comments, and the result are specified, and a primary plan generation history including these specified contents is generated.

When the activity monitoring unit 127 repeats the processing in S3102-S3105 so that the primary plan generation history is generated for every primary matching plan associated with the coordinator ID 132*a* notified from the login processing unit 122 (S3106), then, the activity monitoring unit 127 evaluates if the introductions of service providers concentrate in a certain participant, or not (S3107). For example, for each participant who is described as an introduction candidate in all the primary matching plan candidates extracted in S3103, a ratio between the number of his appearances as an introduction candidate in the primary matching plan candidates and the number of his appearances as a service provider in the primary matching plans is obtained. Then, the ratios obtained respectively for the above-mentioned participants are regarded as the tendency in the coordinators generation of primary plans.

Next, the activity monitoring unit 127 outputs all the primary plan generation histories generated in S3105 and the tendency obtained in S3107 to the output device, such as the display unit or the printer, of the access terminal (S3108).

Next, will be described the processing of outputting a history of generating primary matching plans generated by a coordinator designated by the administrator of the community management center 1.

This processing is fundamentally similar to the processing shown in FIG. 31 except that, in the step S3101, the coordinator ID 132*a* is designated by the administrator of the community management center 1 through the input device such as the keyboard provided in the community management center 1, and that, in the step S3108, all the primary plan generation histories generated in S3105 and the tendency obtained in S3107 are outputted to the output device, such as the display unit or the printer, of the community management center 1.

The community management center 1 may have a learning function. To that end, the community management center 1 may accumulate history data concerning contents of its own processing, and use the accumulated data in later processing. Further, an artificial intelligence technique (including a neuro-technique) may be used for realizing the learning function. To realize a more advanced learning function more easily, it is appropriate to describe the history data with a more formal language such as XML (extensible Markup Language) that can express a data structure of a database in the text form using tags. Further, each terminal may be constructed such that inputted data is stored and compared with later-inputted data to detect false input. In that case, it is possible to employ an arrangement in which key information such as an inputted ID is determined in advance, and the stored data is searched using that key. The data inputting concerned includes at least one of a request for participation registration, a request for offered-service registration, and an application for use.

Hereinabove, the first embodiment of the present invention has been described.

According to the present embodiment, a coordinator can use the primary plan generation screen (see FIG. 28) displayed on the coordinator terminal 2, in order to select the service provider to be introduced to the service receiver who is specified by the information 281 on the applicant displayed in the screen, out of the introduction candidates each specified by the information 282 on that candidate displayed in the screen. Here, the information 282 on each introduction candidate is displays in the descending order of degree of matching between his desired terms and the desired terms included in the information 281 on the applicant for use, helping the coordinator in selecting the service provider to be introduced.

Further, the information 282 on each introduction candidate includes a possessed face value of ticket of that candidate. The ticket used in the present embodiment is aimed at exclusive use as the value for a volunteer service. Thus, when an introduction candidate possesses a small face value of ticket, it means that only a few occasions are given to the introduction candidate for providing his volunteer service, or that he himself has received services as a service receiver to the corresponding degree that he has responded to the occasions given for providing his service.

As described above, in order to activate and facilitate community activities such as volunteer services, it is favorable that occasions for providing services are given to many participants. Namely, it is desired to avoid a situation that occasions for providing services are given intensively to particular participants only. Further, it is favorable that services are not provided one-sidedly, and that a participant who was a service provider at one time receives a service as a service receiver at another time, and thus, exchange of service is actively performed between participants.

From this viewpoint, according to the present embodiment, by considering the listing order of the information 282 on each introduction candidate in the primary plan generation screen and the possessed face value of ticket included in the information 282 on each introduction candidate, a coordinator can select an introduction candidate having few occasions for providing his service (occasions to be introduce by the coordinator), as the service provider to be introduced, while satisfying the terms desired by the applicant for use, to some degree.

Further, in the present embodiment, when a coordinator notes some point in an individual negotiation for providing a service with each introduction candidate shown in the primary plan generation screen, then, the coordinator can register that point as a comment, with the community management center 1, associating that comment with the participant ID 133*a* of the negotiation partner. Then, when a coordinator designates the information 282 of some introduction candidate in the primary plan generation screen displayed on the coordinator terminal 2, then, the community management center 1 displays the comments associated with the participant ID 133*a* of the introduction candidate in question, on the coordinator terminal 2. By this, the coordinator can decide the service provider to be introduced to the applicant for use, taking the comments on each introduction candidate into consideration.

Further, according to the present embodiment, in the primary matching plan/result report screen (see FIG. 30) displayed on the participant terminal 3 of a participant (a service receiver) who has made an application for use, there is shown an introduction candidate selected as the service provider to be introduced to the service receiver, out of the introduction candidates selected by the community management center 1. The shown introduction candidate is selected by the coordinator. Accordingly, it is possible to avoid a situation that participants compete with one another in acquiring an occasion for providing a service. By this, it is possible to support an introduction service so as to realize an introduction service harmonized with the ideology of the community activities aiming at voluntary exchange of services.

Further, in the present embodiment, a service receiver can register evaluation information on the service received from the service provider shown in the primary matching plan/result report screen. The evaluation information is registered with the community management center 1, being associated with the participant ID 133*a* of the service provider in question. And, when a coordinator designates the information 282 on a certain introduction candidate in the primary plan generation screen displayed on the coordinator terminal 2, then, the community management center 1 displays the evaluation information associated with the participant ID 133*a* of the introduction candidate in question, on the coordinator terminal 2. By this, the coordinator can decide the service provider to be introduced to the applicant for use, considering the evaluation information of each introduction candidate.

Thus, according to the present embodiment, by considering the information of the service receiver, the information of each introduction candidate, and the content of the negotiation made individually with each person, which are shown in the primary plan generation screen, a coordinator can match a service provider and a service receiver such that exchanges of services circulate. Further, a coordinator introduces a service provider so that a service receiver does not need to abruptly and directly contact the unknown service provider. Accordingly, a barrier to participation to a community activity owing to difficulty in contacting an unknown person is lowered, and voluntariness of service providers and service receivers is encouraged. Further, based on service histories and private information of service providers and service receivers, a coordinator can perform matching work, being supported by the introduction support system, and considering elements that can not be fully evaluated by a price. Accordingly, a coordinator can perform intermediation of volunteer services accompanied by exchange of various values and mutual rewards.

Further, according to the present embodiment, the activity monitoring unit 127 of the community management center 1 can present each coordinator with a listed history of generation of primary matching plans that have been generated by that coordinator. That history includes each primary matching plan candidate, the primary matching plan generated by the coordinator based on the primary matching plan candidate in question, the comments relating to negotiations made with each introduction candidate in generating that primary matching plan, and the result report on the volunteer service exchange that has been made between the participants shown in the primary matching plan in question. By this, when each coordinator refers to the listed history of generating primary matching plans that have been generated by that coordinator himself, the coordinator can evaluate his coordinator activities, for example, judging if introductions of service providers concentrate in a certain participant.

Further, owing to the activity monitoring unit 127, the administrator of the community management center 1 can obtain a history list of generation of primary matching plans generated by a desired coordinator. By this, the administrator of the community management center 1 can judge if he admits the coordinator in question from now on, based on the listed history of generating primary matching plans generated by that coordinator. Further, based on the listed history of generating primary matching plans, problems can be easily grasped, by quickly checking the coordination state of a case about which a complaint has been made. Further, the average intermediation time (introduction time) can be correctly grasped based on the accumulated data, contributing to maintaining and improving coordinators reliability.

Further, the activity monitoring unit 127 may be provided with a function of presenting information required for judging fulfillment of coordinators duty of loyalty and duty of good administrator's care, or a function of making such a judgment. For example, control may be performed such that the community management center 1 and/or a participant of a community 5 can utilize a listed primary matching plan generation history generated by the activity monitoring unit 12. Namely, the activity monitoring unit 127 performs processing for extracting information required for judging fulfillment of coordinator's duty of loyalty and duty of good administrator's care, from a list of the primary matching plan generation history, to present the extracted information to the community management center 1 and/or the participant terminal. This function is effective in particular when a service receiver is a weak person such as an old person. As another point, the information required for judging fulfillment of coordinator's duty of loyalty and duty of good administrator's care includes a date of performing the coordinator work, coordinator identification information, information indicating contents of coordinator work, etc.

Here, examples of infringement of the duty of good administrator's care, and its judgment function will be described.

For example, a coordinator may neglect or fail to perform matching processing of an application for use, for a long period. For example, it is considered that processing of selecting the service provider to be introduced to an applicant out of introduction candidates shown in an introduction candidate list has been neglected or left unattended for a long period. Or, there may be a case of long-term neglecting or failing to perform processing of negotiation with an introduction candidate shown in the introduction candidate list, or processing of reporting to the applicant on the fact of selection of the service provider to be introduced to the applicant (i.e., primary matching plan registration processing) after that selection.

The function of judging if the processing of selecting the service provider to be introduced to the applicant has been neglected of left unattended for a long period is realized, for example, by making the activity monitoring unit 127 perform the following processing. Namely, the activity monitoring unit 127 extracts the application-for-use ID 136*a* associated with the coordinator ID 132*a* of the coordinator under monitoring, from the primary matching plan management database 138. Next, the activity monitoring unit 127 detects a discrepancy between the registration date 138*b* registered in association with the extracted application-for-use ID 136*a* in the primary matching plan management database 138 and the registration date 136*d* registered in association with the application-for-use ID 136*a* in question in the service receiver management database 136. And, if the mentioned discrepancy is more than or equal to a predetermined period (for example, three days), then the activity monitoring unit 127 judges that the above-mentioned processing has been left unattended. Or, the activity monitoring unit 127 examines if the application-for-use ID 136*a* registered in association with the community ID 132*a* of the community of which the coordinator under monitoring is in charge, in the service receiver management database 136 is registered in the primary matching plan management database 138 or not. When it is not registered, the activity monitoring unit 127 judges that the above-mentioned processing has been left unattended, similarly to the above.

Further, the function of judging if the processing of negotiation with an introduction candidate or the processing of notifying the applicant of the fact of selection of a service provider after that selection has been neglected or left unattended for a long period is realized, for example, by making the activity monitoring unit 127 perform the following processing. Namely, the activity monitoring unit 127 detects the registration date 138*b* and matching date 138*d* registered in association with the coordinator ID 132*a* of the coordinator under monitoring, in the primary matching plan management database 138. When the detected matching date 138*d* is empty and the detected registration date 138*b* is more than predetermined days (for example, three days) ago from the present date, then the activity monitoring unit 127 judges that the above-mentioned processing has been neglected or left unattended for a long period.

Further, as another example of infringement of the duty of good administrator's care, may be considered a case in which, when a negotiation with an introduction candidate selected first as the service provider to be introduced to the applicant, out of the introduction candidates shown in the introduction candidate list resulted in failure, processing of selecting another introduction candidate as a service provider of an alternative proposal to be introduced to the applicant, out of the introduction candidates shown in the introduction candidate list has been neglected or left unattended for a long period.

The function of judging if the processing of selecting another introduction candidate as an alternative proposal is left unattended or not, in such a case where a negotiation with a first-selected introduction candidate resulted in failure, is realized, for example, by making the activity monitoring unit 127 perform the following processing. Namely, for each case whose item of the content of matching 138*c* is "NG" among the cases registered in the primary matching plan management database 138 being associated with the coordinator ID 132*a* of the coordinator under monitoring, the activity monitoring unit detects the case whose value of the previous primary plan ID 136*e* is same as the primary plan ID 138*a* of the NG case in question, from the service receiver management database 136, and examines its processing state 136*c*. When its processing state 136*c* is "unstarted" and the matching date 138*d* of the NG case in question is more than predetermined days (for example, three days) ago from the present date, the activity monitoring unit 127 judges that the above-mentioned processing has been neglected or left unattended for a long period.

The activity monitoring unit 127 outputs such a judgment result on infringement of the duty of good administrator's care to the community management center 1 and/or the participant terminal 3 that has made the request for the judgment.

Next, examples of infringement of the duty of loyalty and its judgment function will be described.

For example, it is considered that a particular applicant (for example, a relative of the coordinator) is treated favorably so that the service best fit to the terms desired by that applicant is assigned, with priority, to that applicant.

The function of judging if an application for use by a particular applicant is treated favorably or not is realized by making the activity monitoring unit 127 perform the following processing. Namely, among the cases registered in the primary matching plan management database 138 being associated with the coordinator ID of the coordinator in monitoring, the activity monitoring unit 127 classifies cases whose item of the content of matching 138*c* is "OK" according to service IDs 1312*a* registered associated with the application-for-use ID 136*a* of each case in the service receiver management database 136. Next, for each service ID 1312*a*, and for each case classified to the class of the service ID 1312*a* in question, the activity monitoring unit 127 examines the priority (listing order) of the offered-service ID 135*a* of that case in the offered-service ID candidate list 137*b* registered in association with the primary plan candidate ID 137*a* of that case in the primary matching plan candidate management database 137. Next, for each service ID 1312*a*, the activity monitoring unit 127 extracts cases having the priorities ranging from the top priority to the n-th priority (n-th: a predetermined ordinal number; for example, 2nd or 3rd) among the cases classified to the class of the service ID 1312*a* in question. Then, for each extracted case, the activity monitoring unit 127 specifies the participant ID 133*a* registered in association with the application-for-use ID 136*a* of that case in the service receiver management database 136. As a result, when a particular participant ID 133*a* appears extremely frequently in comparison with the other participant IDs 133*a* (for example, when an error of the number of appearances of the particular participant ID 133*a* from the average of the respective numbers of appearances of the specified participant IDs 133*a* is more than or equal to a predetermined value (for example, the probable error)), then, the activity monitoring unit 127 judges that the participant of the mentioned particular participant ID 133*a* is treated favorably.

Further, as another example of infringement of the duty of loyalty, may be considered a case in which a particular service provider (for example, a relative of the coordinator) is introduced, with priority, to applicants for use. For example, it is considered that applications are assigned, with priority, to a particular service provider, in order to lead to increasing of his possessed amount of ticket.

The function of judging if a particular service provider is treated favorably as described above is realized, for example, by making the activity monitoring unit 127 perform the following processing. Namely, for each case whose item of the content of matching 138*c* is "OK", among the cases registered in the primary matching plan management database 138, being associated with the coordinator ID 132*a* of the coordinator under monitoring, the activity monitoring unit 127 examines the offered-service ID 135*a* of the case in question. When a particular offered-service ID 135*a* appears extremely frequently in comparison with the other offered-service ID 135*a* (for example, when an error of the number of appearances of the particular offered-service ID 135*a* from the average of the respective numbers of appearances of the offered-service IDs 135*a* is more than or equal to a predetermined value (for example, the probable error), then, the activity monitoring unit 127 judges that the participant having the participant ID 133*a* that is registered in association with the above-mentioned particular offered-service ID 135*a* in the service provider management database 135 is treated favorably.

Then, the activity monitoring unit 127 outputs such a judgment result on infringement of the duty of loyalty to the community management center 1 and/or the participant terminal 3 that has made the request for the judgment.

In the case that, in the above-described processing of presentation of a primary matching plan and registration of a report result, after records (cases) of the primary matching plan management database 138, the primary matching plan candidate management database 137, the result management database 140 and the negotiation management database 149 are copied to the intermediation history management database 141, the copied records are deleted, judgement of the infringement of the above-mentioned duties can be performed using each table in the primary matching plan management database 138, the primary matching plan candidate management database 137, the result management database 140, and the negotiation management database 149 copied to the intermediation history database 141.

Further, according to the present embodiment, each participant belongs to at least one community 5, i.e., a group as an arbitrary unit, and each community 5 is assigned with a coordinator. And, it is contracted that a participant's application for use includes designation of a community 5, and the coordinator who is in charge of the designated community 5 performs processing of introduction of a service provider conforming with the application in question. Accordingly, a coordinator can select the service provider to be introduced to the participant who has made the application, out of the service providers who are participants of the community and well known to the coordinator. Thus, a burden on a coordinator can be reduced.

Next, a second embodiment of the present invention will be described.

In the above-mentioned first embodiment, the community management center 1 selects candidates for a service provider (introduction candidates) to be introduced to the participant who has made the application for use, and the coordinator in charge of the community designated by the application in question decides finally the service provider to be introduced to the participant in question. On the other hand, in the present embodiment, the community management center 1 decides also the final service provider to be introduced to the above-mentioned participant.

Accordingly, the introduction service support system to which the present embodiment is applied has a schematic configuration of the introduction service support system of the first embodiment shown in FIG. 1, with the coordinator terminals 2 being removed.

Further, the community management center 1 used in the introduction support system to which the present embodiment is applied is different from the community management center 1 of the first embodiment shown in FIG. 3, in the following points. Namely, since the present embodiment does not require a coordinator, the coordinator management database 132 and the negotiation management database 139 are omitted from the storage unit 13. In harmony with it, the coordinator ID 132*a* included in each of the primary matching plan candidate management database 137 (see FIG. 10) and the primary matching plan management database 138 (see FIG. 11) is replaced by the community ID 1311*a*. Further, the processing in the activity monitoring unit 127 of the processing unit 12 is modified such that a primary matching plan generation history list is generated not for each coordinator but for each community.

Further, an outline of the introduction service that is performed using the introduction service support system to which the present embodiment is applied is similar to the outline of the introduction service shown in FIG. 2, except that the primary matching plan generation support/registration processing (S2007-S2012) is performed by the community management center 1 only, not by communication between the community management center 1 and the coordinator.

Next, operation of the community management center 1 of the present embodiment will be described. Here, a learning function may be provided to the present embodiment similarly to the above-described first embodiment. Further, a terminal may be provided with a false input detection function.

Further, the community activity participation processing, the offered-service registration processing, the application-for-use registration processing, and the primary matching plan presentation/result report processing are fundamentally similar to the processing by the community management center 1 of the first embodiment described referring to FIGS. 15, 19, 23 and 29, respectively. Accordingly, here, only the primary matching plan generation support/registration processing and the processing by the activity monitoring unit 127, i.e., the different parts from the processing of the community management center 1 of the first embodiment, will be described.

First, the primary matching plan generation support/registration processing will be described.

Figure 32:
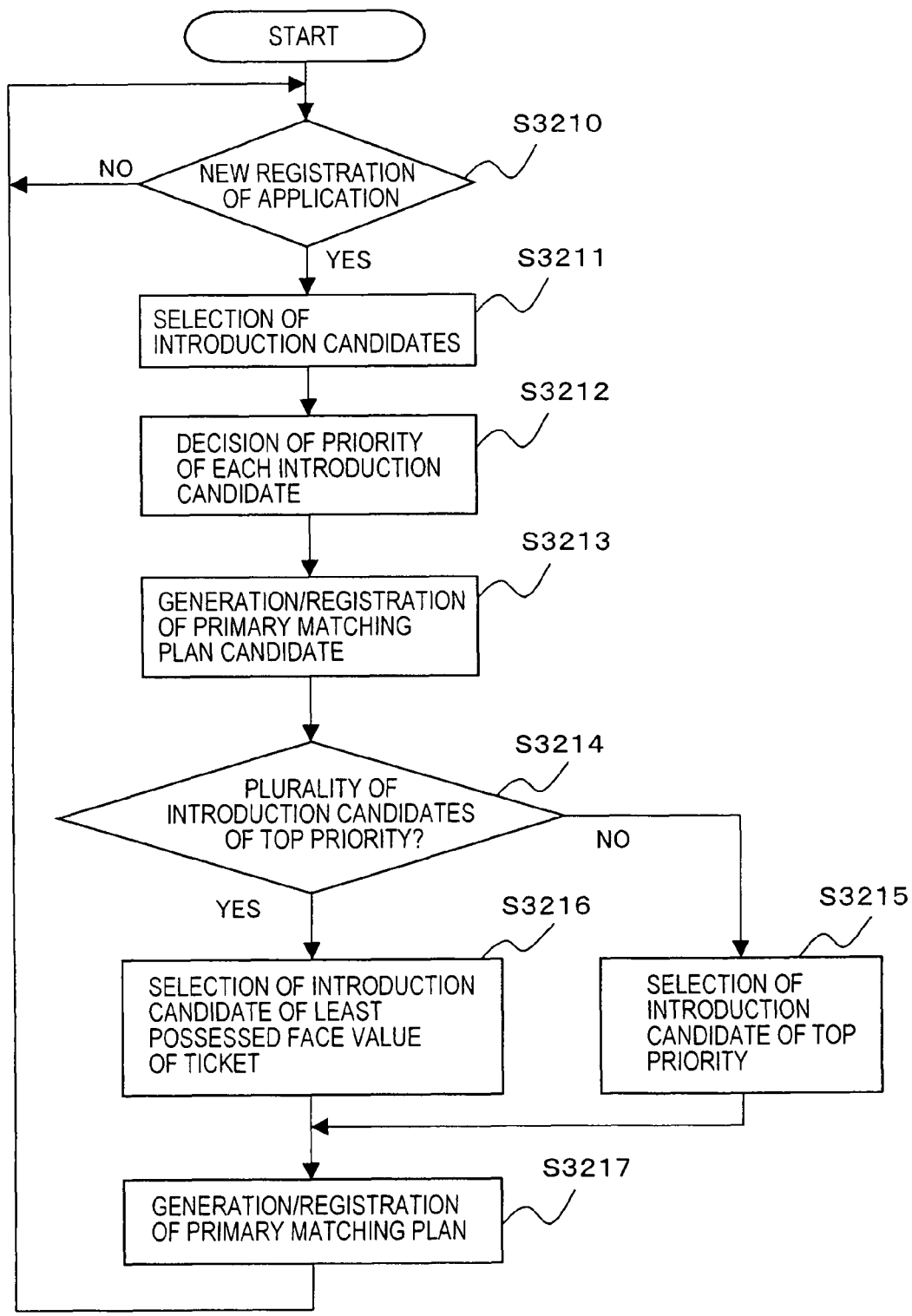
FIG. 32 is a chart for explaining primary matching plan generation support/registration processing in a second embodiment of the present invention.

FIG. 32 is a chart for explaining the primary matching plan generation support/registration processing.

When the application-for-use registration processing unit 124 registers new application-for-use information in the service receiver database 136 (S3210), then, the primary plan generation/registration processing unit 125 detects it and obtains the application-for-use ID 1361 of the new application-for-use information registered. Then, similarly to the processing of S2509 shown in FIG. 25, the primary plan generation/registration processing unit 125 selects candidates (introduction candidates) for the service provider to be introduced to the service receiver who is specified by the participant ID 133*a* associated with the above-mentioned application-for-use ID 136*a* (S3211).

In detail, from the service provider management database 135, the primary plan generation/registration processing unit 125 extracts an offered-service ID 135*a* of offered-service information that includes the community ID 1311*a* and service ID 1312*a* associated with the above-mentioned application-for-use ID 136*a* in the service receiver management database 136. Then, the primary plan generation/registration processing unit 125 selects introduction candidates, i.e., the participants specified by the participant IDs 133*a* associated with the extracted offered-service IDs 135*a*, respectively, in the service provider management database 135.

Next, the primary plan generation/registration processing unit 125 decides priority of each introduction candidate selected, similarly to the processing of S2510 shown in FIG. 25 (S3212).

In detail, for desired terms 135*b* associated with each offered-service ID 135*a* extracted from the service provider management database 135, the primary plan generation/registration processing unit 125 examines matched parts between the desired terms 135*b* in question and the desired terms 136*b* associated with the above-mentioned application-for-use ID 136*a* in the service receiver management database 136. And, for the desired terms 135*b* associated with each offered-service ID 135*a*, marks are given according to matched parts. For example, when the day of the week specified by the desired terms 135*b* in question includes the day of the week specified by the desired terms 136*b* associated with the above-mentioned application-for-use ID 136*a*, 5 marks are given; when the time zone specified by the desired terms 135*b* in question includes the time zone specified by the desired terms 136*b* associated with the above-mentioned application-for-use ID 136*a*, 3 marks are given; and when the place specified by the desired terms 135*b* in question includes the place specified by the desired terms 136*b* associated with the above-mentioned application-for-use ID 136*a*, 1 mark is given. And, for the desired terms 135*b* associated with each offered-service ID 135*a*, the priority is decided such that the higher the score of the desired terms 135*b* in question is, the higher the priority of the corresponding introduction candidate is.

When the priority of each introduction candidate is decided as described above, the primary plan generation/registration processing unit 125 registers a primary matching plan candidate that includes: the above-mentioned application-for-use ID 136*a*; the community ID 1311*a* included in the application-for-use information associated with the application-for-use ID 136*a*; and the offered-service ID candidate list 137*b* that describes the offered-service IDs 135*a* extracted from the service provider management database 135, in the descending order of priority; into the primary matching plan candidate management database 137, adding a unique primary plan candidate ID 137*a*. At that time, also the registration date 137*c* is registered in addition. Further, in the service receiver management database 136, the processing state corresponding to the application-for-use ID 136 included in the generated primary matching plan candidate is changed from "unstarted" to "primary matching plan candidate is already generated" (S3213).

Next, the primary plan generation/registration processing unit 125 examines if there exist a plurality of introduction candidates who have the top priority (S3214). When a plurality of such introduction candidates exist, the participant management database 133 is used to examine the possessed face value of ticket 133*d* for each of those introduction candidates, and the introduction candidate having the lowest possessed face value of ticket 133*d* is decided as the service provider to be introduced to the service receiver specified by the application-for-use information associated with the above-mentioned application-for-use ID 136*a* (S3216). On the other hand, when only one introduction candidate has the top priority, then that introduction candidate is decided as the service provider to be introduced to the service receiver specified by the application-for-use information associated with the above-mentioned application-for-use ID 136*a* (S3215).

Next, when the service provider to be introduced to the above-mentioned service receiver, the primary plan generation/registration processing unit 125 registers the primary matching plan that includes the offered-service ID 135*a* of that service provider, the primary plan candidate ID 137*a* of the primary matching plan candidate that has been used for deciding the service provider in question, the application-for-use ID 136*a*, and the community ID 1311*a*, into the primary matching plan management database 138. At that time, registration date 138*b* is registered in addition, and the content of matching 138*c* is set to "undetermined". Further, in the service receiver management database 136, the processing state 136*c* corresponding to the application-for-use ID 136*a* included in the primary matching plan candidate is changed from "primary matching plan candidate is already generated" to "primary matching plan is already generated" (S3217).

Next, processing performed by the activity monitoring unit 127 will be described.

Figure 33:
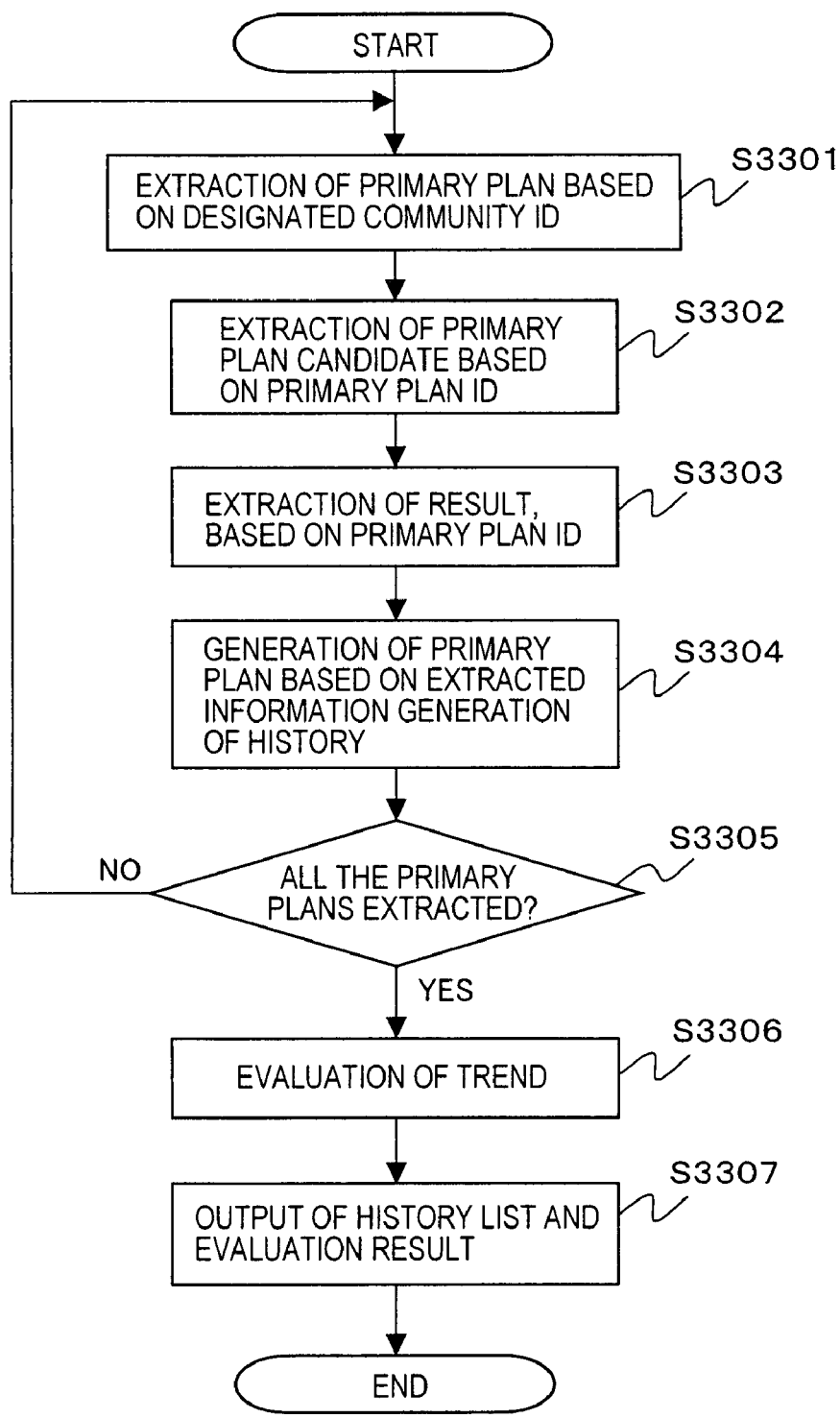
FIG. 33 is a chart for explaining processing performed by an activity monitoring unit 127 in the second embodiment of the present invention.

FIG. 33 is a chart for explaining processing performed by the activity monitoring unit 127.

When the administrator or another person of the community management center 1 designates the community ID 1311*a* of the community as an object of generating a primary matching plan generation history, through the input device such as the keyboard provided to the community management center 1, it is notified to the activity monitoring unit 127.

Receiving it, the activity monitoring unit 127 extracts one primary matching plan associated with the notified community ID 1311*a*, from the primary matching plan management database 138 that has been copied to the intermediation history management database 141 (S3301). Next, the primary matching plan candidate associated with the primary plan ID of the extracted primary matching plan is extracted from the primary matching plan candidate management database that has been copied to the intermediation history management database 141 (S3302). At the same time, the result associated with the primary plan ID 138*a* in question is extracted from the result management database 140 that has been copied to the intermediation history management database 141 (S3303).

Then, the activity monitoring unit 127 generates a primary matching plan generation history, based on the contents of primary matching plan, the primary matching plan candidate and the result extracted in the steps S3301-S3303 (S3304). In detail, with respect to each of the primary matching plan, the primary matching plan candidate, and the result, when an ID used for management in another management database is included, then, the mentioned "another management database" is examined to specify the information associated with the ID in question. By this, the respective contents of the primary matching plan, the primary matching plan candidate, and the result are specified, and a primary plan generation history including these specified contents is generated.

When the activity monitoring unit 127 repeats the processing in S3301-S3304 so that the primary plan generation history is generated for every primary matching plan associated with the community ID 1311*a* notified from the administrator of the community management center 1 (S3305), then, the activity monitoring unit 127 evaluates if the introductions of service providers concentrate in a certain participant, or not (S3306). For example, for each participant who is described as an introduction candidate in all the primary matching plan candidates extracted in S3102, a ratio between the number of his appearance as an introduction candidate in the primary matching plan candidates and the number of his appearance as a service provider in the primary matching plans is obtained. Then, based on the ratios obtained respectively for the above-mentioned participants, it is evaluated if the introductions of service providers concentrate in a certain participant, or not.

Next, the activity monitoring unit 127 outputs all the primary plan generation histories generated in S3304 and the tendency obtained in S3306 to the output device, such as the display unit or the printer, of the community management center 1 (S3307).

Here, it is appropriate that a signature key (which can be known only to the administrator etc. of the community management center, who has predetermined authority) held in secret by the community management center 1 is used to sign the primary matching plan, the primary matching plan candidate, and the result, which are copied as an intermediation history to the intermediation history management database 141, in the processing of presentation of a primary matching plan and registration of a report of a result (see FIG. 29). By this, alteration by an operator etc. of the community management center 1 can be detected, by verification of the signature.

Hereinabove, the second embodiment of the present invention has been described.

Similarly to the above-described first embodiment, in the present embodiment also, it is possible to select an introduction candidate having few occasions for providing his service (occasions to be introduced by a coordinator) as the service provider to be introduced, while satisfying the terms desired by the applicant for use, to some degree. Further, only the information on the finally selected service provider is displayed on the applicant's terminal. Accordingly, it is possible to avoid a situation that participants compete with one another in acquisition of an occasion for providing a service. By this, it is possible to support an introduction service so as to realize an introduction service harmonized with the ideology of the community activities aiming at voluntary exchange of services.

Further, according to the present embodiment, owing to the activity monitoring unit 127, the administrator of the community management center 1 can obtain a primary matching plan generation history list for a desired community. By this, the administrator of the community management center 1 can judge, for example, if occasions given to participants of the community in question for providing services are concentrated or not, based on the primary matching plan generation history list for the community in question. The obtained information can be used for the administrator of the community management center 1 to guide a participant individually.

Further, similarly to the above-mentioned first embodiment, also in the present embodiment, each participant belongs to at least one community 5, i.e., a group as an arbitrary unit. And, it is contracted that a participant's application for use includes designation of a community 5, and the service provider to be introduced in reply to the application-for-use in question is selected out of the participants participating in the designated community 5. By this, the range of searching for the above-mentioned service provider to be introduced can be smaller, and a burden on the selection of the service provider to be introduced can be reduced.

Hereinabove, the embodiments of the present invention have been described.

The present invention is not limited to each embodiment described above, and can be variously modified within the scope of the gist of the invention.

Figure 34:
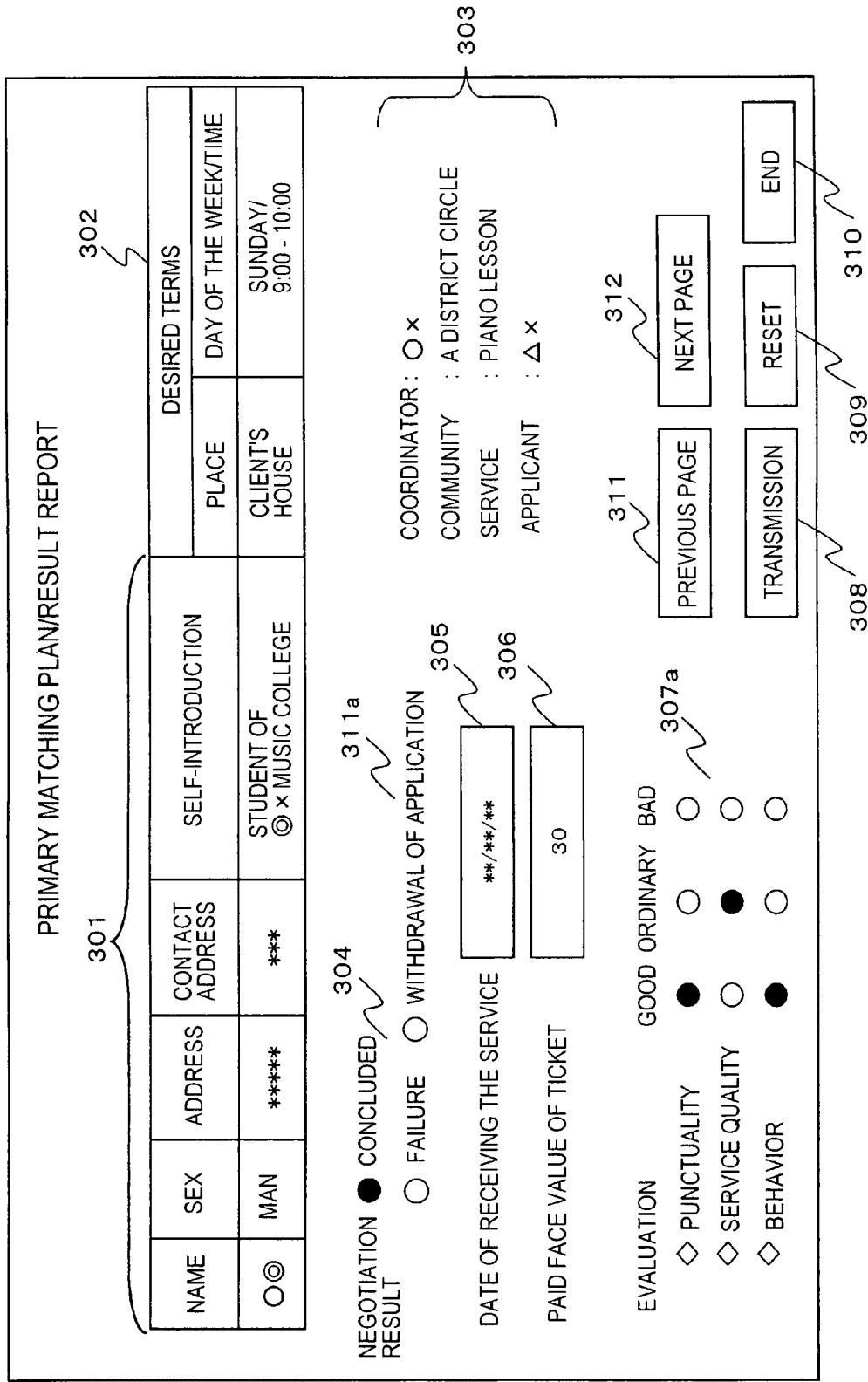
FIG. 34 is a view showing a variation of a primary matching plan/result report screen displayed on a terminal that has accessed the community management center 1.

For example, in the above-mentioned processing of presentation of a primary matching plan and registration of a report of a result (see FIG. 29) in each embodiment, and in the primary matching plan/result report screen (see FIG. 30) displayed on the display unit of the access terminal, the input column 307 for receiving input of an evaluation on the received service may be changed to a selection form 307a for selecting a degree of satisfaction (out of three grades, "good", "ordinary" and "bad", in the example shown in FIG. 34) for each evaluation item. Then, the result registration processing unit 126 of the community management center 1 may give marks depending on the selected degree of satisfaction of each evaluation item, selected by the user of the access terminal (the service receiver) (for example, 1 mark for "good", 0 mark for "ordinary", and −1 mark for "bad", in the case of FIG. 34), to register the sum of these marks as the evaluation information 140d into the result management database 140.

In that case, in the introduction candidate selection processing (S2509 in FIG. 25, and S3211 in FIG. 32), the primary plan generation/registration processing unit 125 may obtain the total marks of all the evaluation information 140d associated with the participant ID 133a of each of the selected introduction candidates, and exclude one whose total marks do not satisfy a predetermined criterion from the introduction candidates. By this, it is possible to select the service provider to be introduced to the applicant, considering the evaluations of his past activities of providing volunteer services.

Further, in each of the above-described embodiments, each participant's utilization of the introduction service (the frequency of providing his volunteer service) is judged based on his possessed face value of ticket 133d, which is intended to be used exclusively as the value for a volunteer service. However, the present invention is not limited to this. For example, each participant's utilization of the introduction service may be judged based on a difference between the number of his appearances as a service provider in the primary matching plan management database 138 (which can be specified from the offered-service ID 135a in that database 138) and the number of his appearances as a service receiver in that database 138 (which can be specified from the application-for-use ID 136a in that 138).

Further, a plurality of communities 5 exist in each of the above-described embodiments. However, the present invention can be applied to a case in which only one community 5 exists. In that case, all the participants belong to the same community 5, and accordingly, management of the community using the community information management table 1311 in the community/service management database 131, the community participation management database 134, etc. is not required.

Further, in each of the above-described embodiments, the private information 133c and possessed face value of ticket 133d of each participant are managed by the participant management database 133 provided in the storage unit 13 of the community management center 1. However, the present invention is not limited to this. For example, the private information 133c and the possessed face value of ticket 133d may be stored on a storage (such as an IC card) provided in the participant terminal 3 of each participant. And, instead of the private information 133c and the possessed face value of ticket 133d, addresses to locations of these pieces of information may be registered into the participant management database 133. When the private information 133c or the possessed face value of ticket 133d is required, its location address registered in the participant management database 133 is accessed to obtain the information in question.

Figure 35:
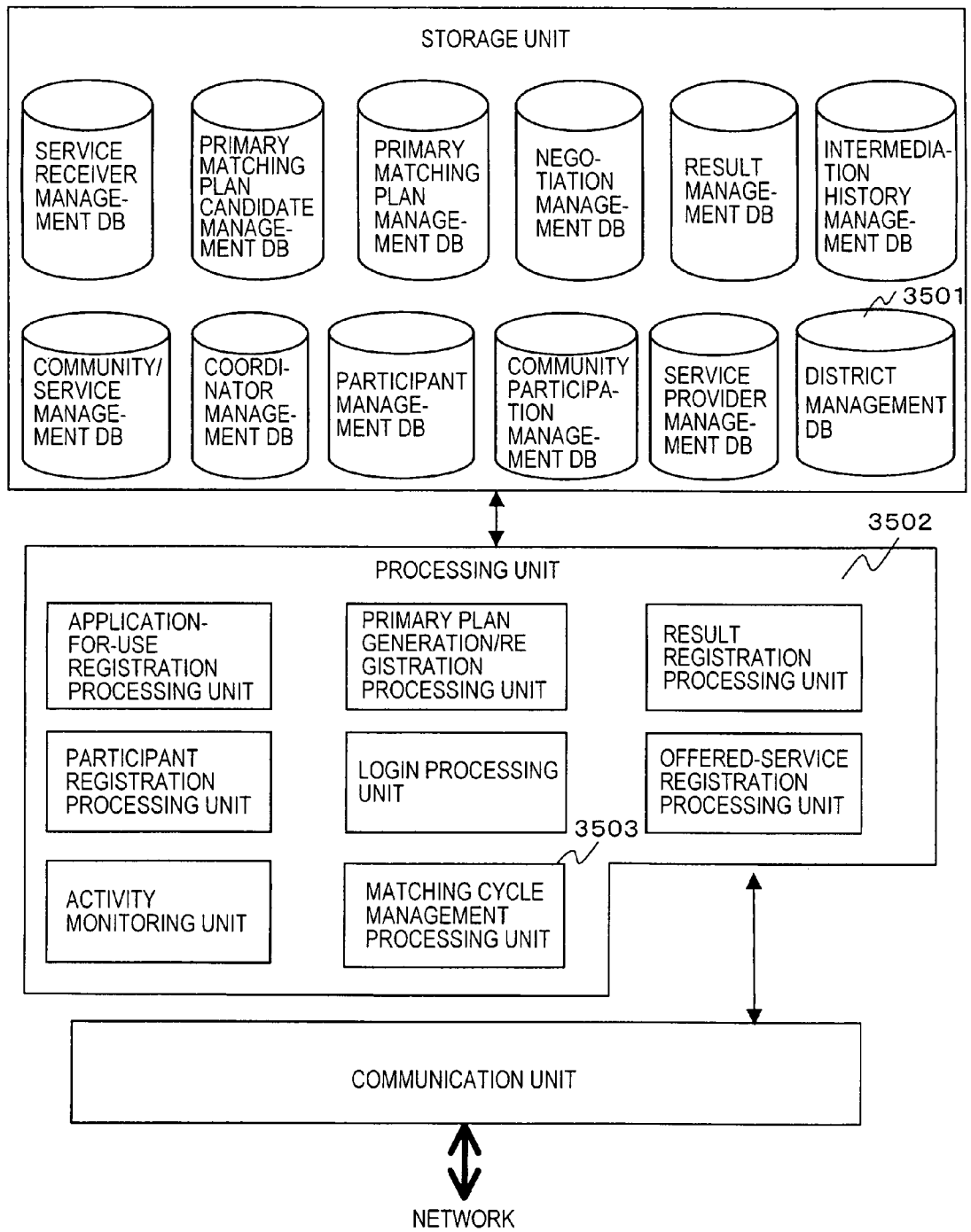
FIG. 35 is a diagram showing a schematic configuration of a variation of the community management center 1 shown in FIG. 1.

Further, in each of the above-described embodiments, there exist one kind of ticket treated by the community management center 1. However, two or more kinds of tickets may exist. For example, as shown in FIG. 35, a district management database 3501 may be provided. FIG. 36 shows a structure of the district management database 3501, which registers a district name 3602, the kind of ticket 3603, and the number of residents 3604, being added with a unique district ID 3601. It is favorable that a district specified by each district ID 3601 has the number of resident generally in the range of 25-100. In the participation registration processing (FIG. 15) for participating a community activity, the private information 133c includes the above-mentioned district ID depending on the participant's address. Accordingly, the kind of ticket used by a participant can be specified by searching the district management database 3501 using the district ID included in his private information 133c. Further, in the primary matching plan generation support/registration processing (FIG. 25), when a primary matching plan candidate is generated and registered (S2511), a participant who used the same kind of ticket as the applicant for use is selected as the service provider. In detail, the district ID included in the private information 133c is obtained by using the participant ID 133a in the service provider management database 135, and then, the kind of ticket 3603 is specified from the district management database 3501, using the obtained district ID. Then, it is checked if the specified kind of ticket is same as the ticket of the applicant for use. When they are same, the participant in question is selected as a candidate. By this, the range of intermediation is limited to participants using the same kind of ticket, and it has the effect of decreasing the number of coordinator's operations, and lessening the burden of the work.

Further, each of the above-described embodiments may be operated in a cycle of: application, primary plan generation, matching, result opening, and result registration, as follows.

(1) Applications for association are received twice a week (closing at 1000 hours of Monday and at 1500 hours of Wednesday).

(2) Primary plan candidates are completed until 1700 hours of Monday and 1200 of Thursday 12 (automatically).

(3) A coordinator generates primary matching plans in 0900-1200 hours of Tuesday and 1200-1500 hours of Thursday.

(4) Results are opened at 1400 hours of Tuesday and 1600 hours of Thursday.

(5) Service receivers registers their results from 1700 hours of Monday on and from 1500 hours of Wednesday on.

In that case, the processing unit 3502 shown in FIG. 35 is provided with a matching cycle management processing unit 3503 to manage the above-described cycle. The matching cycle management processing unit 3503 performs control such that an application for use is not received in the time zones: 1000 hours of Monday-1400 hours of Tuesday; and 1500 hours of Wednesday-1600 hours of Thursday. Further, in the primary matching plan generation support/registration processing (FIG. 25), when an application-for-use list is displayed (S2506), the displayed applications are limited to ones that belong to the range between the start of application and the close of application, based on the registration dates 136*d* of those applications.

Accordingly, the step of generating and registering primary matching plan candidates (S2511) is performed based on the above-mentioned application-for-use list. The matching cycle management processing unit 3503 opens the primary matching plans generated in the primary matching plan generation support/registration processing (FIG. 25) to the service receivers at 1400 hours of Tuesday and 1600 hours of Thursday. And, the matching cycle management processing unit 3503 allows registration of the results from 1700 hours of Monday on and from 1500 hours of Wednesday on.

Further, each of the above-described embodiments has been described taking an example of supporting an introduction service that introduces a service provider, who can provide a service conforming with a desire of a service receiver, to that service provider, in a community activity aiming at exchange of volunteer services. However, the present invention is not limited to this.

The present invention can be widely applied not only to a community activity aiming at exchange of volunteer services, but also to a field in which service or commodities having multiple values non-reducible to one-dimensional price information are exchanged. Further, the present invention can be applied to a field in which an exchange of a service or commodity is accompanied by mutual rewards. For example, the present invention can be applied to the field of banks and securities, including network transactions of forecast reports called soft money in the stock business.

Further, the present invention can be widely applied to an introduction service in which a person conforming with a desire of an applicant is introduced, in a community activity aiming at an object other than exchange of services (for example, participation in a hobby circle). In particular, the present invention can be applied to a system for aged persons. In such a case, the system may be provided with a function that, when a participant applies for registration, a coordinator acts for the applicant in his registration procedure, while the coordinator is contacting the participant by telephone in the community management center. Further, it is possible to employ an arrangement in which contents of registration are outputted in voice. Owing to voice output, contents to be registered can be compared with the contents of the past data, to prevent false input.

Further, in each of the above-described embodiment, electronic data (electronic ticket) such as electronic money may be used as the ticket treated by the community management center 1. For example, the administrator of the community management center 1 distributes an IC card to each participant registered in the participant management database 132. A participant mounts his IC card into his participant terminal 3, to store information on the electronic ticket possessed by himself into his IC card (the participant terminal 3 is required to have a means (an IC card reader/writer) for accessing an IC card). By transmitting and receiving electronic ticket information between the IC card mounted on his own participant terminal 3 and an IC card mounted on a participant terminal 3 of another participant, the participant can provide or receive an electronic ticket to or from the mentioned "another participant".

Here, an IC card distributed to each participant may be stored in advance with the login information 133*b* of the participant in question. And, a participant terminal 3 and/or an IC card may be provided with an access control function, such that only a person who has inputted the login information 133*b* stored in an IC card into a participant terminal 3 mounted with that IC card is allowed to access the electronic ticket information etc. stored in the IC card. Further, the mentioned access control function may be modified such that only a person who has been allowed to access the electronic ticket information stored in an IC card can use the participant terminal 3 mounted with that IC card to access the community management center 1. Further, an IC card distributed to each participant may be stored in advance with accessible kinds of information that the participant in question can access. And, the mentioned access control function may be modified such that the participant terminal 3 mounted with the IC card in question can access information belonging to the accessible kinds of information defined in that IC card, among various pieces of information stored in various databases of the community management center 1.

Further, various pieces of information obtained by the participant terminal 3 mounted with an IC card, by accessing the community management center 1, may be stored into the IC card in question. And, the participant may brows offline those various pieces of information, using the participant terminal 3 mounted with that IC card.

Similarly, the administrator of the community management center 1 may distribute an IC card to each coordinator registered in the coordinator management database 133. The login information 132*b* of a coordinator may be stored in advance to the IC card distributed to that coordinator. And, a coordinator terminal 2 and/or an IC card may be provided with an access control function such that only a person who has inputted the login information 132*b* stored in an IC card into a coordinator terminal 2 (the coordinator terminal 2 is required to have a means (an IC card reader/writer) for accessing an IC card) mounted with that IC card is allows to access various pieces of information stored in the IC card in question. Further, the mentioned access control function may be modified such that only a person who has been allowed to access the various pieces of information stored in an IC card can use the coordinator terminal 2 mounted with that IC card to access the community management center 1. Further, an IC card distributed to each coordinator may be stored in advance with accessible kinds of information that the coordinator in question can access. And, the mentioned access control function may be modified such that the coordinator terminal 2 mounted with the IC card in question can access information belonging to the accessible kinds of information defined in that IC card, among various pieces of information stored various databases of the community management center 1.

Further, various pieces of information obtained by the coordinator terminal 2 mounted with an IC card, by accessing the community management center 1, may be stored into the IC card in question. And, the coordinator may brows offline those various pieces of information, using the coordinator terminal 2 mounted with that IC card.

Further, the introduction support system to which each of the above-mentioned embodiments is applied may cooperate with another system. For example, the introduction support system may cooperate with a reception system for receiving an arrangement for a fire engine, an ambulance, or the like. In that case, for example, the start menu screen shown in FIG. 16 is provided with an item for receiving an arrangement for a fire engine, an ambulance, or the like, in addition to the items for utilizing the introduction service support system of the present invention. Then, when this item for receiving such an arrangement is selected in the participant menu screen, it is notified to the reception system concerned. Receiving it, the reception system receives information required for receiving an arrangement of a fire engine or an ambulance from the participant, through a suitable input screen, and notifies a reception system's operator etc. of the received information.

Here, it is favorable that, when a predetermined time has elapsed without selection of any item after the participant menu screen is displayed, the participant terminal 3 judges that an emergency has occurred to the participant, and notifies the community management center 1 of that fact together with the login information of the participant.

Receiving the notification of the occurrence of the participant's emergency from the participant terminal 3, the community management center 1 notifies the reception system of the participant's private information and his urgent contact address registered in association with the login information received together with the mentioned notification, to make the emergency known to an reception system's operator etc. By this, it is possible that the reception system's operator contacts the urgent contact address for example, to confirm the condition of the participant to whom the emergency has occurred, and to take appropriate action.

When the participant terminal 3 is the type of using the above-mentioned IC card, the login information stored in the IC card may be used as the above-mentioned participant's login information transmitted together with the notification of the occurrence of the participant's emergency. Further, an urgent contact address of each participant may be registered in advance into the participant management database 133. Or, an urgent contact address may be stored in advance into the above-mentioned IC address, to be notified, together the login information stored in that IC card, to the community management center 1.

As described above, according to the present invention, it is possible to support intermediatin so as to activate and facilitate exchange of services or commodities having multiple values and/or accompanied by mutual rewards.

What is claimed is:

1. An introduction method, is executed on a computer, wherein the computer is connected to a plurality of terminals through an information transmitting medium, and is used to introduce a provider who can provide a service or a commodity in accordance with a request of an applicant, the method comprising:

a provider registration step of receiving, by the computer, a desired term from a terminal of a provider, the desired term relating to a service that is provided by said provider, and of registering, by the computer, said desired term in association with information regarding said provider as provider information;

a providing state registration step of obtaining, by the computer, providing state information regarding occasions for providing a service by said provider, and of registering, by the computer, said providing state information in association with the provider information of said provider;

an applicant registration step of receiving, by the computer, an application from a terminal of said applicant, the application indicating a service that said applicant wants to use, and of registering, by the computer, said application in association with information regarding said applicant as applicant information;

a provider specifying step of selecting, by the computer, desired terms from desired terms registered by the computer in said provider registration step, the selected desired terms satisfying at least a part of contents of said application, and of specifying, by the computer, said provider to be introduced to said applicant based on an order of priority decided according to matched parts between each of said selected desired terms and the contents of said application, wherein in said provider specifying step, when a plurality of providers have a highest priority, a provider of the plurality of providers is selected as the provider to be introduced to said applicant, the selected provider having occasions for providing a service, as indicated by the providing state information corresponding to the provider, that is lowest among said plurality of providers.

2. The introduction method according to claim 1, further comprising:

a history registration step of registering contents of processing in said provider specifying step.

3. The introduction method according to claim 1, wherein said providing state information is a possessed face value of a ticket received from said applicant as a value for the service, and wherein said providing state registration step includes a step of adding, to the possessed face value of said ticket possessed by said provider, a face value of said ticket paid by said applicant to said provider as a value of the service provided.

4. The introduction method according to claim 3, wherein said providing state registration step includes a step of receiving, from the terminal of said applicant, the face value of said ticket paid by said applicant to said provider as value for the service provided.

5. The introduction method according to claim 3, wherein if said applicant is also registered as a provider by said provider registration step, then said providing state registration step includes a step of subtracting the face value of said ticket paid by said applicant from a possessed face value of said ticket of said provider who is said applicant.

6. The introduction method according to claim 1, wherein said provider belongs to at least one of a plurality of communities, each community being a group of an arbitrary unit, wherein said provider information includes identification information identifying the community to which said provider belongs, wherein said application indicating the service that the applicant wants to use includes designation of a community, and wherein in said provider specifying step said provider to be introduced to said applicant is selected from providers belonging to the community designated by said application.

7. The introduction method according to claim 1, wherein at least a part of said provider information or at least a part of said applicant information is closed to the public.

8. The introduction method according to claim 1, wherein said desired term includes a designation of a service that can be provided, and a date or a day of the week and a time zone, and location, and
wherein said application for use includes a designation of a service that the applicant wants to use, and a date or a day of the week and a time zone, and a location.

9. An introduction system for introducing a provider who can provide a service or a commodity, in accordance with a request of an applicant, the system comprising:
a provider registration means for receiving a desired term from a terminal of a provider through an information transmitting medium, the desired term relating to a service that is provided by the provider, and for registering said desired term in association with information regarding said provider as provider information;
a providing state registration means for obtaining providing state information regarding occasions for providing a service by said provider, and for registering said providing state information in association with the provider information of said provider;
an applicant registration means for receiving an application from a terminal of said applicant through an information transmission medium, the application indicating a service that said applicant wants to use, and for registering said application in association with information regarding said applicant as applicant information; and
a provider specifying means for selecting desired terms from desired terms registered by provider registration means, the selected desired terms satisfying at least a part of contents of said application, and for specifying said provider to be introduced to said applicant based on an order of priority decided according to matched parts between each of said selected desired terms and the contents of said application,
wherein said provider specifying means selects, when a plurality of providers have a highest priority, a provider of the plurality of providers is selected as the provider to be introduced to said applicant, the selected provider having occasions for providing a service, as indicated by the providing state information corresponding to the provider, that is lowest among said plurality of providers.

10. An introduction system for introducing a provider who can provide a service or a commodity, in accordance with a request of an applicant, the system comprising:
a provider registration means for receiving a desired term from a terminal of a provider through an information transmitting medium, the desired term relating to a service that is provided by the provider, and for registering said desired term in association with information regarding said provider as provider information;
a providing state registration means for obtaining providing state information regarding occasions for providing a service by a provider, and for registering said providing state information in association with the provider information of said provider;
an applicant registration means, for receiving an application from a terminal of said applicant through an information transmission medium, the application indicating a service that said applicant wants to use, and for registering said application in association with information regarding said applicant as applicant information;
a provider specifying means for selecting desired terms from desired terms registered by provider registration means, the selected desired terms satisfying at least a part of contents of said application, and for specifying said provider to be introduced to said applicant based on an order of priority decided according to matched parts between each of said selected desired terms and the contents of said application; and
a history registration means for, registering contents of processing by said provider specifying means,
wherein said provider specifying means selects, when a plurality of providers have a highest priority, a provider of the plurality of providers is selected as the provider to be introduced to said applicant, the selected provider having occasions for providing a service, as indicated by the providing state information corresponding to the provider, that is lowest among said plurality of providers.

11. A computer program product for introducing a provider who can provide a service or a commodity, in accordance with a request of an applicant, the computer program product comprising:
a computer program; and
a computer-readable storage medium having the computer program tangibly embodied thereon,
wherein the computer program causes a computer to execute:
a provider registration step of receiving a desired term from a terminal of a provider through an information transmitting medium, the desired term relating to a service that is provided from a terminal of said provider, and of registering said desired term in association with information regarding said provider as provider information;
a providing state registration step of obtaining providing state information regarding occasions for providing a service by said provider, and of registering said providing state information in association with the provider information of said provider;
an applicant registration step of receiving an application from a terminal of an applicant through an information transmission medium, the application indicating a service that said applicant wants to use, and of registering said application in association with information regarding said applicant as applicant information; and
a provider specifying step of selecting desired terms from desired terms registered in said provider registration step, the selected desired terms matching at least a part of contents of said application, and of specifying said provider to be introduced to said applicant based on an order of priority decided according to matched parts between each of said selected desired terms and the contents of said application,
wherein in said provider specifying step, when a plurality of providers have a highest priority, a provider of the plurality of providers is selected as the provider to be introduced to said applicant, the selected provider having occasions for providing a service, as indicated by the providing state information corresponding to the provider, that is lowest among said plurality of providers.

12. A computer program for introducing a provider who can provide a service or a commodity, in accordance with a request of an applicant, the computer program product comprising:

a computer program; and a computer-readable storage medium having the computer program tangibly embodied thereon, wherein the computer program causes a computer to execute:

a provider registration step of receiving a desired term from a terminal of a provider through an information transmitting medium, the desired term relating to a service that is provided by said provider, and of registering said desired term in association with information regarding said provider as provider information;

a providing state registration step of obtaining providing state information regarding occasions for providing a service by said provider, and of registering said providing state information in association with the provider information of said provider;

an applicant registration step of receiving an application from a terminal of an applicant through an information transmission medium, the application indicating a service that said applicant wants to use, and of registering said application in association with information regarding said applicant as applicant information;

a provider specifying step of selecting desired terms from desired terms registered in said provider registration step, the selected desired terms matching at least a part of contents of said application, and for of specifying said provider to be introduced to said applicant based on an order of priority decided according to matched parts between each of said selected desired terms and the contents of said application; and a history registration step of registering contents of processing in said provider specifying step, wherein in said provider specifying step, when plurality of providers have a highest priority, a provider of the plurality of providers is selected as the provider to be introduced to said applicant, the selected provider having occasions for providing a service, as indicated by the providing state information corresponding to the provider, that is lowest among said plurality of providers.

* * * * *